US006414608B1

United States Patent
Nishida et al.

(12) United States Patent
(10) Patent No.: US 6,414,608 B1
(45) Date of Patent: Jul. 2, 2002

(54) VARIABLE LENGTH CODE DECODING DEVICE, DIGITAL BROADCAST RECEIVING APPARATUS, AND DVD REPRODUCING APPARATUS

(75) Inventors: Hideshi Nishida, Nishinomiya; Kosuke Yoshioka, Neyagawa; Tokuzo Kiyohara, Osaka, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/583,374

(22) Filed: May 31, 2000

(30) Foreign Application Priority Data

Jun. 9, 1999 (JP) .......................................... 11-162113

(51) Int. Cl.[7] .............................................. H03M 7/40
(52) U.S. Cl. ......................................... 341/67; 341/65
(58) Field of Search ..................... 341/65, 67; 714/752, 714/759, 777, 779

(56) References Cited

U.S. PATENT DOCUMENTS

| 5,225,832 A | | 7/1993 | Wang et al. ................... 341/67 |
| 5,343,195 A | * | 8/1994 | Cooper ......................... 341/67 |
| 5,428,356 A | | 6/1995 | Ozaki .......................... 341/67 |
| 5,677,690 A | | 10/1997 | Sohn ........................... 341/67 |
| 5,701,126 A | * | 12/1997 | Kim ............................ 341/67 |
| 5,784,012 A | * | 7/1998 | Kawauchi et al. ............. 341/67 |
| 5,825,314 A | * | 10/1998 | Kawauchi et al. ............. 341/67 |
| 6,011,498 A | * | 1/2000 | Wittig ......................... 341/67 |

FOREIGN PATENT DOCUMENTS

| JP | 6-104767 | 4/1994 |
| JP | 7-212242 | 8/1995 |

* cited by examiner

Primary Examiner—Tuan T. Lam
(74) Attorney, Agent, or Firm—Price and Gess

(57) ABSTRACT

A first bit string extracting unit extracts a first bit string. A first bit length judging unit detects a first codeword from the first bit string. A first decoding unit generates a first run-level pair from the first codeword. A second bit string extracting unit extracts a second bit string. A second bit length judging unit detects a second codeword from the second bit string. A second decoding unit generates a second run-level pair from the second codeword. A first inverse quantizing unit inverse quantizes the first level to obtain a DCT coefficient. A second inverse quantizing unit inverse quantizes the second level to obtain a DCT coefficient. A second buffer controller writes the DCT coefficients and their first buffer addresses into a second buffer. A first buffer controller reads the DCT coefficients and the first buffer addresses from the second buffer and writes the DCT coefficients into a first buffer at the respective first buffer addresses.

28 Claims, 39 Drawing Sheets

FIG. 5

| j | Zig(j) |
|---|---|
| 0 | 0 |
| 1 | 1 |
| 2 | 8 |
| 3 | 16 |
| 4 | 9 |
| 5 | 2 |
| 6 | 3 |
| 7 | 10 |
| 8 | 17 |
| 63 | 63 |

FIG. 7

700 QUANTIZATION TABLE

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

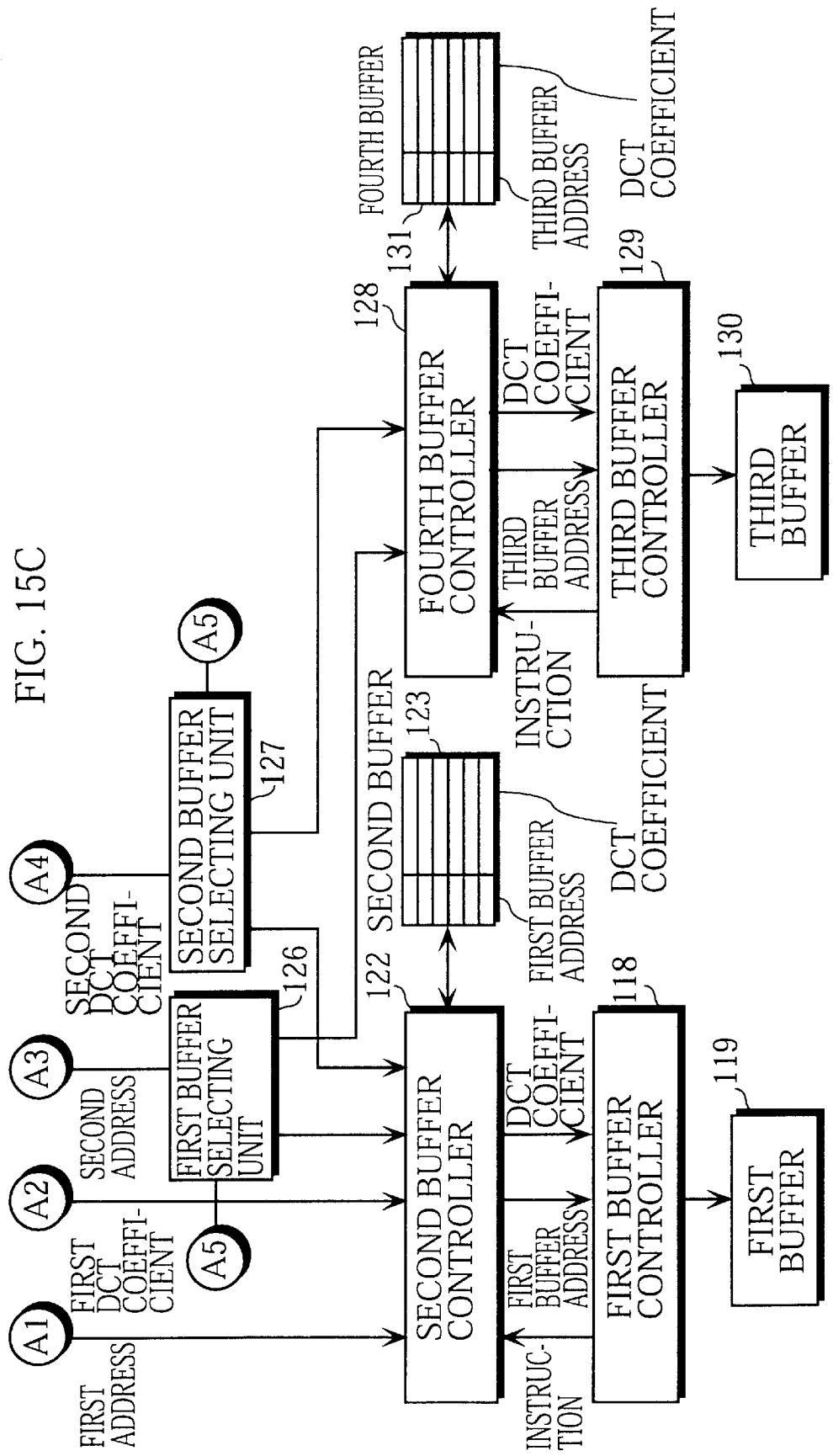

FIG. 20

157 THIRD TABLE

| VARIABLE LENGTH CODEWORD | RUN A | LEVEL A | RUN B | LEVEL B |
|---|---|---|---|---|
| 110 110 | 0 | 1 | 0 | 1 |
| 110 111 | 0 | 1 | 0 | −1 |
| 110 0110 | 0 | 1 | 1 | 1 |
| 110 0111 | 0 | 1 | 1 | −1 |
| 110 01000 | 0 | 1 | 0 | 2 |
| 110 01001 | 0 | 1 | 0 | −2 |
| 110 01010 | 0 | 1 | 2 | 1 |
| 110 01011 | 0 | 1 | 2 | −1 |
| 111 110 | 0 | −1 | 0 | 1 |
| 111 111 | 0 | −1 | 0 | −1 |
| ⋮ | ⋮ | ⋮ | ⋮ | ⋮ |
| 01011 01011 | 2 | −1 | 2 | −1 |

FIG. 21

158 FOURTH TABLE

| VARIABLE LENGTH CODEWORD | RUN | LEVEL |
|---|---|---|
| 1 s | 0 | 1 |
| 11 s | 0 | 1 |
| 011 s | 1 | 1 |
| 0100 s | 0 | 2 |
| 0101 s | 2 | 1 |
| 0010 1 s | 0 | 3 |
| 0011 1 s | 3 | 1 |
| 0011 0 s | 4 | 1 |
| 0001 10 s | 1 | 2 |
| 0001 11 s | 5 | 1 |
| 0001 01 s | 6 | 1 |
| 0001 00 s | 7 | 1 |
| 0000 110 s | 0 | 4 |
| 0000 100 s | 2 | 2 |
| 0000 111 s | 8 | 1 |
| 0000 101 s | 9 | 1 |
| 0010 0110 s | 0 | 5 |
| 0010 0001 s | 0 | 6 |
| 0010 0101 s | 1 | 3 |
| 0010 0100 s | 3 | 2 |
| 0010 0111 s | 10 | 1 |
| 0010 0011 s | 11 | 1 |
| 0010 0010 s | 12 | 1 |
| 0010 0000 s | 13 | 1 |
| 0000 0010 10 s | 0 | 7 |
| 0000 0011 00 s | 1 | 4 |
| 0000 0010 11 s | 2 | 3 |
| 0000 0011 11 s | 4 | 2 |
| 0000 0010 01 s | 5 | 2 |
| ⋮ | ⋮ | ⋮ |
| 0000 0000 0001 1010 s | 11 | 2 |
| 0000 0000 0001 1001 s | 12 | 2 |
| 0000 0000 0001 1000 s | 13 | 2 |
| 0000 0000 0001 0111 s | 14 | 2 |
| 0000 0000 0001 0110 s | 15 | 2 |
| 0000 0000 0001 0101 s | 16 | 2 |
| 0000 0000 0001 1111 s | 27 | 1 |
| 0000 0000 0001 1110 s | 28 | 1 |
| 0000 0000 0001 1101 s | 29 | 1 |
| 0000 0000 0001 1100 s | 30 | 1 |
| 0000 0000 0001 1011 s | 31 | 1 |

FIG. 31

MBT TABLE 811

| VLC FOR MBT | MB QUANT | MB FORWARD PREDICTION | MB BACKWARD PREDICTION | MB PATTERN | MB INTRA |
|---|---|---|---|---|---|
| 1 | 0 | 1 | 0 | 1 | 0 |
| 01 | 0 | 0 | 0 | 1 | 0 |
| 001 | 0 | 1 | 0 | 0 | 0 |
| 00011 | 0 | 0 | 0 | 0 | 1 |
| 00010 | 1 | 1 | 0 | 1 | 0 |
| 00001 | 1 | 0 | 0 | 1 | 0 |
| 000001 | 1 | 0 | 0 | 0 | 1 |

VARIABLE LENGTH CODE DECODING DEVICE, DIGITAL BROADCAST RECEIVING APPARATUS, AND DVD REPRODUCING APPARATUS

This application is based on an application No. H11-162113 filed in Japan, the content of which is hereby incorporated by reference.

BACKGROUND OF THE INVENTION

1. Field of the Invention

The present invention relates to a variable length code decoding device, digital broadcast receiving apparatus, and DVD reproducing apparatus for decoding a compressed code stream into original signals.

2. Description of the Prior Art

Technology for efficiently compressing and encoding images, represented by MPEG (Moving Picture Experts Group), has been increasingly explored in recent years.

FIG. 27 is a block diagram showing a conventional variable length code decoding device for decoding variable length codewords. In the figure, a bit stream buffer 1001 acquires a bit stream of an encoded moving image from an outside source and retains it. A bit string extracting unit 1002 extracts a bit string as long as the maximum variable length from the beginning of the bit stream in the bit stream buffer 1001, and outputs the extracted bit string to a bit length judging unit 1003. The bit length judging unit 1003 detects a codeword from the received bit string and calculates the bit length of the detected codeword. The bit length judging unit 1003 outputs the calculated bit length to a variable length code decoding unit 1004 and the bit string extracting unit 1002, and outputs the codeword to the variable length code decoding unit 1004. The bit string extracting unit 1002 shifts the bit string extract position by the received bit length. The variable length code decoding unit 1004 decodes the codeword in accordance with a variable length code table held therein, and so generates a run (the number of consecutive zero coefficients) and a level (the value of the immediately following non-zero coefficient). The variable length code decoding unit 1004 outputs the generated run and level respectively to an output controlling unit 1005 and an output selecting unit 1007. The output controlling unit 1005 controls the output selecting unit 1007. If the run is not 0, the output selecting unit 1007 selects the constant 0 outputted from a constant generating unit 1006 a number of times equivalent to the run, and then selects the level received from the variable length code decoding unit 1004. If the run is 0, the output selecting unit 1007 selects the level. A buffer 1008 stores values selected by the output selecting unit 1007. An inverse quantizing unit 1009 reads the values from the buffer 1008 and inverse quantizes them. As a result, a block of DCT (Discrete Cosine Transform) pixel values in a spatial frequency region is generated. Note that detecting one codeword from a bit string by the bit length judging unit 1003 is done according to a well known method described in "ISO/IEC 13818-2" ISO/IEC JTC1, published by ISO/IEC (May 31, 1995), so that its explanation has been omitted.

However, this variable length code decoding device has the following problem. Since variable length codewords are extracted and decoded one at a time, it takes long time to decode all of the codewords, which causes decreases in processing speed of the overall system. Although such decreases in processing speed could be avoided by increasing the system's operating frequency, this will incur increases in cost and power consumption of the system.

SUMMARY OF THE INVENTION

To overcome the above problem, the present invention aims to provide a variable length code decoding device, digital broadcast receiving apparatus, and DVD reproducing apparatus that can decode a greater number of variable length codewords within a fixed time period.

The above object can be fulfilled by a variable length code decoding device including: a code extracting unit for extracting two consecutive codewords from a compressed code stream that is made up of a sequence of variable length codewords; and a parallel decoding unit for decoding the extracted two codewords in parallel.

With the above construction, the variable length code decoding device extracts two codewords from a compressed code stream and decodes them in parallel, with it being possible to increase the number of variable length codewords which can be decoded in a fixed time period.

Here, the compressed code stream may include a plurality of codewords that have each been generated as a result of quantizing and entropy coding at least one signal, hereafter referred to as a signal set, which belongs to a block of signals each generated by applying orthogonal transform to image data, wherein the code extracting unit extracts the two consecutive codewords out of the plurality of codewords included in the compressed code stream, and wherein the parallel decoding unit includes: a code decoding unit for entropy decoding the extracted two codewords in parallel to generate two decoded words; and a signal reconstructing unit for performing inverse quantization with the two decoded words in parallel to reconstruct two original signal sets.

With the above construction, the compressed code stream contains codewords obtained by coding signals generated from image data. The two codewords extracted from this compressed code stream are entropy decoded in parallel to reconstruct original signals. In so doing, a greater number of variable length codewords can be decoded within a fixed time period.

Here, each codeword may have been generated by entropy coding a run-level pair that represents a quantized signal set, the run-level pair being made up of a run which is a number of zero signals in the quantized signal set and a level which is a value of an immediately following nonzero signal in the quantized signal set, wherein the code extracting unit extracts the two consecutive codewords as first and second codewords, and includes: a position storing unit for storing position information which specifies a position of the first codeword in the compressed code stream; a first extracting unit for extracting from the compressed code stream the first codeword located in the position specified by the position information, and calculating a length of the first codeword; and a second extracting unit for extracting from the compressed code stream the second codeword located in a position specified by a sum of the position information and the calculated length, wherein the code decoding unit entropy decodes the extracted first and second codewords to generate first and second run-level pairs as the two decoded words, and includes: a first decoding unit for entropy decoding the first codeword into the first run-level pair; and a second decoding unit for entropy decoding the second codeword into the second run-level pair, and wherein the signal reconstructing unit reconstructs the two original signal sets based on the first and second run-level pairs.

With the above construction, the two codewords are extracted from the compressed code stream in sequence and are entropy decoded in parallel into two run-level pairs.

Here, the first decoding unit may include: a first table having areas which each have an address no greater than a first predetermined length and store a run-level pair, the address being a codeword generated when entropy coding the run-level pair; a second table having areas which each have an address greater than the first predetermined length and store a unique value; a third table having a separate area for each of the areas in the second table, the area in the third table having an address equal to a value stored in the area in the second table and storing a run-level pair, where an address of the area in the second table is a codeword generated when entropy coding the run-level pair stored in the area in the third table; and a first decode controlling unit for when the first codeword is no greater than the first predetermined length, retrieving from the first table a run-level pair stored in an area whose address is the first codeword, and setting the retrieved run-level pair as the first run-level pair, and when the first codeword is greater than the first predetermined length, reading from the second table a value stored in an area whose address is the first codeword, retrieving from the third table a run-level pair stored in an area whose address is the read value, and setting the retrieved run-level pair as the first run-level pair.

With the above construction, a variable length code table in the first decoding unit has a bi-level structure made up of a fixed table (the first table) and an associative memory (the second and third tables). The size of such a variable length code table is smaller than a variable length code table structured as a single table.

Here, the second decoding unit may include: a fourth table having areas which each have an address no greater than the first predetermined length and store a run-level pair, the address being a codeword generated when entropy coding the run-level pair; a fifth table having areas which each have an address greater than the first predetermined length and store a unique value; a sixth table having a separate area for each of the areas in the fifth table, the area in the sixth table having an address equal to a value stored in the area in the fifth table and storing a run-level pair, where an address of the area in the fifth table is a codeword generated when entropy coding the run-level pair stored in the area in the sixth table; and a second decode controlling unit for when the second codeword is no greater than the first predetermined length, retrieving from the fourth table a run-level pair stored in an area whose address is the second codeword, and setting the retrieved run-level pair as the second run-level pair, and when the second codeword is greater than the first predetermined length, reading from the fifth table a value stored in an area whose address is the second codeword, retrieving from the sixth table a run-level pair stored in an area whose address is the read value, and setting the retrieved run-level pair as the second run-level pair.

With the above construction, a variable length code table in the second decoding unit has a bi-level structure made up of a fixed table (the fourth table) and an associative memory (the fifth and sixth tables). The size of such a variable length code table is smaller than a variable length code table structured as a single table.

Here, the second extracting unit may extract a codeword generated by entropy coding a run-level pair whose run is 0, as the second codeword, wherein the second decoding unit includes: a seventh table having areas which each have an address and store a level of a run-level pair whose run is 0, the address being a codeword generated when entropy coding the run-level pair; and a second decode controlling unit for retrieving from the seventh table a level stored in an area whose address is the second codeword, and pairing the retrieved level with a run being 0 to generate the second run-level pair.

With the above construction, a variable length code table (the seventh table) which relates only to codewords corresponding to run-level pairs whose runs are 0 is provided in the second decoding unit. Accordingly, if any codeword and a codeword generated from a run-level pair whose run is 0 are adjacent in the compressed code stream, these two codewords can be decoded in parallel by means of the first and second decoding units. Also, the size of the variable length code table in the second decoding unit can be reduced.

Here, the second extracting unit may extract a codeword no greater than a second predetermined length as the second codeword, wherein the second decoding unit includes: an eighth table having areas which each have an address no greater than the second predetermined length and store a run-level pair, the address being a codeword generated when entropy coding the run-level pair; and a second decode controlling unit for retrieving from the eighth table a run-level pair stored in an area whose address is the second codeword, and setting the retrieved run-level pair as the second run-level pair.

With the above construction, a variable length code table (the eighth table) which relates only to short codewords (no greater than the second predetermined length) is provided in the second decoding unit. Accordingly, if any codeword and a short codeword are adjacent in the compressed code stream, these two codewords can be decoded in parallel by means of the first and second decoding units. Also, the size of the variable length code table in the second decoding unit can be reduced.

Here, the signal reconstructing unit may include: a first address calculating unit for calculating, based on the first run-level pair generated by the first decoding unit, a first address showing a location of a level of the first run-level pair within a block; a second address calculating unit for calculating, based on the second run-level pair generated by the second decoding unit, a second address showing a location of a level of the second run-level pair within the block; a first inverse quantizing unit for inverse quantizing the level of the first run-level pair using the calculated first address, to generate a first coefficient; a second inverse quantizing unit for inverse quantizing the level of the second run-level pair using the calculated second address, to generate a second coefficient; and a reconstructing unit for reconstructing the two original signal sets using a combination of the first address and the first coefficient and a combination of the second address and the second coefficient.

With the above construction, address calculation and inverse quantization for one run-level pair are carried out in parallel with address calculation and inverse quantization for the other run-level pair, which accelerates computations of the overall inverse quantization.

Here, the reconstructing unit may include: a coefficient storing unit for storing address-coefficient pairs; a coefficient writing unit for writing the combination of the first address and the first coefficient and the combination of the second address and the second coefficient into the coefficient storing unit as two address-coefficient pairs; a block storing unit having areas each of which has an address and initially stores a zero value; a block writing unit for sequentially reading the two address-coefficient pairs from the coefficient storing unit, and writing a coefficient of each of the read address-coefficient pairs into an area in the block storing unit specified by an address of the address-coefficient pair; and a signal generating unit for reading values from part of the areas in the block storing unit and generating the two original signal sets from the read values.

With the above construction, generated signals can be written into a buffer independently of the processing of an external unit which reads out the signals.

Here, the coefficient storing unit may have areas each of which is given a flag being initially OFF and is used for storing an address-coefficient pair, wherein the coefficient writing unit writes the two address-coefficient pairs into respective areas in the coefficient storing unit whose flags are OFF, and then turns the flags ON, and the block writing unit sequentially reads the address-coefficient pairs from the areas with the ON flags in the coefficient storing unit, and, having read the address-coefficient pairs, turns the flags OFF.

Here, the areas in the block storing unit may each be given a flag which is initially OFF, wherein the block writing unit, having written the coefficient into the area in the block storing unit specified by the address, turns a flag of the area ON, and the signal generating unit, having generated the two original signal sets, turns ON flags in the block storing unit OFF.

With the above construction, the need for writing 0 into every area to delete its storage content is negated.

Here, the variable length code decoding device may further include a selection accepting unit for accepting a selection between decoding of a first compressed code stream and decoding of first and second compressed code streams, the first compressed code stream being the compressed code stream and the second compressed code stream being another compressed code stream made up of a sequence of variable length codewords, the second compressed code stream including a plurality of codewords that have each been generated as a result of quantizing and entropy coding a signal set which belongs to a block of signals each generated by applying orthogonal transform to image data, wherein the code extracting unit (a) extracts the two consecutive codewords from the first compressed code stream in a first case where the decoding of the first compressed code stream is selected, and (b) extracts two codewords respectively from the first and second compressed code streams in a second case where the decoding of the first and second compressed code streams is selected, and wherein the code decoding unit entropy decodes the extracted two codewords in parallel.

With the above construction, the variable length code decoding device can selectively perform the decoding of a single compressed code stream and the decoding of two compressed code streams. In the decoding of the single compressed code stream, two codewords are extracted from the compressed code stream and entropy decoded in parallel to reconstruct original signals, so that a greater number of variable length codewords can be decoded within a fixed time period.

Here, the code extracting unit may extract, as first and second codewords, the two consecutive codewords from the first compressed code stream in the first case and the two codewords respectively from the first and second compressed code streams in the second case, and include: a position storing unit for storing first position information and second position information, the first position information specifying a position of the first codeword in the first compressed code stream, and the second position information specifying a position of the second codeword in the second compressed code stream; a first extracting unit for extracting from the first compressed code stream the first codeword located in the position specified by the first position information, and calculating a length of the first codeword; and a second extracting unit for (a) in the first case extracting from the first compressed code stream the second codeword located in a position specified by a sum of the first position information and the calculated length, and (b) in the second case extracting from the second compressed code stream the second codeword located in the position specified by the second position information, and wherein the code decoding unit entropy decodes the extracted first and second codewords to generate two decoded words.

With the above construction, in the decoding of the single compressed code stream the two codewords are extracted in sequence, whereas in the decoding of the two compressed code streams two codewords are extracted respectively from the two compressed code streams.

Here, each codeword may have been generated by entropy coding a run-level pair that represents a quantized signal set, the run-level pair being made up of a run which is a number of zero signals in the quantized signal set and a level which is a value of an immediately following nonzero signal in the quantized signal set, wherein the code decoding unit entropy decodes the first and second codewords to generate first and second run-level pairs as the two decoded words, and includes: a first decoding unit for entropy decoding the first codeword into the first run-level pair; and a second decoding unit for entropy decoding the second codeword into the second run-level pair, and wherein the signal reconstructing unit reconstructs two original signal sets based on the first and second run-level pairs.

With the above construction, in the decoding of the single compressed code stream, the extracted two codewords are entropy decoded in parallel into two run-level pairs, and original signals are reconstructed from the generated run-level pairs. Accordingly, the number of variable length codewords which can be decoded in a fixed time period is increased. In the decoding of the two compressed code streams, on the other hand, the extracted two codewords are entropy decoded separately into two run-level pairs, and original signals are reconstructed from the generated run-level pairs.

Here, the signal reconstructing unit may include: a first address calculating unit for calculating, based on the first run-level pair generated by the first decoding unit, a first address showing a location of a level of the first run-level pair within a block; a second address calculating unit for calculating, based on the second run-level pair generated by the second decoding unit, a second address showing a location of a level of the second run-level pair within a block; a first inverse quantizing unit for inverse quantizing the level of the first run-level pair using the calculated first address, to generate a first coefficient; a second inverse quantizing unit for inverse quantizing the level of the second run-level pair using the calculated second address, to generate a second coefficient; and a reconstructing unit for reconstructing the two original signal sets using a combination of the first address and the first coefficient and a combination of the second address and the second coefficient.

With the above construction, in the decoding of the single compressed code stream, address calculation and inverse quantization for one run-level pair are carried out in parallel with address calculation and inverse quantization for the other run-level pair, which increases computations for the overall inverse quantization. In the decoding of the two compressed code streams, on the other hand, address calculation and inverse quantization for one run-level pair are carried out independently of address calculation and inverse quantization for the other run-level pair.

Here, the reconstructing unit may include: a first coefficient storing unit for storing address-coefficient pairs; a second coefficient storing unit for storing address-coefficient pairs; a coefficient writing unit for (a) in the first case writing the combination of the first address and the first coefficient and the combination of the second address and the second coefficient into the first coefficient storing unit as two address-coefficient pairs, and (b) in the second case writing the combination of the first address and the first coefficient into the first coefficient storing unit as an address-coefficient pair, and writing the combination of the second address and the second coefficient into the second coefficient storing unit as an address-coefficient pair; a first block storing unit having areas each of which has an address and initially stores a zero value; a second block storing unit having areas each of which has an address and initially stores a zero value; a block writing unit for (a) in the first case sequentially reading the two address-coefficient pairs from the first coefficient storing unit and writing a coefficient of each of the read address-coefficient pairs into an area in the first block storing unit specified by an address of the address-coefficient pair, and (b) in the second case reading the address-coefficient pair from the first coefficient storing unit and writing a coefficient of the read address-coefficient pair into an area in the first block storing unit specified by an address of the address-coefficient pair, and reading the address-coefficient pair from the second coefficient storing unit and writing a coefficient of the read address-coefficient pair into an area in the second block storing unit specified by an address of the address-coefficient pair; and a signal generating unit for (a) in the first case reading values from part of the areas in the first block storing unit and generating the two original signal sets from the read values, and (b) in the second case reading values from part of the areas in the first block storing unit and from part of the areas in the second block storing unit, and generating the two original signal sets from the read values.

With the above construction, in both the decoding of the single compressed code stream and the decoding of the two compressed code streams, generated signals can be written into at least one buffer independently of the processing of an external unit which reads out the signals.

Here, the compressed code stream may include a plurality of codewords that have each been generated as a result of quantizing and entropy coding at least one signal, hereafter referred to as a signal set, which belongs to a block of signals each generated by applying orthogonal transform to image data, wherein the code extracting unit extracts the two consecutive codewords out of the plurality of codewords included in the compressed code stream, the two consecutive codewords each being no greater than a third predetermined length, and wherein the parallel decoding unit includes: a code decoding unit for entropy decoding the extracted two codewords in parallel with reference to a code table, to generate two decoded words; and a signal reconstructing unit for performing inverse quantization with the two decoded codes in parallel to reconstruct two original signal sets.

With the above construction, when two short codewords (no greater than the third predetermined length) are adjacent in a compressed code stream that contains variable length codewords obtained by coding signals generated from image data, these two codewords are extracted from the compressed code stream and entropy decoded in parallel to reconstruct original signals. Accordingly, more variable length codewords can be decoded within a fixed time period.

Here, each codeword may have been generated by entropy coding a run-level pair that represents a quantized signal set, the run-level pair being made up of a run which is a number of zero signals in the quantized signal set and a level which is a value of an immediately following nonzero signal in the quantized signal set, wherein the code extracting unit extracts the two consecutive codewords as first and second codewords, and includes: a position storing unit for storing position information which specifies a position of the first codeword in the compressed code stream; and an extracting unit for extracting from the compressed code stream the first codeword located in the position specified by the position information, calculating a length of the first codeword, and extracting from the compressed code stream the second codeword located in a position specified by a sum of the position information and the calculated length, wherein the code decoding unit entropy decodes the extracted first and second codewords to generate first and second run-level pairs as the two decoded words, and includes: a ninth table having areas which each have an address obtained by concatenating two codewords each being no greater than the third predetermined length and store two run-level pairs, the former codeword being generated when entropy coding the former run-level pair, and the latter codeword being generated when entropy coding the latter run-level pair; and a decode controlling unit for retrieving from the ninth table two run-level pairs stored in an area whose address is a result of concatenating the first and second codewords in the stated order, and setting the retrieved former and latter run-level pairs respectively as the first and second run-level pairs, and wherein the signal reconstructing unit reconstructs the two original signal sets based on the first and second run-level pairs.

With the above construction, the two short codewords extracted from the compressed code stream are entropy decoded in parallel into two run-level pairs with reference to a code table (the ninth table), and the original signals are reconstructed from the generated run-level pairs.

Here, the signal reconstructing unit may include: a first address calculating unit for calculating, based on the first run-level pair generated by the code decoding unit, a first address showing a location of a level of the first run-level pair within a block; a second address calculating unit for calculating, based on the second run-level pair generated by the code decoding unit, a second address showing a location of a level of the second run-level pair within the block; a first inverse quantizing unit for inverse quantizing the level of the first run-level pair using the calculated first address, to generate a first coefficient; a second inverse quantizing unit for inverse quantizing the level of the second run-level pair using the calculated second address, to generate a second coefficient; and a reconstructing unit for reconstructing the two original signal sets using a combination of the first address and the first coefficient and a combination of the second address and the second coefficient.

With the above construction, address calculation and inverse quantization for one run-level pair are carried out in parallel with address calculation and inverse quantization for the other run-level pair, which accelerates computations for the overall inverse quantization.

Here, the reconstructing unit may include: a coefficient storing unit for storing address-coefficient pairs; a coefficient writing unit for writing the combination of the first address and the first coefficient and the combination of the second address and the second coefficient into the coefficient storing unit as two address-coefficient pairs; a block storing unit having areas each of which has an address and initially stores a zero value; a block writing unit for sequentially reading the two address-coefficient pairs from the coefficient storing unit and writing a coefficient of each of the read address-coefficient pairs into an area in the block storing unit specified by an address of the address-coefficient pair; and a signal generating unit for reading values from part of the areas in the block storing unit and generating the two original signal sets from the read values.

With the above construction, generated signals can be written into a buffer independently of the processing of an external unit IEIS. which reads out the signals.

Here, the compressed code stream may include coded control information elements that have been respectively generated as a result of entropy coding control information elements of at least two different types, the control information elements being used to control decoding of image data, wherein the code extracting unit extracts two consecutive coded control information elements from the compressed code stream as the two consecutive codewords, and wherein the parallel decoding unit includes a code decoding unit for entropy decoding the extracted two coded control information elements in parallel to generate two original control information elements.

With the above construction, a compressed code stream includes coded control information elements obtained by respectively coding control information elements of at least two different types. Two coded control information elements are extracted from this compressed code stream and are entropy decoded in parallel to reconstruct original control information elements, with it being possible to increase the number of variable length codewords which can be decoded in a fixed time period.

Here, the code extracting unit may extract the two consecutive coded control information elements as first and second codewords, and include: a position storing unit for storing position information which specifies a position of the first codeword in the compressed code stream; a first extracting unit for extracting from the compressed code stream the first codeword located in the position specified by the position information, and calculating a length of the first codeword; and a second extracting unit for extracting from the compressed code stream the second codeword located in a position specified by a sum of the position information and the calculated length, wherein the code decoding unit entropy decodes the first and second codewords to generate first and second control information elements as the two original control information elements, and includes: a first decoding unit for entropy decoding the first codeword into the first control information element; and a second decoding unit for entropy decoding the second codeword into the second control information element.

With the above construction, the two coded control information elements are extracted in sequence from the compressed code stream and entropy decoded in parallel into the original control information elements.

Here, the first decoding unit may include: a first control information table that has an address and stores codewords and control information elements corresponding to the codewords; a first address table that has a first address area storing the address of the first control information table; a first pointer holding unit for holding a first pointer which specifies the first address area in the first address table; and a first decode controlling unit for retrieving the address from the first address area in the first address table specified by the first pointer, detecting a control information element corresponding to the first codeword from the first control information table shown by the retrieved address, and setting the detected control information element as the first control information element.

Here, the second decoding unit may include: a second control information table that has an address and stores codewords and control information elements corresponding to the codewords; a second address table that has a second address area storing the address of the second control information table; a second pointer holding unit for holding a second pointer which specifies the second address area in the second address table; and a second decode controlling unit for retrieving the address from the second address area in the second address table specified by the second pointer, detecting a control information element corresponding to the second codeword from the second control information table shown by the retrieved address, and setting the detected control information element as the second control information element.

With the above construction, code tables (the first and second control information tables) for decoding the two coded control information elements can be specified by the respective pointers.

The above object can also be fulfilled by a digital broadcast receiving apparatus for decoding a compressed code stream included in a received digital broadcast wave to reproduce image data, including: a code extracting unit for extracting two consecutive codewords from the compressed code stream that is made up of a sequence of variable length codewords; and a parallel decoding unit for decoding the extracted two codewords in parallel.

With the above construction, the digital broadcast receiving apparatus extracts two codewords from a compressed code stream transmitted on a digital broadcast wave and decodes them in parallel. Accordingly, a greater number of variable length codewords can be decoded within a fixed time period.

The above object can also be fulfilled by a DVD (Digital Versatile Disk) reproducing apparatus for decoding a compressed code stream recorded on a DVD to reproduce image data, including: a code extracting unit for extracting two consecutive codewords from the compressed code stream that is made up of a sequence of variable length codewords; and a parallel decoding unit for decoding the extracted two codewords in parallel.

With the above construction, the DVD reproducing apparatus extracts two codewords from a compressed code stream recorded on a DVD and decodes them in parallel. Accordingly, a greater number of variable length codewords can be decoded within a fixed time period.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 5 shows a conversion table for the scan sequence shown in FIG. 4;

FIG. 7 shows an example of a quantization table;

FIGS. 15A–15C are block diagrams which together show the construction of a variable length code decoding device according to the second embodiment of the invention;

FIG. 20 shows the structure of a third table held in the first decoding unit shown in FIG. 19;

FIG. 21 shows the structure of a fourth table held in the first decoding unit shown in FIG. 19;

FIG. 31 shows an example of an MBT table held in the first decoding unit in FIG. 30;

DESCRIPTION OF THE PREFERRED EMBODIMENT(S)

1. First Embodiment

The following is a description of a variable length code decoding device 10 according to the first embodiment of the invention.

1.1. Construction of the Variable Length Code Decoding Device 10

Figure 1:
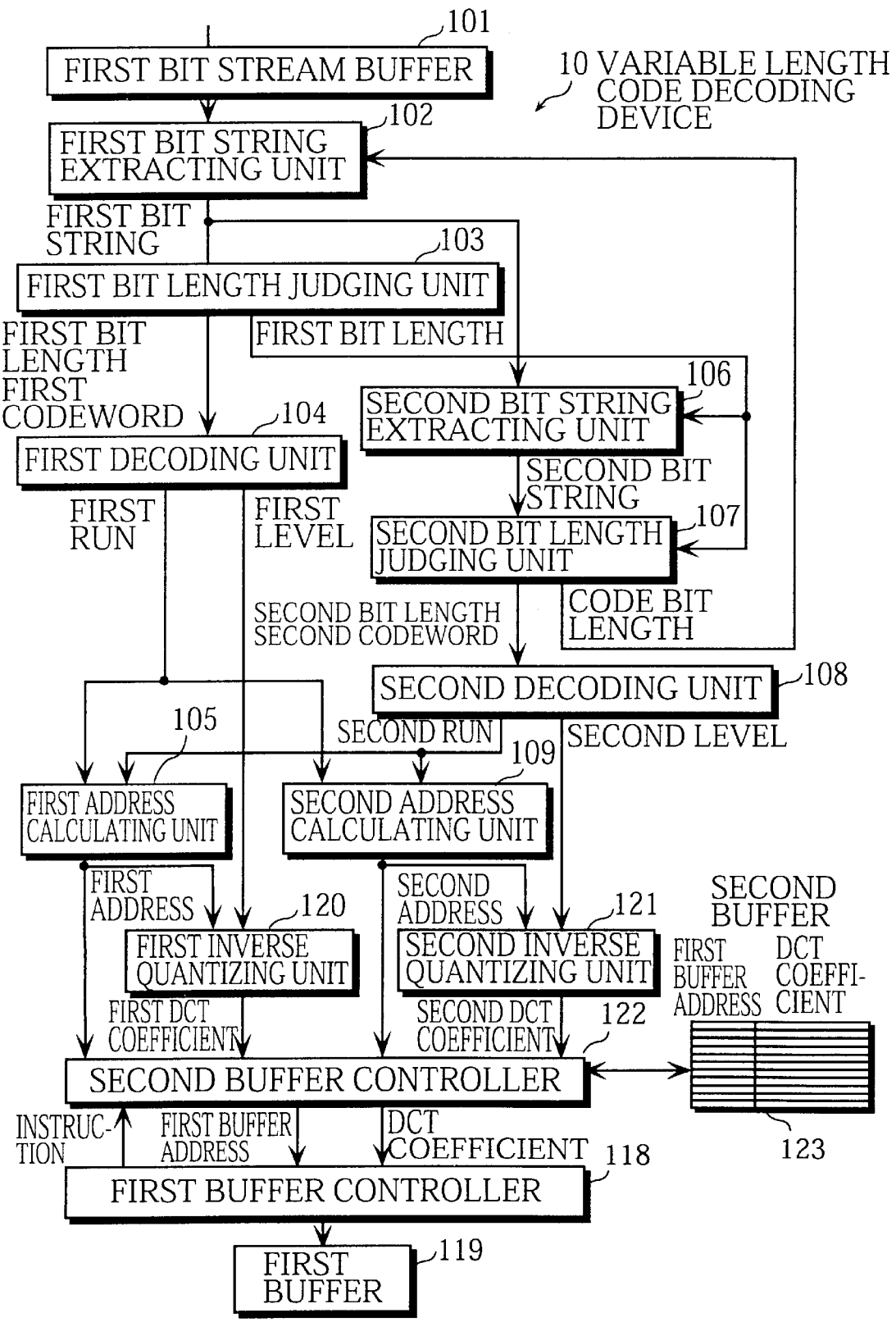
FIG. 1 is a block diagram showing the construction of a variable length code decoding device according to the first embodiment of the invention.

FIG. 1 is a block diagram showing the construction of the variable length code decoding device 10.

The variable length code decoding device 10 is roughly made up of a first bit stream buffer 101, a first bit string extracting unit 102, a first bit length judging unit 103, a first decoding unit 104, a first address calculating unit 105, a second bit string extracting unit 106, a second bit length judging unit 107, a second decoding unit 108, a second address calculating unit 109, a first buffer controller 118, a first buffer 119, a first inverse quantizing unit 120, a second inverse quantizing unit 121, a second buffer controller 122, and a second buffer 123.

1.1.1. First Bit Stream Buffer 101

The first bit stream buffer 101 is connected to an optical disk device and repeatedly reads 4096 bytes of data from an optical disk medium storing a bit stream of MPEG compressed moving images. The first bit stream buffer 101 stores the read 4096-byte bit stream.

Alternatively, supposing a bit stream of MPEG compressed moving images is broadcasted through a digital broadcast wave, then the first bit stream buffer 101 receives the digital broadcast wave, retrieves a bit stream of 4096 bytes from the digital broadcast wave, and stores the retrieved bit stream.

1.1.2. First Bit String Extracting Unit 102

The first bit string extracting unit 102 holds a bit string extract position, expressed in bits, that specifies a bit position from the first bit of the bit stream stored in the first bit stream buffer 101.

The first bit string extracting unit 102 extracts from the bit stream stored in the first bit stream buffer 101 a bit string of 48 bits starting from the bit position specified by the bit string extract position, and sets the extracted bit string as a first bit string. The first bit string extracting unit 102 outputs the first bit string to the first bit length judging unit 103 and the second bit string extracting unit 106.

The first bit string extracting unit 102 repeats this extraction of a bit string of 48 bits, until all bits of the 4096-byte bit stream are extracted from the first bit stream buffer 101.

Here, the length of the first bit string has been set to be double the maximum variable length so that at least two codewords are included in the first bit string. Since the maximum variable length is 24 bits, the length of the first bit string has been set to be 48 bits in this embodiment.

The bit string extract position is initially set at 0, indicating the first bit of the bit stream stored in the first bit stream buffer 101. Subsequently, whenever receiving a code bit length from the second bit length judging unit 107, the first bit string extracting unit 102 adds the code bit length to the bit string extract position and sets the addition result as the next bit string extract position.

1.1.3. First Bit Length Judging Unit 103

The first bit length judging unit 103 receives the 48-bit first bit string from the first bit string extracting unit 102, detects a codeword from the beginning of the first bit string as a first codeword, and calculates the bit length of the first codeword as a first bit length. Here, the first codeword is any codeword generated as a result of encoding image information (i.e. run-level pair).

The first bit length judging unit 103 outputs the calculated first bit length to the first decoding unit 104, the second bit string extracting unit 106, and the second bit length judging unit 107, and outputs the first codeword to the first decoding unit 104.

Detecting a codeword from the first bit string is done in accordance with the well known method mentioned above, so that its explanation has been omitted here.

1.1.4. First Decoding Unit 104

Figure 2:
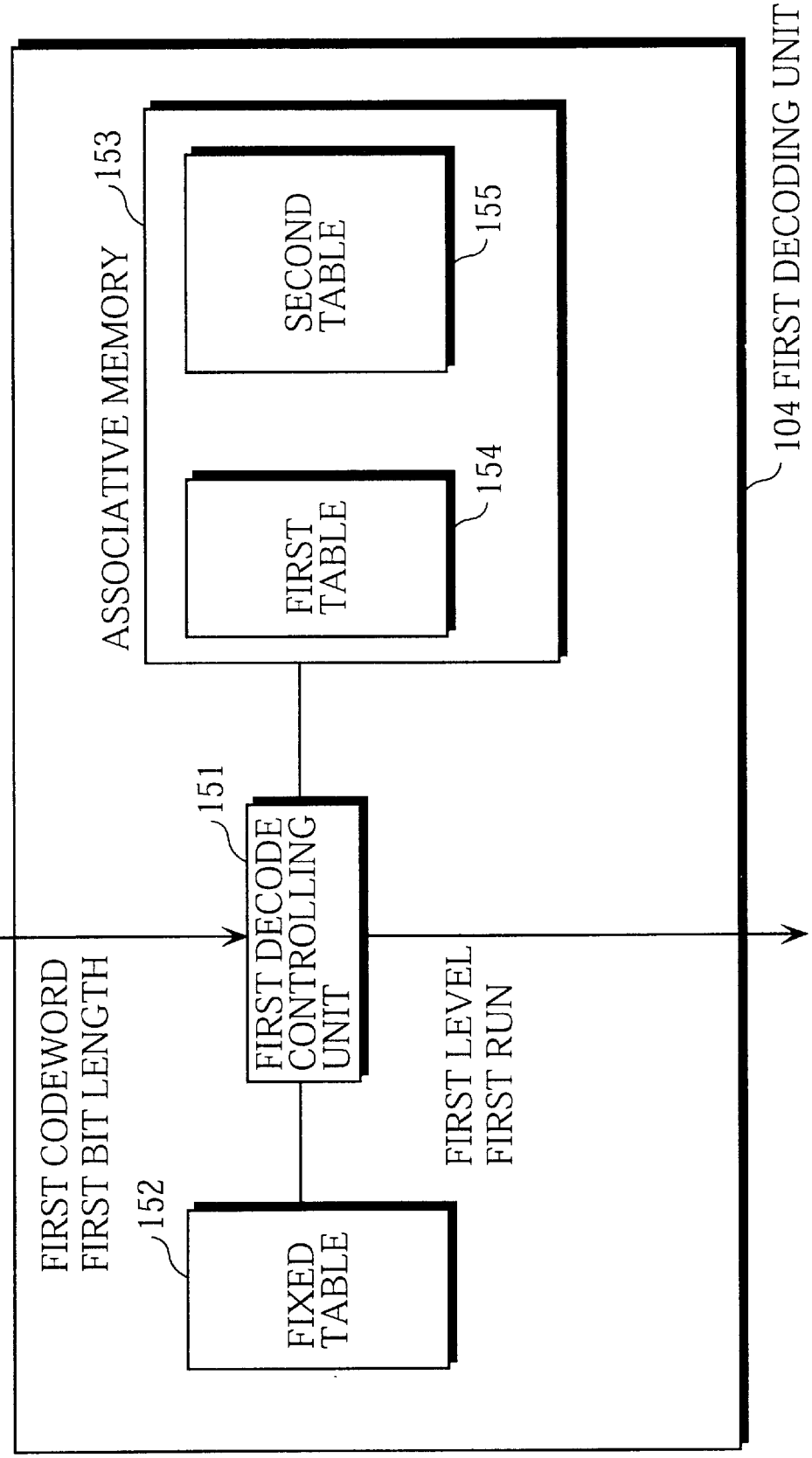
FIG. 2 is a block diagram showing the construction of a first decoding unit in the variable length code decoding device in FIG. 1.

The first decoding unit 104 is mainly made up of a first decode controlling unit 151, a fixed table 152, and an associative memory 153 including a first table 154 and a second table 155, as shown in FIG. 2.

(1) Fixed Table 152

Figure 3:
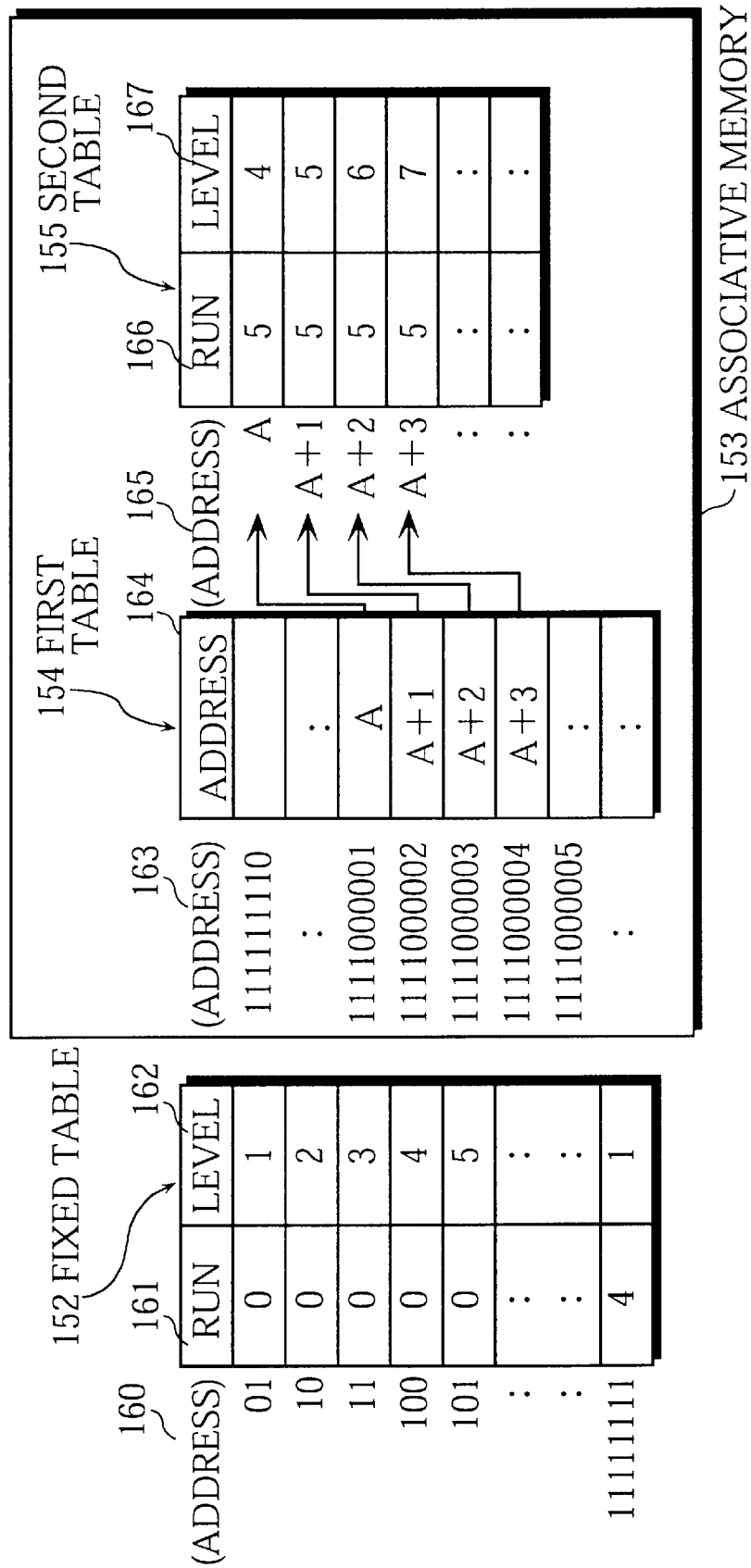
FIG. 3 shows the structures of tables held in the first decoding unit in FIG. 2.

The fixed table 152 is a data table having a plurality of areas which each store a pair of run 161 and level 162, as shown in FIG. 3. Each of the areas is given an address 160 no greater than 8 bits. Each address 160 is a variable length codeword generated when encoding a pair of run 161 and level 162 stored in an area shown by the address 160.

(2) First Table 154

The first table 154 is a data table having a plurality of areas which each store an address 164, as shown in FIG. 3. The addresses 164 are identical respectively to addresses of areas in the second table 155. Each of the areas in the first table 154 is given an address 163 which is at least 9 bits long but no greater than 24 bits.

(3) Second Table 155

The second table 155 is a data table having a plurality of areas each of which stores a pair of run 166 and level 167 and has an address 165, as shown in FIG. 3.

The number of areas in the first table 154 is equal to the number of areas in the second table 155. Also, there is a one-to-one correspondence between the areas in the first table 154 and the areas in the second table 155.

Which is to say, an address 163 of an area in the first table 154 is a variable length codeword obtained when encoding a pair of run 166 and level 167 stored in an area in the second table 155 whose address 165 is identical to an address 164 stored in the area in the first table 154.

(4) First Decode Controlling Unit 151

The first decode controlling unit 151 receives the first bit length and the first codeword from the first bit length judging unit 103 and judges whether the first bit length is no greater than 8 bits.

If the first bit length is no greater than 8 bits, the first decode controlling unit 151 retrieves from the fixed table 152 a pair of run 161 and level 162 stored in an area whose address 160 is the first codeword. This pair of run 161 and level 162 is a run-level pair obtained when decoding the first codeword. Next, the first decode controlling unit 151 outputs the run 161 to the first address calculating unit 105 and the second address calculating unit 109 as a first run, and outputs the level 162 to the first inverse quantizing unit 120 as a first level.

If the first bit length is greater than 8 bits, on the other hand, the first decode controlling unit 151 retrieves from the first table 154 an address 164 stored in an area whose address 163 is the first codeword. The first decode controlling unit 151 then searches the second table 155 for an address 165 identical to the retrieved address 164, and retrieves a pair of run 166 and level 167 stored in an area shown by the address 165. This pair of run 166 and level 167 is a run-level pair obtained when decoding the first codeword. The first decode controlling unit 151 outputs the run 166 to the first address calculating unit 105 and the second address calculating unit 109 as the first run, and outputs the level 167 to the first inverse quantizing unit 120 as the first level.

1.1.5. Second Bit String Extracting Unit 106

The second bit string extracting unit 106 receives the 48-bit first bit string from the first bit string extracting unit 102 and the first bit length from the first bit length judging unit 103.

The second bit string extracting unit 106 then removes a bit string as long as the first bit length from the beginning of the first bit string, and outputs the remaining bit string to the second bit length judging unit 107 as a second bit string.

1.1.6. Second Bit Length Judging Unit 107

Having received the second bit string from the second bit string extracting unit 106, the second bit length judging unit 107 detects a codeword from the beginning of the second bit string as a second codeword, and calculates the bit length of the second codeword as a second bit length. Here, the second codeword is any codeword generated when encoding image information (i.e. run-level pair).

Also, having received the first bit length from the first bit length judging unit 103, the second bit length judging unit 107 adds the first bit length and the second bit length to obtain a code bit length that is the total length of the first and second codewords, and outputs the code bit length to the first bit string extracting unit 102.

The second bit length judging unit 107 also outputs the second bit length and the second codeword to the second decoding unit 108.

Detecting a codeword from the second bit string is done in accordance with the well known method mentioned above.

1.1.7. Second Decoding Unit 108

The second decoding unit 108 has the same construction as the first decoding unit 104.

The second decoding unit 108 receives the second bit length and the second codeword from the second bit length judging unit 107, decodes the second codeword in the same manner as the first decoding unit 104, and so obtains a second run-level pair.

The second decoding unit 108 then outputs the second run to the first address calculating unit 10S and the second address calculating unit 109, and the second level to the second inverse quantizing unit 121.

1.1.8. First Address Calculating Unit 105

The first address calculating unit 105 receives the first run and the second run respectively from the first decoding unit 104 and the second decoding unit 108.

The first address calculating unit 105 stores the received first and second runs, together with the order in which they were received in decode processing of the present block.

The first address calculating unit 105 then calculates a coordinate value T of a location of the first level within the present block according to Equation 1, and outputs the calculated coordinate value to the first inverse quantizing unit 120 and the second buffer controller 122 as a first address.

Here, the block is made up of 64 components, i.e. 8 components wide by 8 components high. A coordinate value of a location of each component within the block is counted left-to-right in each row, from the top row to the bottom row. That is to say, the coordinate value of the top left component within the block is 0, the coordinate value of the next component (the second left component in the top row) is 1, and the coordinate values of the subsequent components increase by 1.

Equation 1 is the following:

$$T = Zig\left(\sum_{i=2}^{n}(Ri+1)\right) \quad (i \geq 2)$$
$$T = 0 \quad (i = 1)$$

where T is the coordinate value of the location of the first level in the present block, Zig( ) is a function of converting the zig-zag scan order into the left-to-right, top-to-bottom order, Ri is a first run or a second run received by the first address calculating unit 105 from the first decoding unit 104 or the second decoding unit 108 at the "i"th decode operation in the present block decode processing, and n is the total number of decode operations performed by the first decoding unit 104 and the second decoding unit 108 in the present block decode processing before the first address calculating unit 105 receives the first run paired with the first level in question.

Figure 4:
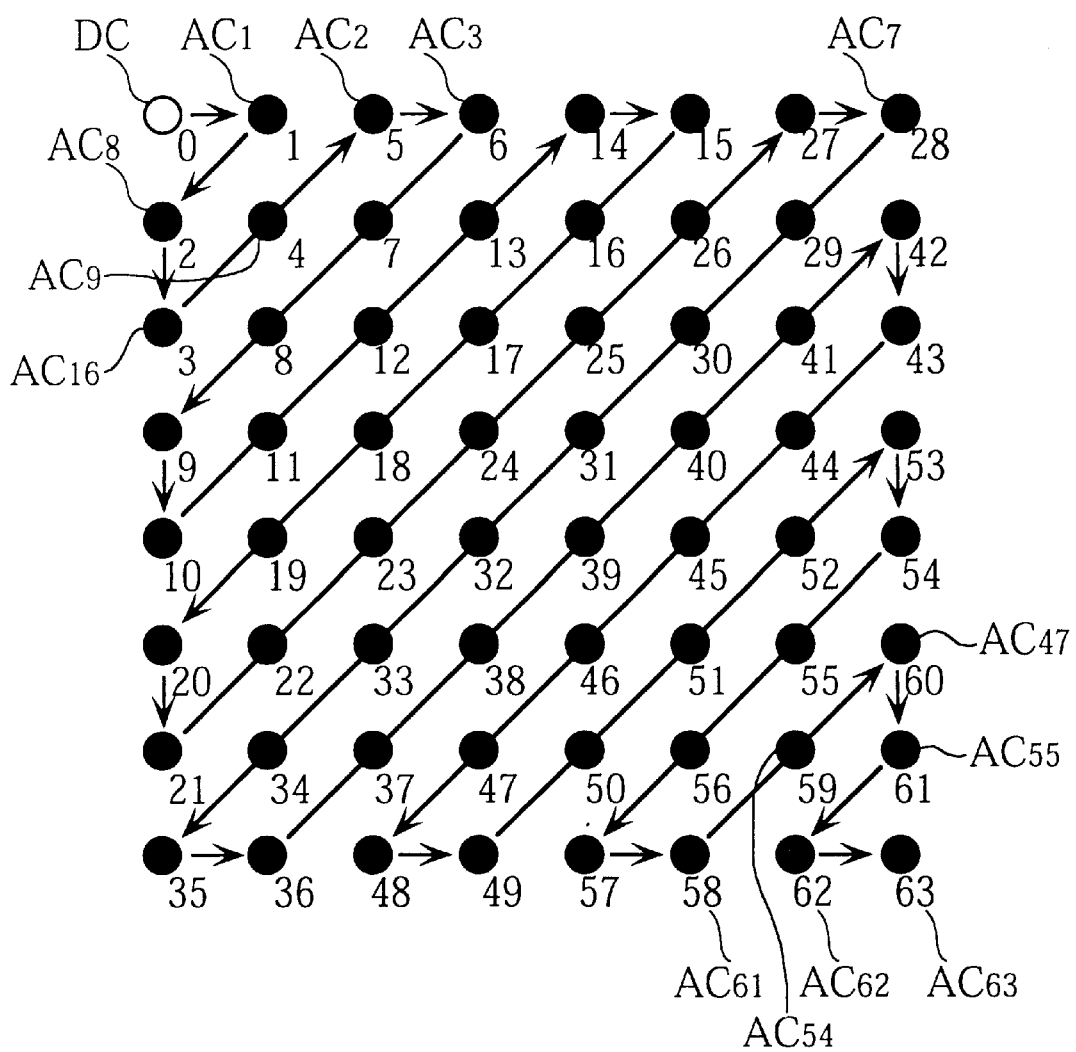
FIG. 4 shows a scan sequence for components of one block.

FIG. 4 shows the sequence of the zig-zag scan. In the figure, 64 circles represent 64 components of a block. The numbers given at the bottom right of the circles, together with the illustrated arrows, indicate the sequence of the zig-zag scan. As illustrated, the zig-zag scan proceeds in the order of DC, AC1, AC8, AC16, AC9, . . . , AC61, AC54, AC47, AC55, AC62, and AC63.

Figure 5:
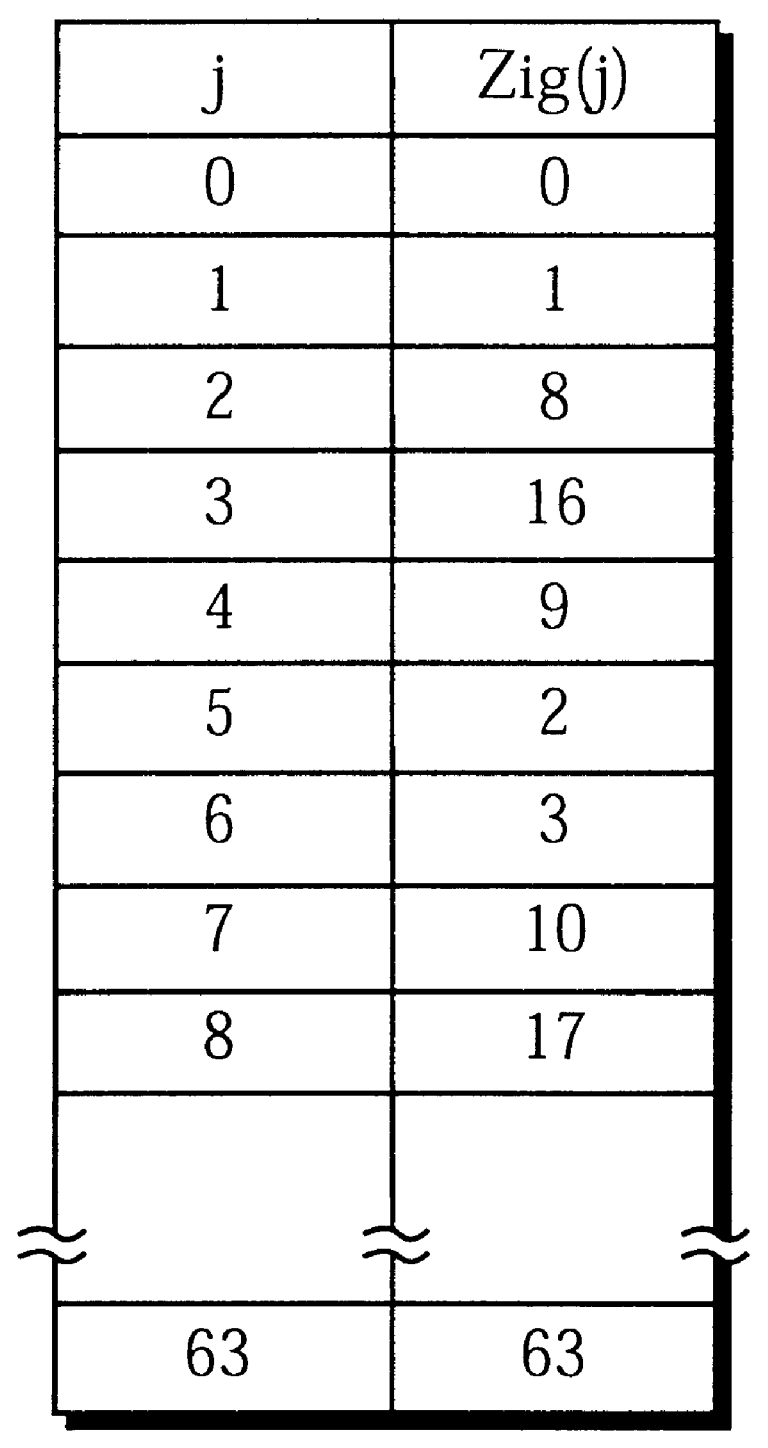

FIG. 5 shows a table presenting the correspondence between a coordinate value j of a component within a block and a zig-zag function Zig(j) which shows the component's turn in the zig-zag scan, where the coordinate value j is given in the left-to-right, top-to-bottom order.

Figure 6:
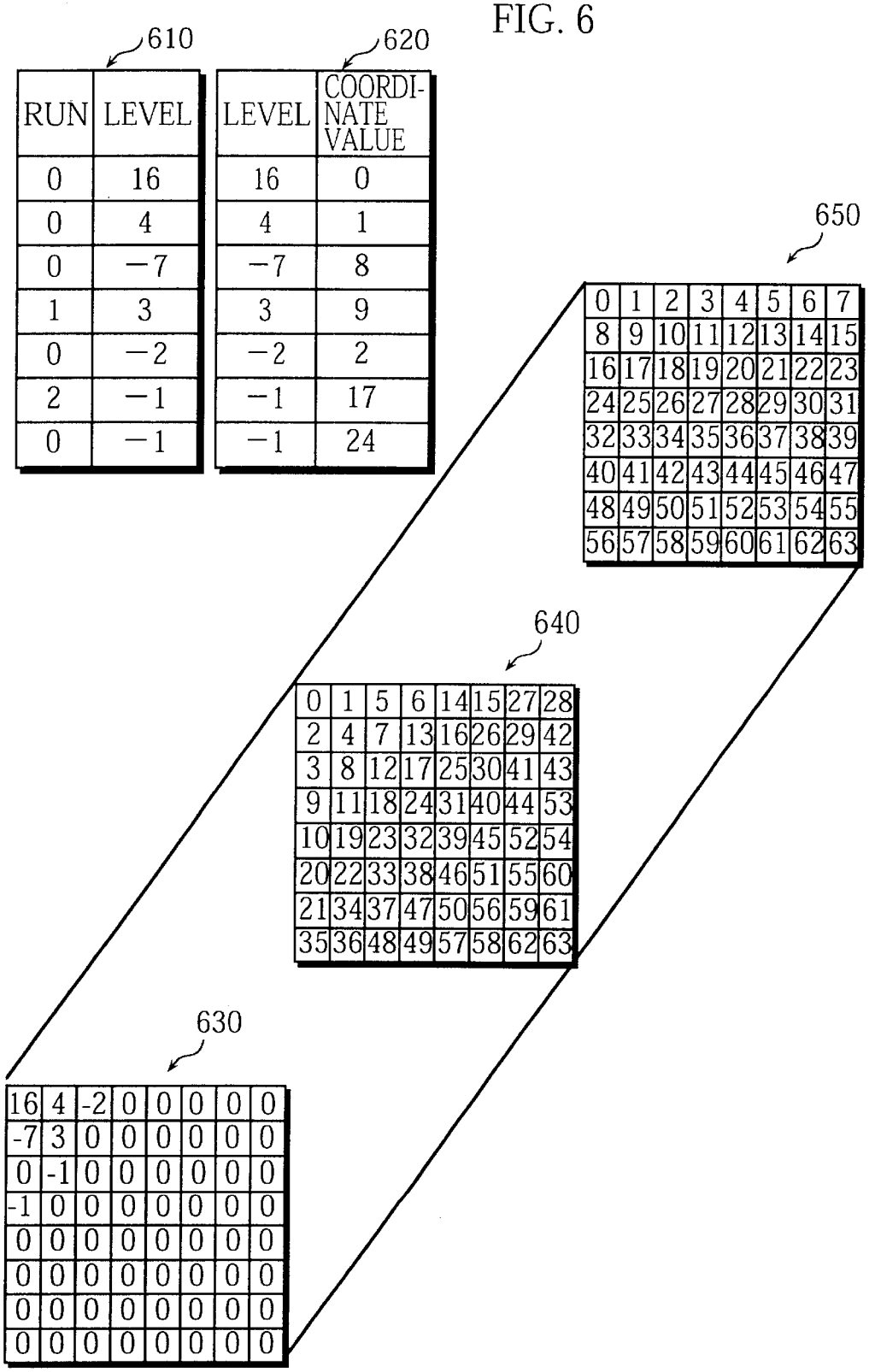
FIG. 6 shows an example of decoded runs and levels.

In FIG. 6, table 610 shows an example of seven run-level pairs which have been generated as a result of decoding seven codewords by the first and second decoding units 104 and 108 in the block decode processing.

Table 650 shows coordinate values of locations of components within the block in the left-to-right, top-to-bottom order, whereas table 640 shows the zig-zag scan sequence of the components within the block.

Table 620 shows coordinate values calculated for the respective seven levels according to Equation 1.

Table 630 shows the seven levels and a plurality of zero coefficients within the block. In this table, the seven levels are located in the block at their respective coordinate values.

1.1.9. Second Address Calculating Unit 109

The second address calculating unit 109 receives the first run and the second run respectively from the first decoding unit 104 and the second decoding unit 108.

The second address calculating unit 109 then calculates a coordinate value of a location of the second level within the present block according to Equation 1, in the same manner as the first address calculating unit 105.

The second address calculating unit 109 outputs the calculated coordinate value to the second inverse quantizing unit 121 and the second buffer controller 122 as a second address.

1.1.10. First Inverse Quantizing Unit 120

The first inverse quantizing unit 120 receives the first level and the first address respectively from the first decoding unit 104 and the first address calculating unit 105.

The first inverse quantizing unit 120 has a quantization table 700 shown in FIG. 7. This quantization table 700 is made up of 64 (8×8) coefficients Quv.

The first inverse quantizing unit 120 retrieves a coefficient Quv located at the received first address from the quantization table 700, and calculates a first DCT coefficient according to Equation 2:

(first DCT coefficient)=(first level)×(coefficient Quv at first address)

The first inverse quantizing unit 120 then outputs the first DCT coefficient to the second buffer controller 122.

Note that DCT is a kind of orthogonal transform.

1.1.11. Second Inverse Quantizing Unit 121

The second inverse quantizing unit 121 receives the second level and the second address respectively from the second decoding unit 108 and the second address calculating unit 109.

The second inverse quantizing unit 121 holds the quantization table 700 shown in FIG. 7, as with the first inverse quantizing unit 120.

The second inverse quantizing unit 121 retrieves a coefficient Quv located at the received second address from the quantization table 700, and calculates a second DCT coefficient according to Equation 3:

(second DCT coefficient)=(second level)×(coefficient Quv at second address)

The second inverse quantizing unit 121 then outputs the second DCT coefficient to the second buffer controller 122.

Here, the second inverse quantizing unit 121 may reference the quantization table 700 held in the first inverse quantizing unit 120, rather than holding the table by itself.

1.1.12. Second Buffer 123

The second buffer 123 is a data buffer having 64 areas each for storing a pair of first buffer address and DCT coefficient.

The total capacity of the second buffer 123 is 160 bytes, 64 bytes of which are used for storing first buffer addresses and 96 bytes of which are used for storing DCT coefficients.

1.1.13. Second Buffer Controller 122

The second buffer controller 122 receives the first address and the first DCT coefficient respectively from the first address calculating unit 105 and the first inverse quantizing unit 120, and writes the received first address and first DCT coefficient into the first unoccupied area in the second buffer 123 as a pair of first buffer address and DCT coefficient.

Also, the second buffer controller 122 receives the second address and the second DCT coefficient respectively from the second address calculating unit 109 and the second inverse quantizing unit 121, and writes the received second address and second DCT coefficient into the next unoccupied area in the second buffer 123 as a pair of first buffer address and DCT coefficient.

When instructed by the first buffer controller 118, the second buffer controller 122 sequentially reads all pairs of first buffer addresses and DCT coefficients beginning with the start of the second buffer 123, and outputs them one by one to the first buffer controller 118.

Once all pairs of first buffer addresses and DCT coefficients have been read from the second buffer 123 and outputted to the first buffer controller 118, the second buffer controller 122 deletes the entire content of the second buffer 123.

Here, the second buffer controller 122 is capable of simultaneously receiving the pair of first address and first DCT coefficient and the pair of second address and second DCT coefficient. Hence the first inverse quantizing unit 120 does not have to wait for the output of the second inverse quantizing unit 121 to complete before outputting the first DCT coefficient to the second buffer controller 122, and vice versa.

1.1.14. First Buffer 119

The first buffer 119 is a data buffer having 64 areas each for storing a DCT coefficient.

Since a DCT coefficient is 12 bits long, the total capacity of the first buffer 119 is 96 bytes.

The first buffer 119 is connected to an external unit that reads DCT coefficients from the first buffer 119.

1.1.15. First Buffer Controller 118

The first buffer controller 118 writes 0 into every area in the first buffer 119, as soon as the entire content of the first buffer 119 is read by the external unit in the preceding block decode processing and the present block decode processing begins.

After this, the first buffer controller 118 instructs the second buffer controller 122 to output the pairs of first buffer addresses and DCT coefficients stored in the second buffer 123.

On sequentially receiving the pairs of first buffer addresses and DCT coefficients from the second buffer controller 122, for each pair of first buffer address and DCT coefficient the first buffer controller 118 writes the DCT coefficient into an area in the first buffer 119 specified by the first buffer address.

1.2. Operation of the Variable Length Code Decoding Device 10

The operation of the variable length code decoding device 10 is explained below.

1.2.1. General Operation of the Variable Length Code Decoding

Device 10

First, the general operation of the variable length code decoding device 10 is explained below with reference to FIG. 8.

In the following explanation, the first bit string extracting unit 102, the first bit length judging unit 103, the first decoding unit 104, the first address calculating unit 105, and the first inverse quantizing unit 120 are collectively called the first system, and the second bit string extracting unit 106, the second bit length judging unit 107, the second decoding unit 108, the second address calculating unit 109, and the second inverse quantizing unit 121 are collectively called the second system, for the sake of convenience.

(1) Operation of the First System

The first bit string extracting unit 102 extracts from the first bit stream buffer 101 a bit string of 48 bits starting from a bit position specified by the bit string extract position, sets the extracted bit string as a first bit string, and outputs the first bit string to the first bit length judging unit 103 (S701) and to the second bit string extracting unit 106 (S706).

Having received the 48-bit first bit string from the first bit string extracting unit 102, the first bit length judging unit 103 detects a codeword from the beginning of the first bit string as a first codeword, and calculates the bit length of the first codeword as a first bit length. The first bit length judging unit 103 outputs the first bit length and the first codeword to the first decoding unit 104 (S702), and outputs the first bit length to the second bit string extracting unit 106 (S707) and to the second bit length judging unit 107 (S708).

On receiving the first bit length and the first codeword from the first bit length judging unit 103, the first decode controlling unit 151 in the first decoding unit 104 decodes the first codeword into a first run-level pair, outputs the first run to the first address calculating unit 105 and the second address calculating unit 109, and outputs the first level to the first inverse quantizing unit 120 (S703).

The first address calculating unit 105 calculates a coordinate value of a location of the first level within the present block, and outputs the coordinate value to the first inverse quantizing unit 120 and the second buffer controller 122 as a first address (S704).

The first inverse quantizing unit 120 calculates a first DCT coefficient using the received first level and first address with reference to the quantization table 700 (S705), and outputs the first DCT coefficient to the second buffer controller 122 (S709).

(2) Operation of the Second System

The second bit string extracting unit 106 receives the 48-bit first bit string from the first bit string extracting unit 102 (S706), receives the first bit length from the first bit length judging unit 103 (S707), removes a bit string as long as the first bit length from the beginning of the first bit string, and outputs the remaining bit string to the second bit length judging unit 107 as a second bit string (S721).

The second bit length judging unit 107 receives the first bit length from the first bit length judging unit 103 (S708) and the second bit string from the second bit string extracting unit 106. The second bit length judging unit 107 detects a codeword from the beginning of the second bit string as a second codeword, calculates the bit length of the second codeword as a second bit length, and outputs the second bit length and the second codeword to the second decoding unit 108 (S722). The second bit length judging unit 107 further calculates a code bit length from the first bit length and the second bit length and outputs the code bit length to the first bit string extracting unit 102 (S726). The first bit string extracting unit 102 accordingly adds the code bit length to the bit string extract position to renew the bit string extract position.

On receiving the second bit length and the second codeword from the second bit length judging unit 107, the second decoding unit 108 decodes the second codeword into a second run-level pair, outputs the second run to the first address calculating unit 105 and the second address calculating unit 109, and outputs the second level to the second inverse quantizing unit 121 (S723).

The second address calculating unit 109 receives the first run and the second run respectively from the first decoding unit 104 and the second decoding unit 108, calculates a coordinate value of a location of the second level within the present block, and outputs the coordinate value to the second inverse quantizing unit 121 and the second buffer controller 122 as a second address (S724).

The second inverse quantizing unit 121 receives the second level and the second address respectively from the second decoding unit 108 and the second address calculating unit 109, calculates a second DCT coefficient with reference to the quantization table 700 (S725), and outputs the second DCT coefficient to the second buffer controller 122 (S727).

(3) Operation of the Second Buffer Controller 122

The second buffer controller 122 receives the first address and the first DCT coefficient respectively from the first address calculating unit 105 and the first inverse quantizing unit 120 (S709), and the second address and the second DCT coefficient respectively from the second address calculating unit 109 and the second inverse quantizing unit 121 (S727). The second buffer controller 122 writes the first address and the first DCT coefficient into the first unoccupied area in the second buffer 123 as a pair of first buffer address and DCT coefficient, and writes the second address and the second DCT coefficient into the next unoccupied area in the second buffer 123 as a pair of first buffer address and DCT coefficient (S741).

When instructed by the first buffer controller 118 (S765), the second buffer controller 122 reads a pair of first buffer address and DCT coefficient beginning with the start of the second buffer 123 (S742) and outputs it to the first buffer controller 118 (S743). Steps S742 and S743 are repeated until all pairs of first buffer addresses and DCT coefficients are read from the second buffer 123 and outputted to the first buffer controller 118 (S744).

Following this, the second buffer controller 122 deletes the entire content of the second buffer 123 (S745).

(4) Operation of the First Buffer Controller 118

The first buffer controller 118 writes 0 into every area in the first buffer 119, once the external unit has read the entire content of the first buffer 119 in the preceding block decode processing and the present block decode processing has begun (S761).

The first buffer controller 118 then instructs the second buffer controller 122 to output all pairs of first buffer addresses and DCT coefficients stored in the second buffer 123 (S762).

The first buffer controller 118 receives a pair of first buffer address and DCT coefficient from the second buffer controller 122 (S743) and writes the DCT coefficient into an area in the first buffer 119 shown by the first buffer address (S763).

Steps S743 and S763 are repeated until the first buffer controller 118 receives all pairs of first buffer addresses and DCT coefficients and writes the DCT coefficients into the first buffer 119 (S764).

1.2.2. Operation of the First Bit String Extracting Unit 102

Figure 9:
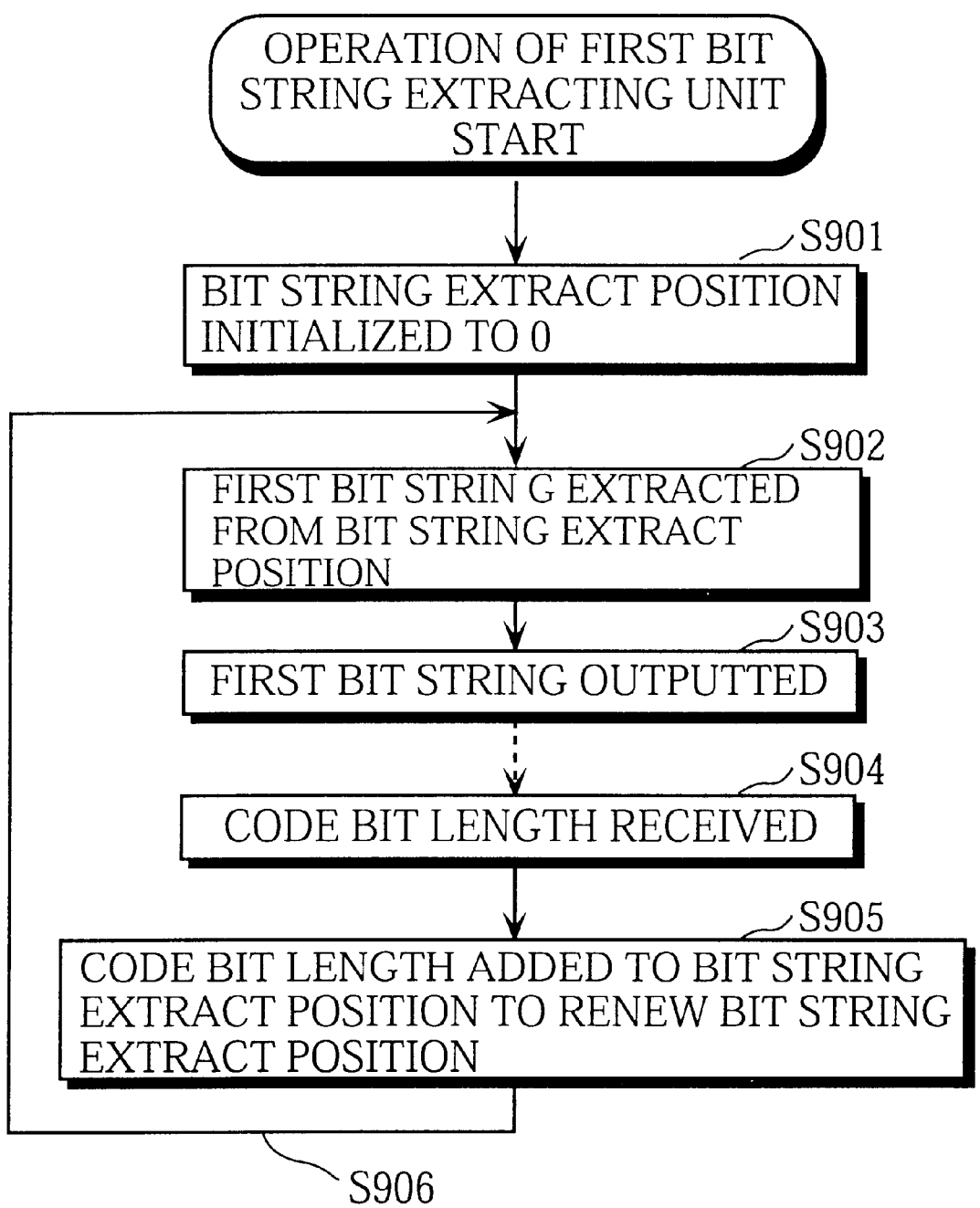
FIG. 9 is a flowchart showing the operation of a first bit string extracting unit in the variable length code decoding device in FIG. 1.

The detailed operation of the first bit string extracting unit 102 is explained below with reference to FIG. 9.

The first bit string extracting unit 102 initializes the bit string extract position to 0 (S901).

The first bit string extracting unit 102 extracts from the bit stream stored in the first bit stream buffer 101 a bit string of 48 bits starting from a bit position specified by the bit string extract position, and sets the extracted bit string as a first bit string (S902). The first bit string extracting unit 102 then outputs the first bit string to the first bit length judging unit 103 and the second bit string extracting unit 106 (S903).

Also, the first bit string extracting unit 102 receives a code bit length from the second bit length judging unit 107 (S904), adds the code bit length to the bit string extract position, and sets the addition result as a new bit string extract position (S905).

The first bit string extracting unit 102 repeats steps S902–S905 until all 4096 bytes of the bit stream are extracted from the first bit stream buffer 101 (S906).

1.2.3. Operation of the First Bit Length Judaina Unit 103

Figure 10:
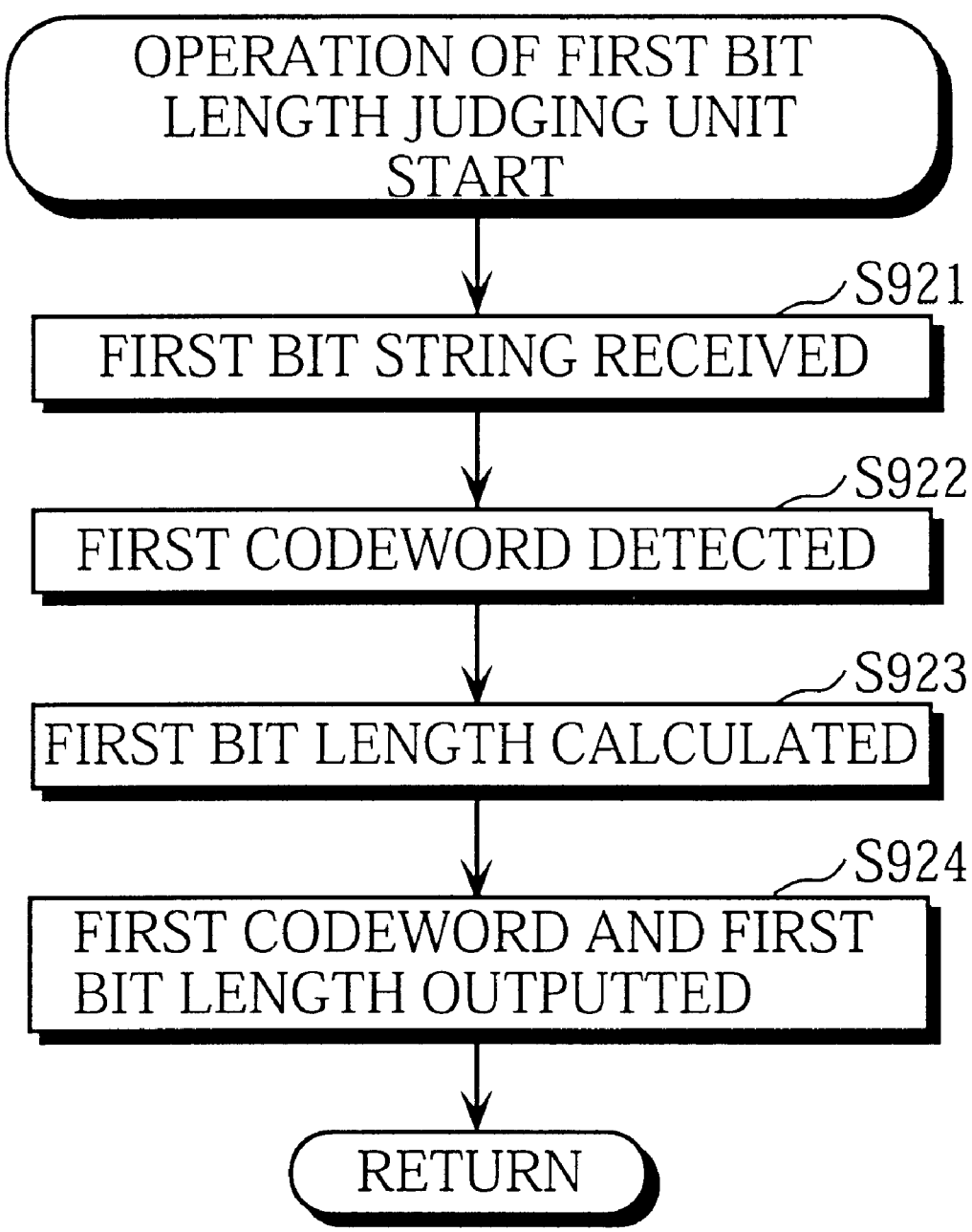
FIG. 10 is a flowchart showing the operation of a first bit length judging unit in the variable length code decoding device in FIG. 1.

The detailed operation of the first bit length judging unit 103 is explained below with reference to FIG. 10.

The first bit length judging unit 103 receives the 48-bit first bit string from the first bit string extracting unit 102 (S921), detects a codeword from the beginning of the first bit string as a first codeword (S922), and calculates the bit length of the first codeword as a first bit length (S923). The first bit length judging unit 103 then outputs the first bit length to the first decoding unit 104, the second bit string extracting unit 106, and the second bit length judging unit 107, and outputs the first codeword to the first decoding unit 104 (S924).

1.2.4. Operation of the First Decode Controlling Unit 151 in the First Decoding Unit 104

The detailed operation of the first decode controlling unit 151 in the first decoding unit 104 is explained below with reference to FIG. 11.

The first decode controlling unit 151 receives the first bit length and the first codeword from the first bit length judging unit 103 (S941) and judges whether the first bit length is no greater than 8 bits (S942). If the first bit length is no greater than 8 bits, the first decode controlling unit 151 retrieves from the fixed table 152 a pair of run 161 and level 162 stored in an area whose address 160 is the first codeword (S942). The first decode controlling unit 151 then outputs the run 161 to the first address calculating unit 105 and the second address calculating unit 109 as a first run, and outputs the level 162 to the first inverse quantizing unit 120 as a first level (S944).

If the first bit length is greater than 8 bits in step S942, the first decode controlling unit 151 first reads from the first table 154 an address 164 stored in an area whose address 163 is the first codeword (S945), and then retrieves from the second table 155 a pair of run 166 and level 167 stored in an area whose address 165 is the read address 164 (S946). The first decode controlling unit 151 outputs the run 166 to the first address calculating unit 105 and the second address calculating unit 109 as the first run, and outputs the level 167 to the first inverse quantizing unit 120 as the first level (S947).

1.2.5. Operation of the First Address Calculatina Unit 105

Figure 12:
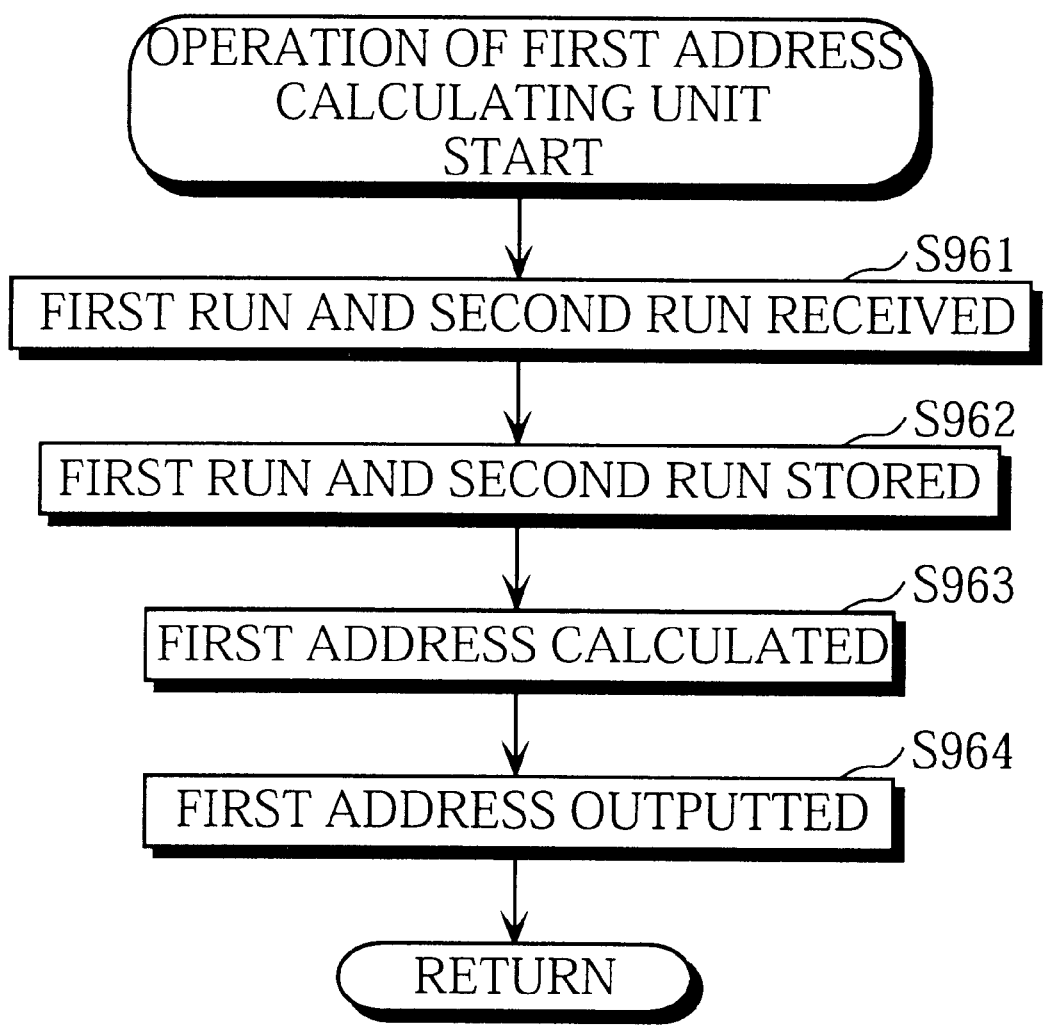
FIG. 12 is a flowchart showing the operation of a first address calculating unit in the variable length code decoding device in FIG. 1.

The detailed operation of the first address calculating unit 105 is explained below with reference to FIG. 12.

The first address calculating unit 105 receives the first run and the second run respectively from the first decoding unit 104 and the second decoding unit 108 (S961), and stores the received first run and second run together with the order in which they were received in the present block decode processing (S962). The first address calculating unit 105 calculates as a first address a coordinate value of a location of the first level within the block according to Equation 1 (S963), and outputs the first address to the first inverse quantizing unit 120 and the second buffer controller 122 (S964).

1.2.6. Operation of the First Inverse Quantizing Unit 120

Figure 13:
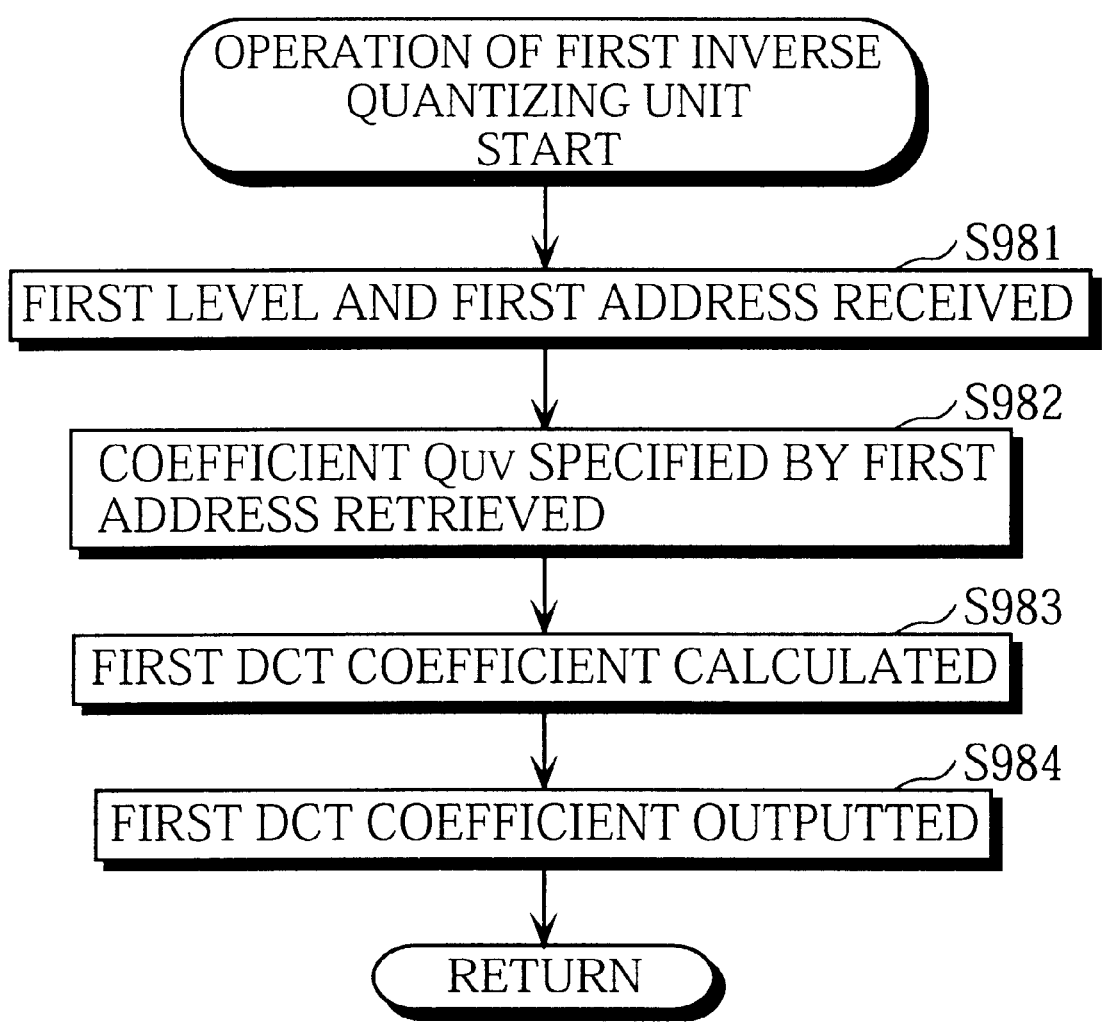
FIG. 13 is a flowchart showing the operation of a first inverse quantizing unit in the variable length code decoding device in FIG. 1.

The detailed operation of the first inverse quantizing unit 120 is explained below with reference to FIG. 13.

The first inverse quantizing unit 120 receives the first USA-; level and the first address respectively from the first decoding unit 104 and the first address calculating unit 105 (S981), retrieves from the quantization table 700 a coefficient Quv located at the first address (S982), and calculates a first DCT coefficient according to Equation 2 (S983). The first inverse quantizing unit 120 outputs the first DCT coefficient to the second buffer controller 122 (S984).

1.2.7. Operations of the Other Construction Elements in the Variable Length Code Decoding Device 10

The detailed operations of the second bit string extracting unit 106, the second bit length judging unit 107, the second decoding unit 100, the second address calculating unit 109, and the second inverse quantizing unit 121 are analogous respectively to those of the first bit string extracting unit 102, the first bit length judging unit 103, the first decoding unit 104, the first address calculating unit 105, and the first inverse quantizing unit 120, so that their explanation has been omitted.

Figure 14:
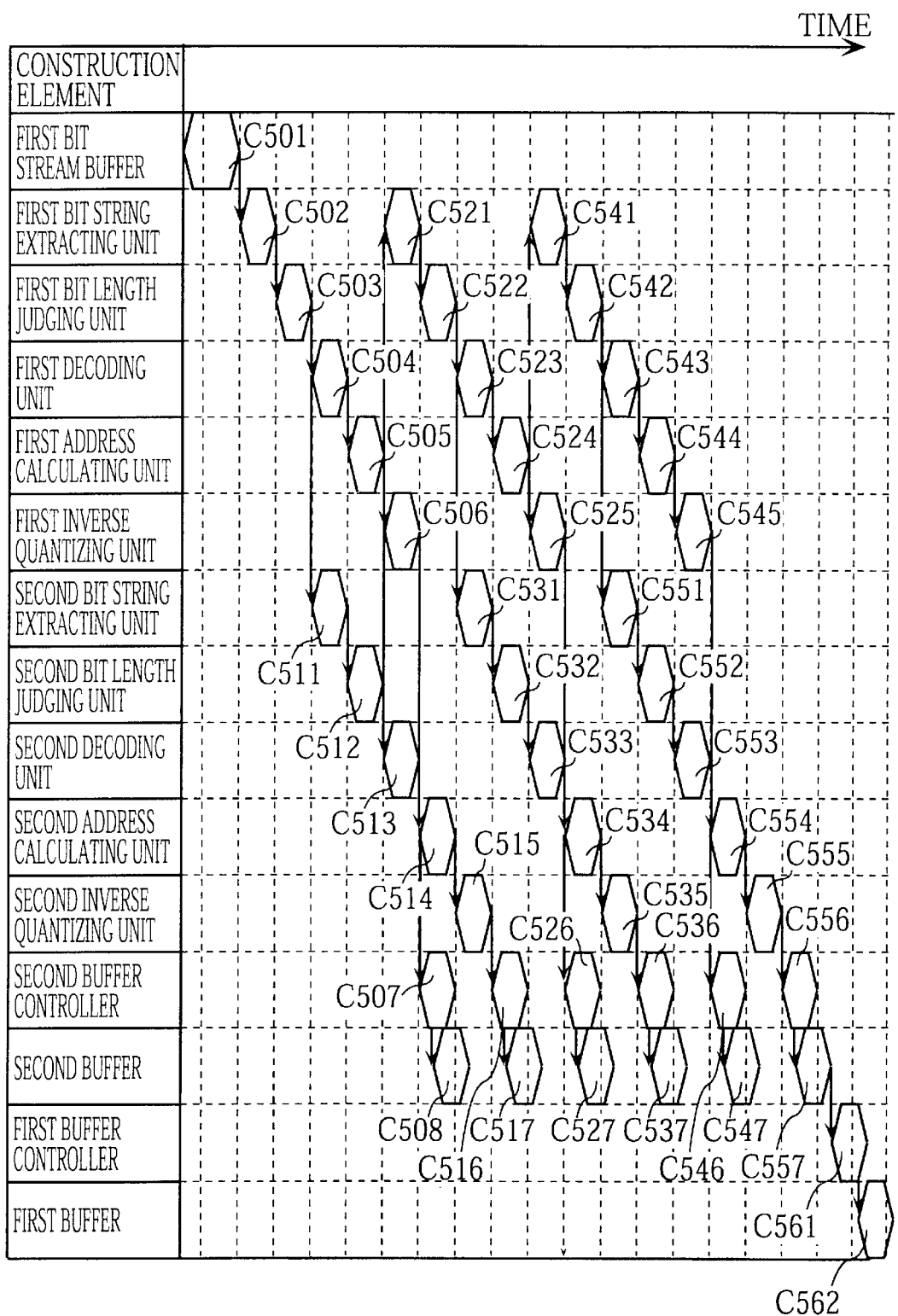
FIG. 14 is a time chart showing the progress of the operation of each construction element in the variable length code decoding device in FIG. 1.

1.3. Progress of the Operation of the Variable Length Code Decoding Device 10 Over Time FIG. 14 is a time chart showing the progress of the operation of each construction element in the variable length code decoding device 10 in decoding of each codeword.

In the figure, the vertical axis lists the names of the construction elements such as the first bit stream buffer 101, the first bit string extracting unit 102, the first bit length judging unit 103, the first decoding unit 104, the first address calculating unit 10S, the first inverse quantizing unit 120, the second bit string extracting unit 106, the second bit length judging unit 107, the second decoding unit 108, the second address calculating unit 109, the second inverse quantizing unit 121, the second buffer controller 122, the second buffer 123, the first buffer controller 118, and the first buffer 119, whereas the horizontal axis represents the progress of the operations of these construction elements over time.

In this time chart, process C501 is performed by the first bit stream buffer 101. Processes C502–C508 are performed respectively by the first bit string extracting unit 102, the first bit length judging unit 103, the first decoding unit 104, the first address calculating unit 105, the first inverse quantizing unit 120, the second buffer controller 122, and the second buffer 123. The same holds for processes C521–C527 and processes C541–C547. Meanwhile, processes C511–C517 are performed respectively by the second bit string extracting unit 106, the second bit length judging unit 107, the second decoding unit 108, the second address calculating unit 109, the second inverse quantizing unit 121, the second buffer controller 122, and the second buffer 123. The same holds for processes C531–C537 and processes C551–C557. Processes C561 and C562 are performed respectively by the first buffer controller 118 and the first buffer 119.

Note that time represented in the horizontal axis is not absolute time.

As can be seen from the figure, after process C501, processes C502–C508 are carried out in this order. Also, after process C503, processes C511–C517 are carried out in this order. Next, after process C512, processes C521–C527 are carried out in this order. Once the subsequent processes have been carried out in the similar fashion and process C557 has ended, processes C561 and C562 are executed in this order.

1.4. Conclusion

Thus, the variable length code decoding device 10 is provided with two systems each of which includes a decoding unit, an address calculating unit, and an inverse quantizing unit. Accordingly, when compared with a conventional variable length code decoding device that has only a decoding unit, an address calculating unit, and an inverse quantizing unit, the variable length code decoding device 10 can decode more variable length codewords within a fixed time period, which facilitates decoding of large-scale images.

Also, the variable length code table held in the first decoding unit or the second decoding unit is given a bi-level structure made up of a fixed table and an associative memory, so that the table size can be reduced as compared to the case where the variable length code table is realized as a signal table.

Also, the variable length code decoding device 10 includes the second buffer 123 and the second buffer controller 122 that is capable of simultaneously receiving a pair of first address and first DCT coefficient and a pair of second address and second DCT coefficient. Accordingly, the first inverse quantizing unit 120 can output the first DCT coefficient to the second buffer controller 122 without waiting for the output of the second inverse quantizing unit 121 to complete, and vice versa.

Also, the variable length code decoding device 10 includes the first buffer 119 and the first buffer controller 118 that can write decoded DCT coefficients into the first buffer 119 independently of the processing speed and timing of the external unit to which the variable length code decoding device 10 is connected.

2. Second Embodiment

The following is a description of a variable length code decoding device 20 according to the second embodiment of the invention.

2.1. Construction of the Variable Length Code Decoding Device 20

Figure 15A:
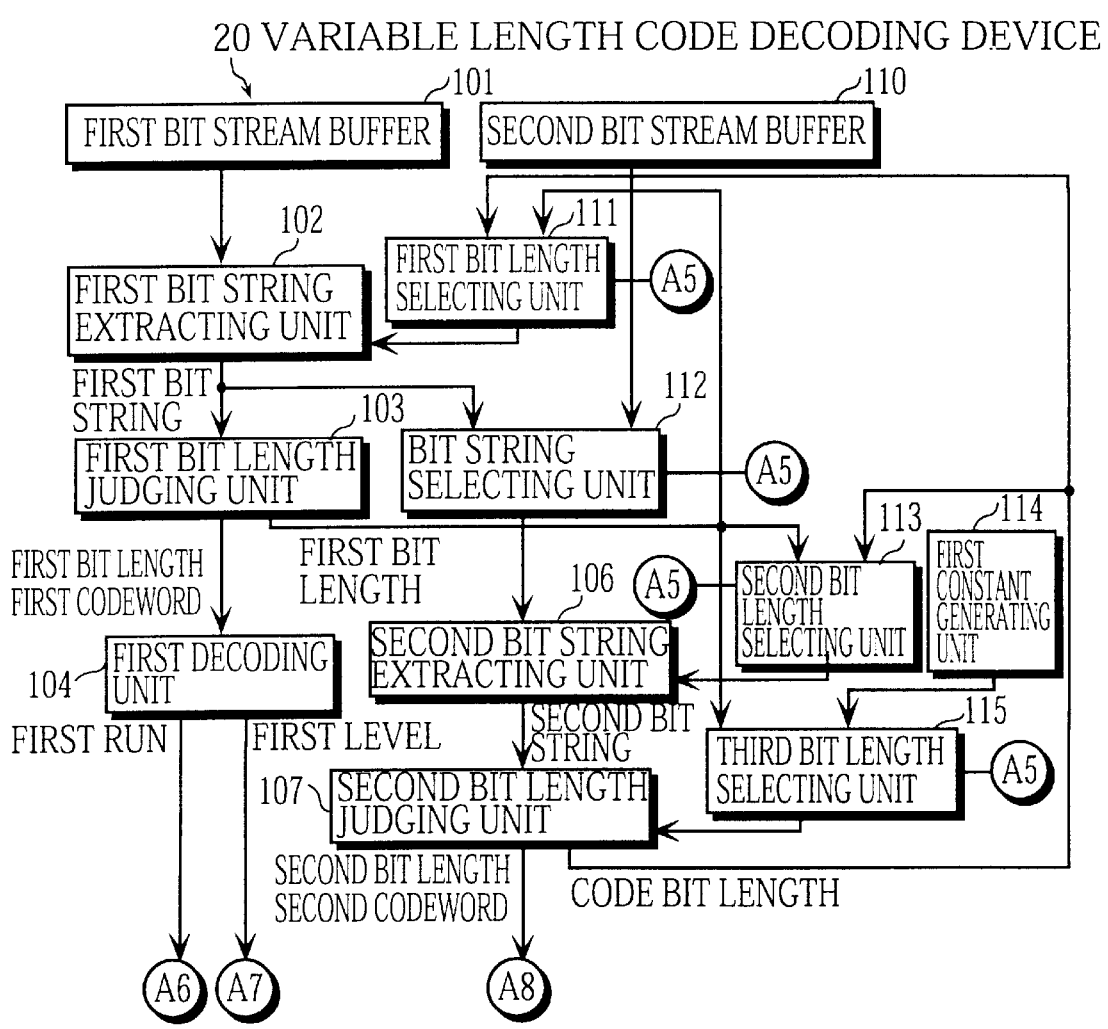
Figure 15B:
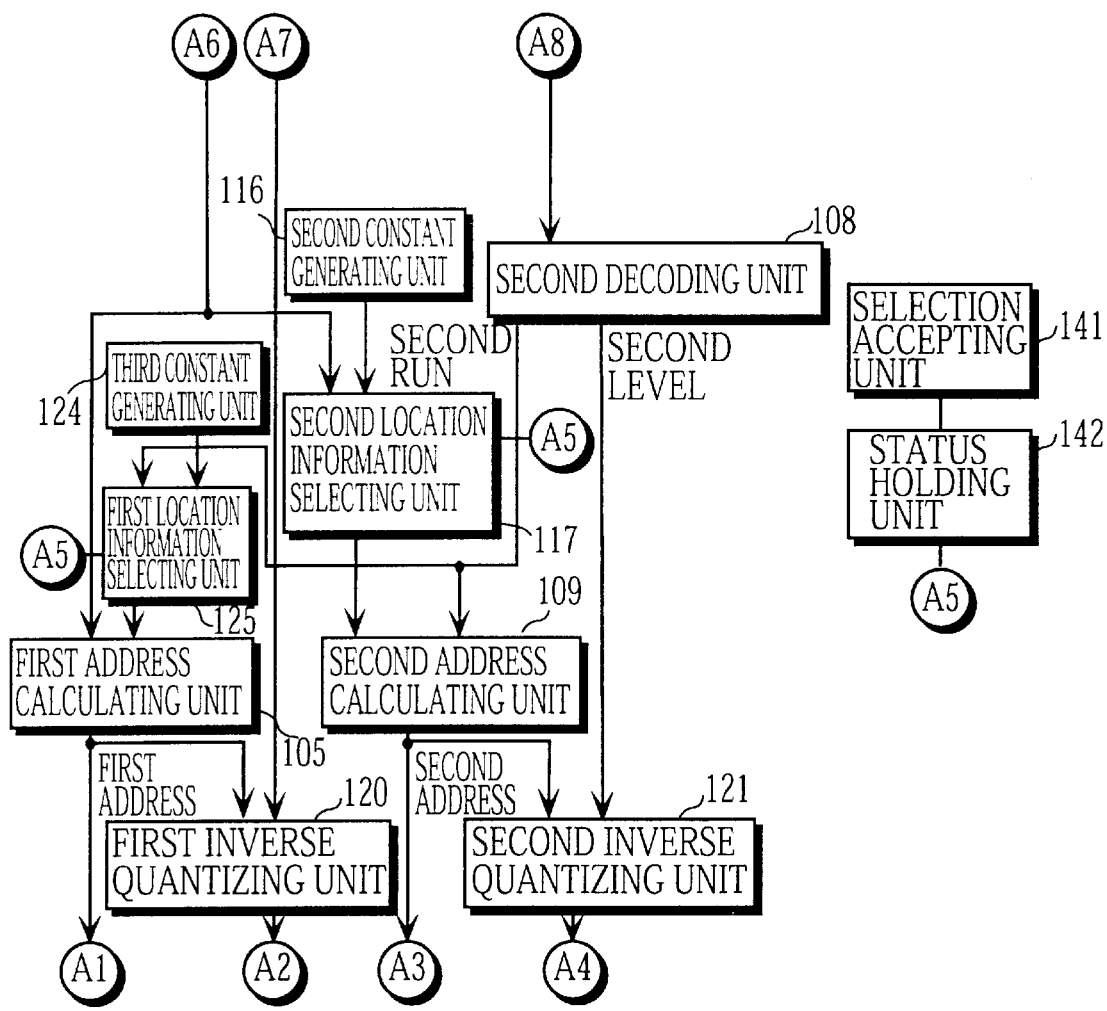

FIGS. 15A, 15B, and 15C are block diagrams which together 1t show the construction of the variable length code decoding device 20.

The variable length code decoding device 20 includes a first bit stream buffer 101, a first bit string extracting unit 102, a first bit length judging unit 103, a first decoding unit 104, a first address calculating unit 105, a second bit string extracting unit 106, a second bit length judging unit 107, a second decoding unit 108, a second address calculating unit 109, a first buffer controller 118, a first buffer 119, a first inverse quantizing unit 120, a second inverse quantizing unit 121, a second buffer controller 122, a second buffer 123, a second bit stream buffer 110, a first bit length selecting unit 111, a bit string selecting unit 112, a second bit length selecting unit 113, a first constant generating unit 114, a third bit length selecting unit 115, a second constant generating unit 116, a third constant generating unit 124, a first location information selecting unit 125, a second location information selecting unit 117, a first buffer selecting unit 126, a second buffer selecting unit 127, a fourth buffer controller 128, a fourth buffer 131, a third buffer controller 129, a third buffer 130, a selection accepting unit 141, and a status holding unit 142.

Construction elements which are similar to those in the variable length code decoding device 10 have been given the same reference numerals. The following description will focus on the newly added construction elements and, for the construction elements with the same reference numerals, the differences with those in the variable length code decoding device 10.

The variable length code decoding device 20 assumes either of two statuses in advance. In the first status, a single bit stream is decoded as in the case of the variable length code decoding device 10. In the second status, two different bit streams are separately decoded.

2.1.1. Selection Accepting Unit 141, Status Holding Unit 142

The selection accepting unit 141 accepts the user's selection of the first status or the second status and outputs the accepted selection to the status holding unit 142.

The status holding unit 142 receives the selection of the first status or the second status from the selection accepting unit 141 and holds the selected status.

2.1.2. Second Bit Stream Buffer 110

The second bit stream buffer 110 reads and stores a 4096-byte bit stream generated from a bit stream of moving images which differ with moving images read and stored by the first bit stream buffer 101. Apart from this, the second bit stream buffer 110 is the same as the first bit stream buffer 101.

2.1.3. First Bit String Extracting Unit 102

The first bit string extracting unit 102 outputs a 48-bit first bit string not to the second bit string extracting unit 106 but to the bit string selecting unit 112.

Also, the first bit string extracting unit 102 receives either a code bit length or a first bit length from the first bit length selecting unit 111, instead of receiving a code bit length from the second bit length judging unit 107. The first bit string extracting unit 102 adds the received code bit length or first bit length to a bit string extract position held therein, to renew the bit string extract position.

2.1.4. First Bit Length Judging Unit 103

The first bit length judging unit 103 outputs the first bit length not to the second bit string extracting unit 106 and the second bit length judging unit 107 but to the first bit length selecting unit 111, the second bit length selecting unit 113, and the third bit length selecting unit 115.

2.1.5. First Decode Controlling Unit 151 in the First Decoding Unit 104

The first decode controlling unit 151 in the first decoding unit 104 outputs a first run not to the second address calculating unit 109 but to the second location information selecting unit 117.

2.1.6. Second Bit String Extracting Unit 106

In the first status, the second bit string extracting unit 106 receives the first bit string from the bit string selecting unit 112 and the first bit length from the second bit length selecting unit 113. The second bit string extracting unit 106 then removes a bit string as long as the first bit length from the beginning of the first bit string, and outputs the remaining bit string to the second bit length judging unit 107 as a second bit string.

The second bit string extracting unit 106 holds a second bit string extract position which, expressed in bits, specifies a bit position from the first bit of the bit stream stored in the second bit stream buffer 110.

In the second status, the second bit string extracting unit 106 extracts from the second bit stream buffer 110 a bit string of 24 bits starting from the bit position specified by the second bit string extract position, via the bit string selecting unit 112. The second bit string extracting unit 106 outputs the extracted bit string to the second bit length judging unit 107 as the second bit string. This extraction of a 24-bit string is repeated until all 4096 bytes of the bit stream are extracted from the second bit stream buffer 110.

Here, the length of the second bit string in the second status has been set to be equal to the maximum variable length, to allow at least one codeword to be contained in the second bit string. Since the maximum variable length is 24 bits, the second bit string has been set to be 24 bits long.

The second bit string extract position is initially set at 0, indicating the first bit of the bit stream in the second bit stream buffer 110. In the second status, the second bit string extracting unit 106 receives the code bit length from the second bit length selecting unit 113, adds the code bit length to the second bit string extract position, and sets the addition result as the next second bit string extract position.

2.1.7. Second Bit Length Judging Unit 107

The second bit length judging unit 107 receives the constant 0 or the first bit length from the third bit length selecting unit 115, instead of receiving the first bit length from the first bit length judging unit 103. The second bit length judging unit 107 adds the received constant 0 or first bit length to a second bit length, to obtain the code bit length that in the first status represents the total length of the first and second codewords and in the second status represents the length of the second codeword. The second bit length judging unit 107 then outputs the code bit length to the first bit length selecting unit 111 and the second bit length selecting unit 113.

2.1.8. Second Decoding Unit 108

The second decoding unit 108 outputs a second run not to the first address calculating unit 105 but to the first location information selecting unit 125.

2.1.9. First Bit Length Selecting Unit 111

The first bit length selecting unit 111 reads the first status or the second status from the status holding unit 142.

In the first status, the first bit length selecting unit 111 outputs the code bit length received from the second bit length judging unit 107, to the first bit string extracting unit 102. In the second status, the first bit length selecting unit 111 outputs the first bit length received from the first bit length judging unit 103, to the first bit string extracting unit 102.

2.1.10. Bit String Selecting Unit 112

The bit string selecting unit 112 reads the first status or the second status from the status holding unit 142.

In the first status, the bit string selecting unit 112 outputs the first bit string received from the first bit string extracting unit 102, to the second bit string extracting unit 106. In the second status, the bit string selecting unit 112 passes the bit string of 24 bits from the second bit stream buffer 110 to the second bit string extracting unit 106.

2.1.11. Second Bit Length Selecting Unit 113

The second bit length selecting unit 113 reads the first status or the second status from the status holding unit 142.

In the first status, the second bit length selecting unit 113 outputs the first bit length received from the first bit length judging unit 103, to the second bit string extracting unit 106. In the second status, the second bit length selecting unit 113 outputs the code bit length received from the second bit length judging unit 107, to the second bit string extracting unit 106.

2.1.12. First Constant Generating Unit 114

The first constant generating unit 114 outputs the constant 0 to the third bit length selecting unit 115.

2.1.13. Third Bit Length Selecting Unit 115

The third bit length selecting unit 115 reads the first status or the second status from the status holding unit 142.

In the first status, the third bit length selecting unit 115 outputs the first bit length received from the first bit length judging unit 103, to the second bit length judging unit 107. In the second status, the third bit length selecting unit 115 outputs the constant 0 received from the first constant generating unit 114, to the second bit length judging unit 107.

2.1.14. Second Constant Generating Unit 116

The second constant generating unit 116 outputs the constant 0 to the second location information selecting unit 117.

2.1.15. Second Location Information Selecting Unit 117

The second location information selecting unit 117 reads the first status or the second status from the status holding unit 142.

In the first status, the second location information selecting unit 117 outputs the first run received from the first decoding unit 104, to the second address calculating unit 109. In the second status, the second location information selecting unit 117 outputs the constant 0 received from the second constant generating unit 116, to the second address calculating unit 109.

2.1.16. Third Constant Generating Unit 124

The third constant generating unit 124 outputs the constant 0 to the first location information selecting unit 125.

2.1.17. First Location Information selecting Unit 125

The first location information selecting unit 125 reads the first status or the second status from the status holding unit 142. in the first status, the first location information selecting unit 125 outputs the second run received from the second decoding unit 108, to the first address calculating unit 105. In the second status, the first location information selecting unit 125 outputs the constant 0 received from the third constant generating unit 124, to the first address calculating unit 105.

2.1.18. First Buffer Selecting Unit 126

The first buffer selecting unit 126 reads the first status or the second status from the status holding unit 142.

In the first status, the first buffer selecting unit 126 outputs a second address received from the second address calculating unit 109, to the second buffer controller 122. In the second status, the first buffer selecting unit 126 outputs the second address to the fourth buffer controller 128.

2.1.19. Second Buffer Selecting Unit 127

The second buffer selecting unit 127 reads the first status or the second status from the status holding unit 142.

In the first status, the second buffer selecting unit 127 outputs a second DCT coefficient received from the second inverse quantizing unit 121, to the second buffer controller 122. In the second status, the second buffer selecting unit 127 outputs the second DCT coefficient to the fourth buffer controller 128.

2.1.20. Fourth Buffer 131

The fourth buffer 131 is a data buffer having 64 areas each for storing a pair of third buffer address and DCT coefficient.

The total capacity of the fourth buffer 131 is 160 bytes, 64 bytes of which are used for storing third buffer addresses and 96 bytes of which are used for storing DCT coefficients.

2.1.21. Fourth Buffer Controller 128

In the second status, the fourth buffer controller 128 receives the second address and the second DCT coefficient respectively from the first buffer selecting unit 126 and the second buffer selecting unit 127, and writes the second address and the second DCT coefficient into the first unoccupied area in the fourth buffer 131 as a pair of third buffer address and DCT coefficient.

After this, when instructed by the third buffer controller 129, the fourth buffer controller 128 sequentially reads all pairs of third buffer addresses and DCT coefficients beginning with the start of the fourth buffer 131, and outputs the read pairs to the third buffer controller 129 one by one.

Once all pairs of third buffer addresses and DCT coefficients have been read from the fourth buffer 131, the fourth buffer controller 128 deletes the entire content of the fourth buffer 131.

2.1.22. Third Buffer 130

The third buffer 130 is a data buffer having 64 areas each for storing a DCT coefficient.

Since a DCT coefficient is 12 bits long, the third buffer 130 has a capacity of 96 bytes in total.

The third buffer 130 is connected to an external unit which reads DCT coefficients from the third buffer 130.

2.1.23. Third Buffer Controller 129

The third buffer controller 129 writes 0 into every area in the third buffer 130, as soon as the external unit reads the entire content of the third buffer 130 in previous block decode processing and present block decode processing begins.

After this, the third buffer controller 129 instructs the fourth buffer controller 128 to output the pairs of third buffer addresses and DCT coefficients stored in the fourth buffer 131.

The third buffer controller 129 sequentially receives the pairs of third buffer addresses and DCT coefficients from the fourth buffer controller 128, and, for each pair of third buffer address and DCT coefficient, writes the DCT coefficient into an area in the third buffer 130 shown by the third buffer address.

2.2. Operation of the Variable Length Code Decoding Device 20

This variable length code decoding device 20 operates in the following way.

Here, the detailed operations of the construction elements of the variable length code decoding device 20 are analogous to their counterparts in the variable length code decoding device 10, so that their explanation has been omitted.

In the first status, the variable length code decoding device 20 operates in the same manner as the variable length code decoding device 10.

Figure 16A:
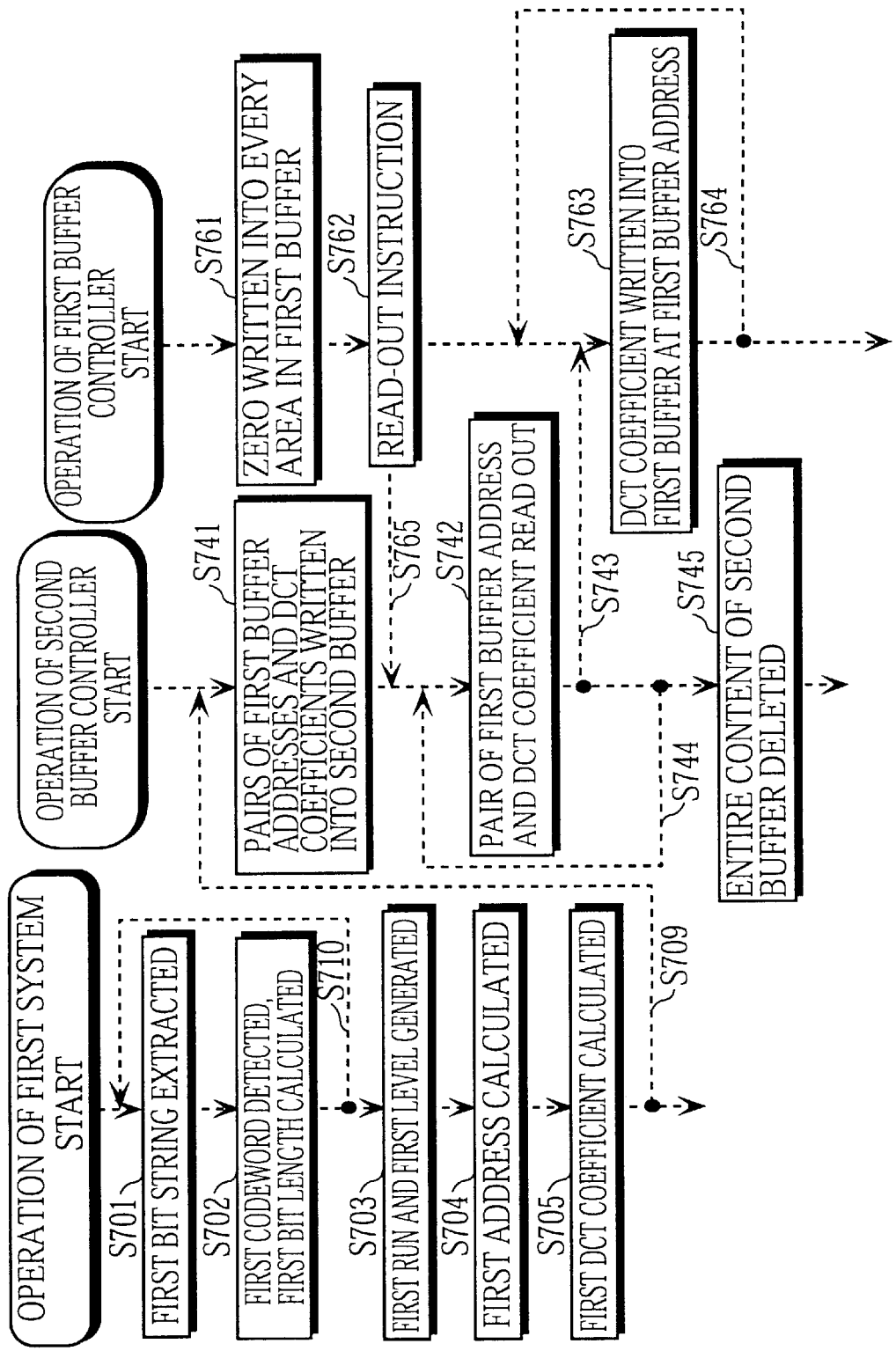
FIGS. 16A and 16B are flowcharts which together show the general operation of the variable length code decoding device in FIGS. 15A–15C.
Figure 16B:
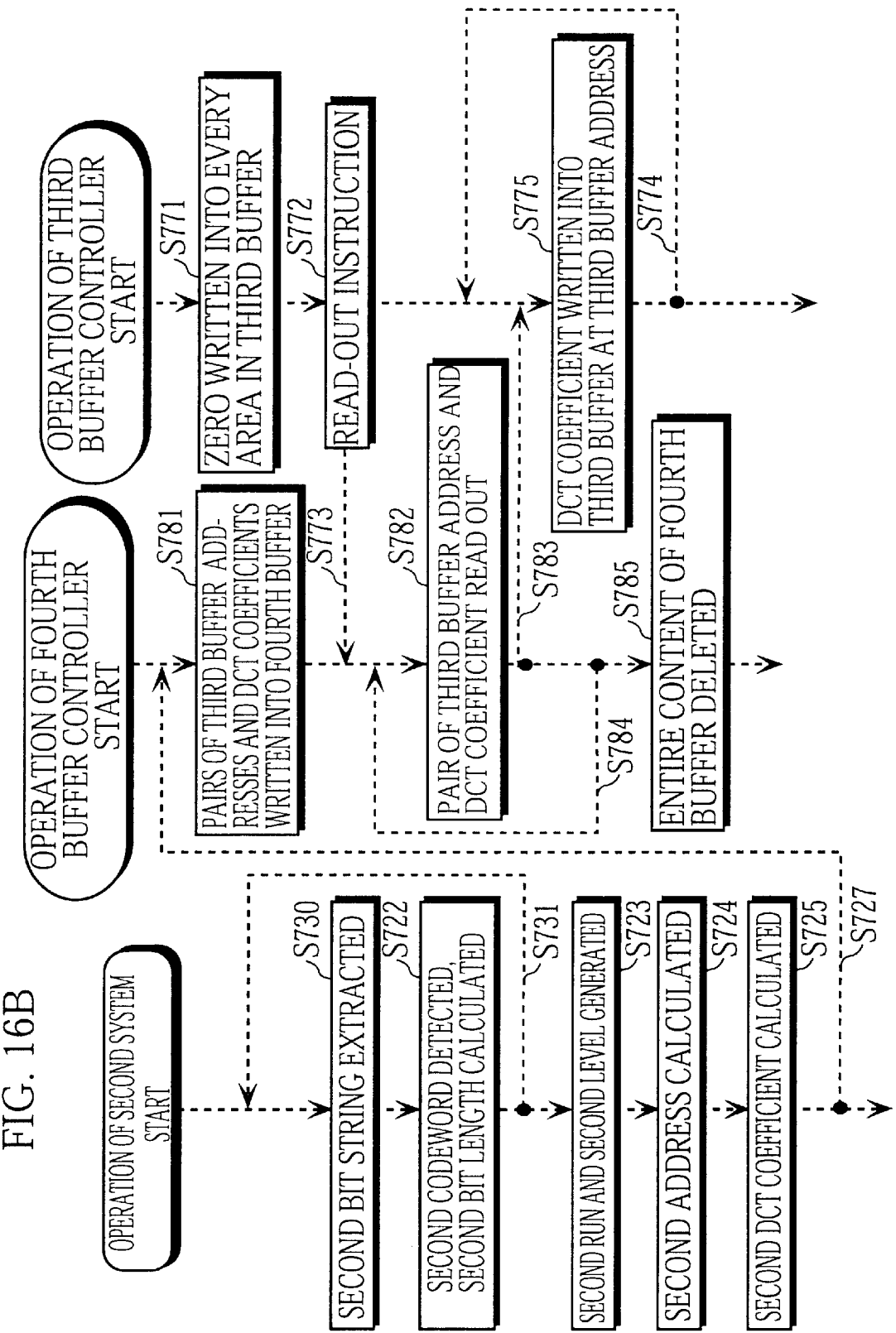

The general operation of the variable length code decoding device 20 in the second status is explained below with reference to FIGS. 16A and 16B, with the focus being on the difference with the flowchart in FIG. 8.

(1) Operation of the First System

Figure 8:
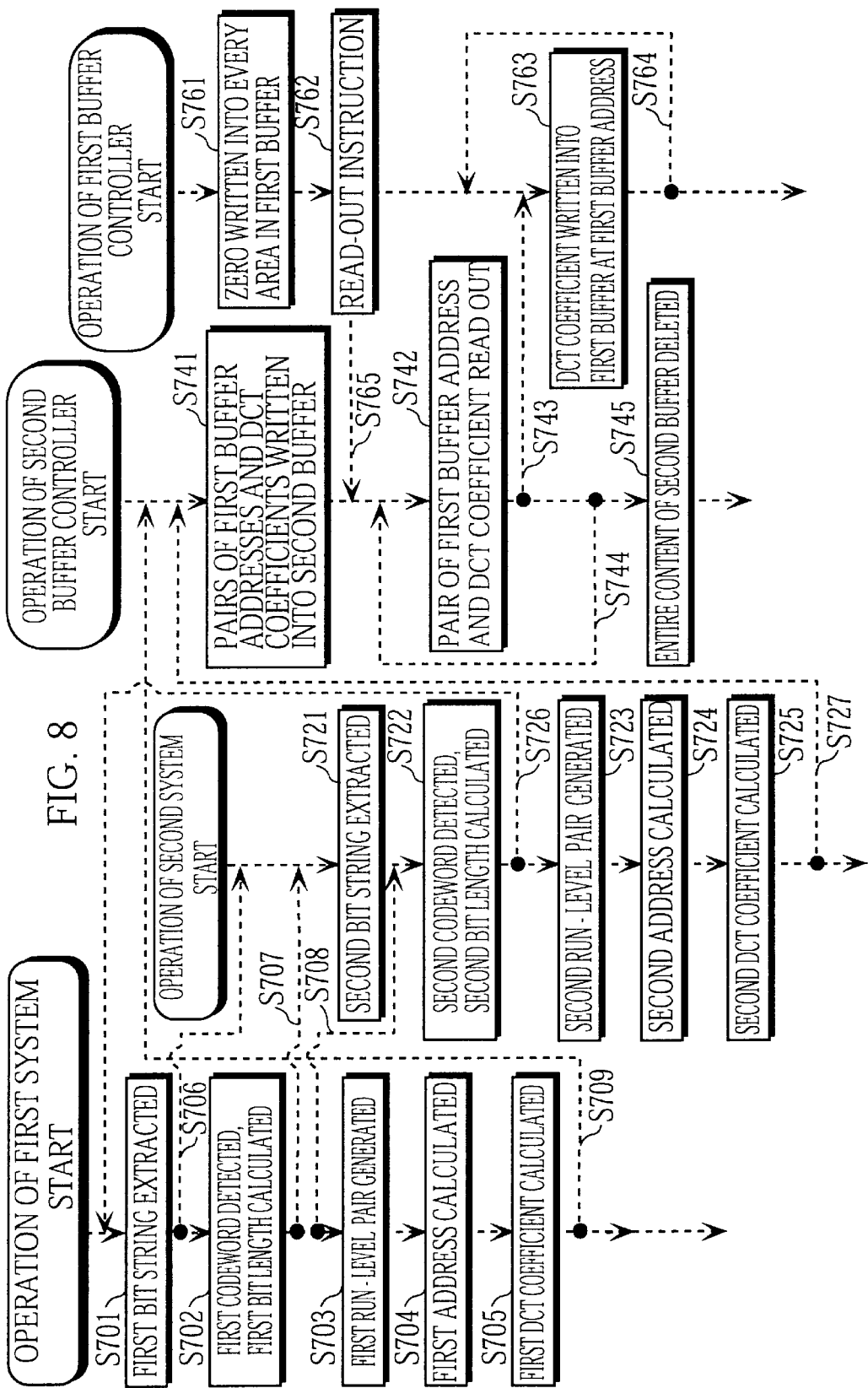
FIG. 8 is a flowchart showing the general operation of the variable length code decoding device shown in FIG. 1.

In the first system, instead of steps S706–S708 in FIG. 8, in step S710 the first bit length judging unit 103 outputs a first bit length to the first bit string extracting unit 102 via the first bit length selecting unit 111.

(2) Operation of the Second System

In the second system, instead of steps S706–S708 and S721 in FIG. 8, in step 730 the second bit string extracting unit 106 extracts from the bit stream stored in the second bit stream buffer 110 a bit string of 24 bits starting from a bit position specified by the second bit string extract position, through the bit string selecting unit 112. The second bit string extracting unit 106 then outputs the extracted bit string to the second bit length judging unit 107 as a second bit string.

Also, instead of step S726 in FIG. 8, in step S731 the second bit length judging unit 107 outputs a calculated code bit length to the second bit string extracting unit 106 via the second bit length selecting unit 113, and the second bit string extracting unit 106 adds the received code bit length to the second bit string extract position to renew the second bit string extract position.

(3) Operation of the Second Buffer Controller 122

The operation of the second buffer controller 122 does not include step S727 shown in FIG. 8. In step S741, the second buffer controller 122 writes a first address and a first DCT coefficient into the first unoccupied area in the second buffer 123 as a pair of first buffer address and DCT coefficient, but does not write a second address and a second DCT coefficient into the second buffer 123 as a pair of first buffer address and DCT coefficient.

(4) Operation of the Fourth Buffer Controller 128

The fourth buffer controller 128 receives a second address from the second address calculating unit 109 via the first buffer selecting unit 126, and a second DCT coefficient from the second inverse quantizing unit 121 via the second buffer selecting unit 127 (S727). The fourth buffer controller 128 writes the received second address and second DCT coefficient into the first unoccupied area in the fourth buffer 131 as a pair of third buffer address and DCT coefficient (3781).

When instructed by the third buffer controller 129 (S773), the fourth buffer controller 128 reads a pair of third buffer address and DCT coefficient beginning with the start of the fourth buffer 131 (S782) and outputs it to the third buffer controller 129 (S783). Steps S782 and S783 are repeated until all pairs of third buffer addresses and DCT coefficients are read from the fourth buffer 131 and outputted to the third buffer controller 129 (S784).

Following this, the fourth buffer controller 128 deletes the entire content of the fourth buffer 131 (S785).

(5) Operation of the Third Buffer Controller 129

The third buffer controller 129 writes 0 into every area of the third buffer 130, once the external unit has read the entire content of the third buffer 130 in the preceding block decode processing and the present block decode processing has begun (S771).

After this, the third buffer controller 129 instructs the fourth buffer controller 128 to output all pairs of third buffer addresses and DCT coefficients stored in the fourth buffer 131 (S772).

The third buffer controller 129 receives a pair of third buffer address and DCT coefficient from the fourth buffer controller 128 (S783) and writes the DCT coefficient into an area in the third buffer 130 shown by the third buffer address (S775).

Steps S783 and S775 are repeated until all pairs of third buffer addresses and DCT coefficients are received and the DCT coefficients are written into the third buffer 130 at the respective third buffer addresses (S774).

Figure 17:
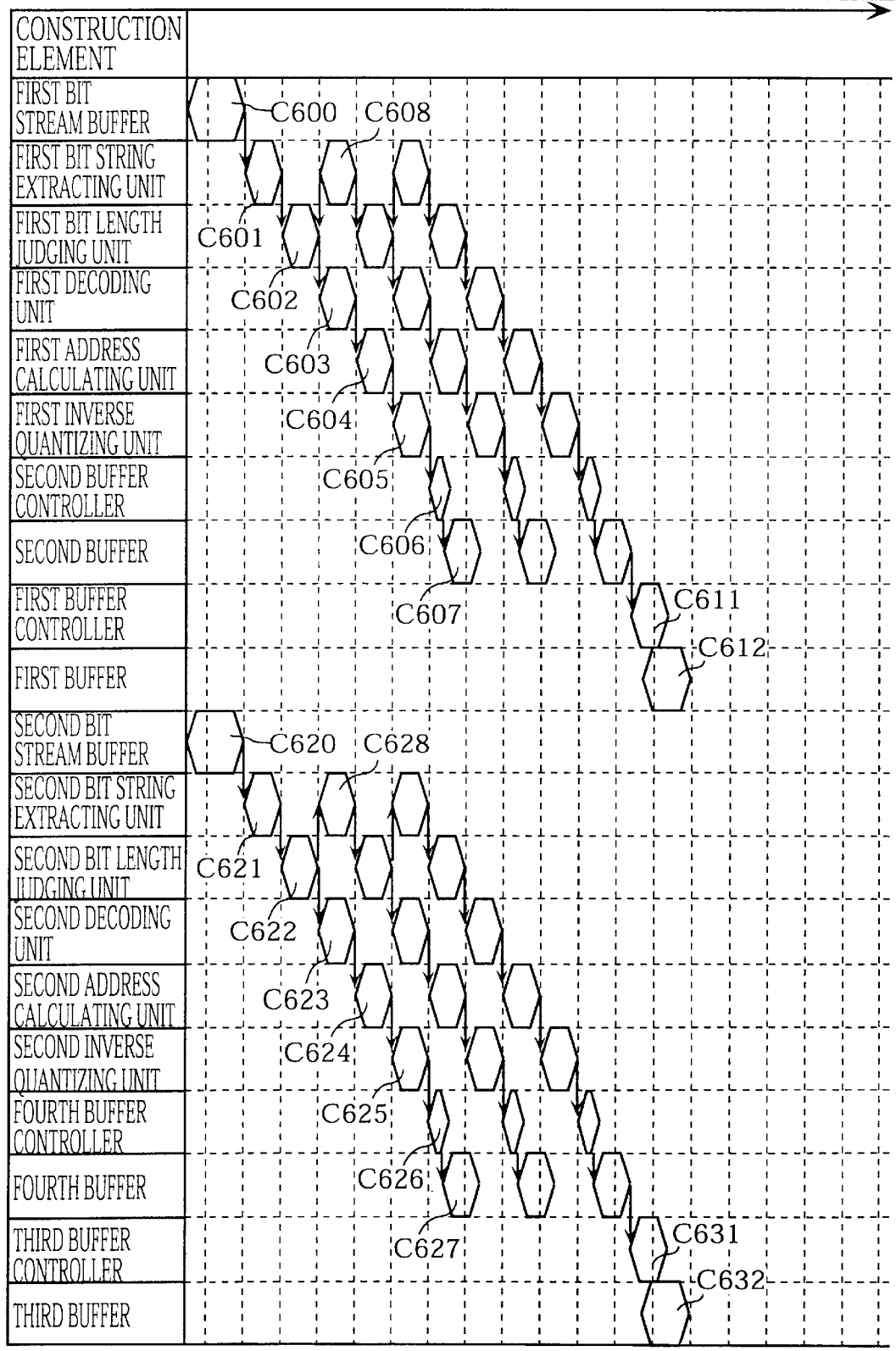
FIG. 17 is a time chart showing the progress of the operation of each construction element in the variable length code decoding device in FIGS. 15A–15C.

2.3. Progress of the Operation of the Variable Length Code Decoding Device 20 Over Time FIG. 17 is a time chart showing the progress of the operation of each construction element in the variable length code decoding device 20 in decoding of each codeword.

In the figure, the vertical axis lists the names of the construction elements such as the first bit stream buffer 101, the first bit string extracting unit 102, the first bit length judging unit 103, the first decoding unit 104, the first address calculating unit 105, the first inverse quantizing unit 120, the second buffer controller 122, the second buffer 123, the first buffer controller 118, the first buffer 119, the second bit stream buffer 110, the second bit string extracting unit 106, the second bit length judging unit 107, the second decoding unit 108, the second address calculating unit 109, the second inverse quantizing unit 121, the fourth buffer controller 128, the fourth buffer 131, the third buffer controller 129, and the third buffer 130, whereas the horizontal axis represents the progress of the operations of these construction elements over time. Each of the selecting units and constant generating units is not listed in the figure.

This time chart shows the operation of the variable length code decoding device 20 in the second status.

Processes C600–C607 and C611–C612 are performed respectively by the first bit stream buffer 101, the first bit string extracting unit 102, the first bit length judging unit 103, the first decoding unit 104, the first address calculating unit 105, the first inverse quantizing unit 120, the second buffer controller 122, the second buffer 123, the first buffer controller 118, and the first buffer 119.

Meanwhile, processes C620–C627 and C631–C632 are performed respectively by the second bit stream buffer 110, the second bit string extracting unit 106, the second bit length judging unit 107, the second decoding unit 108, the second address calculating unit 109, the second inverse quantizing unit 121, the fourth buffer controller 128, the fourth buffer 131, the third buffer controller 129, and the third buffer 130.

As illustrated, processes C600 and C620 are simultaneously commenced.

2.4. Conclusion

Thus, the variable length code decoding device 20 is provided with another bit stream buffer together with selecting units and constant generating units. Accordingly, by way of controlling each of the selecting units, the variable length code decoding device 20 can switch between parallel decoding of two codewords included in a bit stream of a moving image and parallel decoding of two codewords included respectively in two bit streams of different moving images.

3. Third Embodiment

The following is a description of a variable length code decoding device 30 according to the third embodiment of the invention.

3.1. Construction of the Variable Length Code Decoding Device 30

Figure 18:
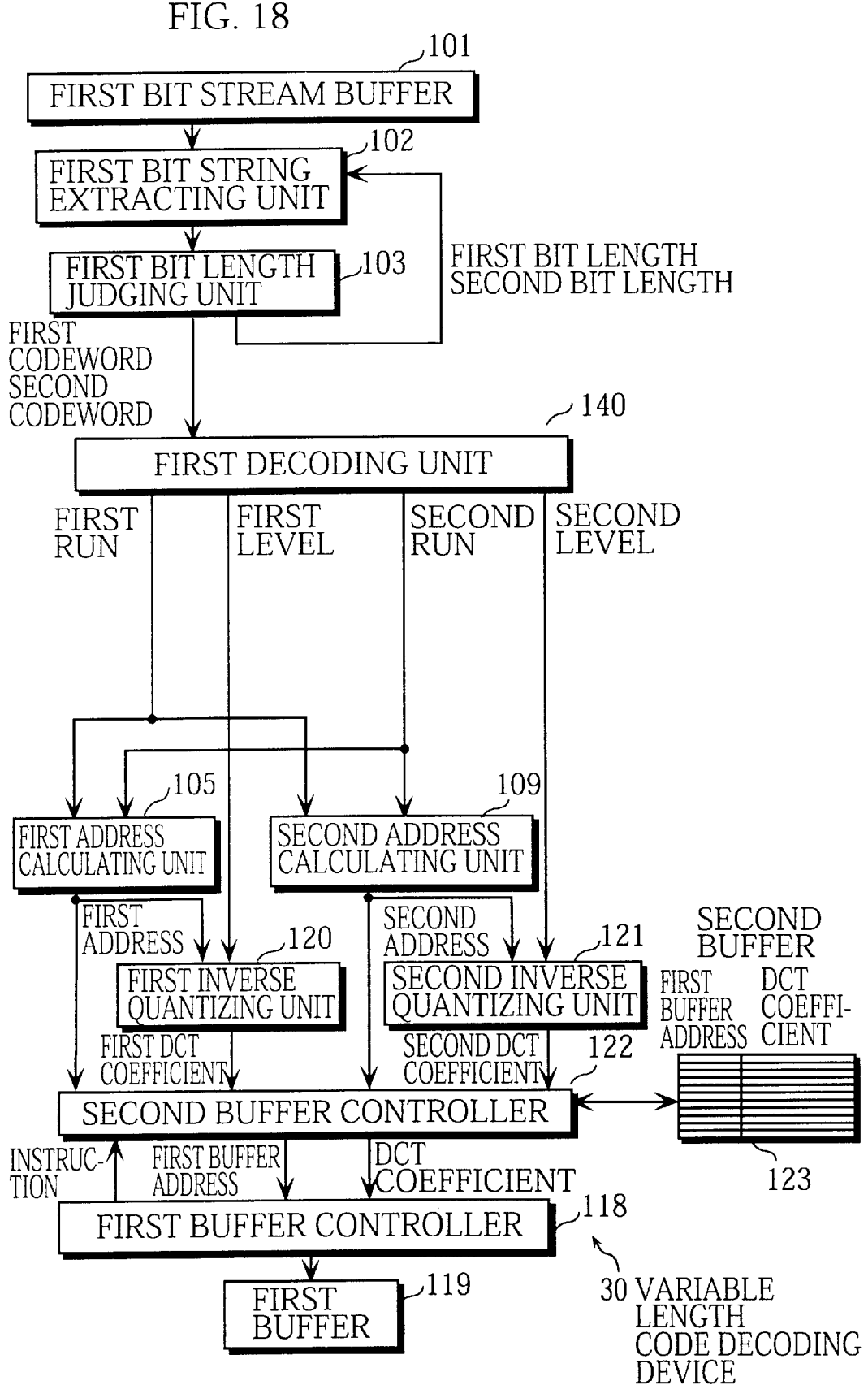
FIG. 18 is a block diagram showing the construction of a variable length code decoding device according to the third embodiment of the invention.

FIG. 18 is a block diagram showing the construction of the variable length code decoding device 30.

The variable length code decoding device 30 includes a first bit stream buffer 101, a first bit string extracting unit 102, a first bit length judging unit 103, a first decoding unit 140, a first address calculating unit 105, a second address calculating unit 109, a first buffer controller 118, a first buffer 119, a first inverse quantizing unit 120, a second inverse quantizing unit 121, a second buffer controller 122, and a second buffer 123.

Construction elements which are labeled by the same reference numerals are similar to those in the variable length code decoding device 10. The following explanation will focus on the newly added construction elements and, for the construction elements with the same reference numerals, the differences with those in the variable length code decoding device 10.

3.1.1. First Bit String Extracting Unit 102

The first bit string extracting unit 102 extracts from a 4096-byte bit stream in the first bit stream buffer 101 a bit string of 24 bits starting from a bit position shown by a bit string extract position held therein, and outputs the extracted bit string to the first bit length judging unit 103 as a first bit string.

This extraction of a bit string of 24 bits is repeated until all 4096 bytes of the bit stream are extracted from the first bit stream buffer 101.

Here, the length of the first bit string has been set to be the maximum variable length so as to allow at least one codeword to be contained in the first bit string. Since the maximum variable length is 24 bits, the first bit string has been set to be 24 bits long.

After this, the first bit string extracting unit 102 receives a first bit length alone or together with a second bit length, from the first bit length judging unit 103.

The first bit string extracting unit 102 adds the received first bit length to the bit string extract position. Should the second bit length accompany the first bit length, the first bit string extracting unit 102 further adds the second bit length to the sum of the first bit length and the bit string extract position. The first bit string extracting unit 102 sets the addition result as a new bit string extract position.

3.1.2. First Bit Length Judging Unit 103

The first bit length judging unit 103 receives the first bit string of 24 bits from the first bit string extracting unit 102.

The first bit length judging unit 103 detects a codeword from the beginning of the first bit string as a first codeword, and calculates the bit length of the first codeword as a first bit length.

If the first bit length is no greater than 5 bits, the first bit length judging unit 103 checks whether a codeword that follows the first codeword in the first bit string is no greater than 5 bits. If such a codeword exists, the first bit length judging unit 103 detects the codeword as a second codeword and calculates the bit length of the second codeword as a second bit length.

The first bit length judging unit 103 outputs the first bit length and the first codeword respectively to the first bit string extracting unit 102 and the first decoding unit 140.

Also, if the second codeword is detected, the first bit length judging unit 103 outputs the second bit length and the second codeword respectively to the first bit string extracting unit 102 and the first decoding unit 140.

Here, detecting a codeword from the first bit string is done in accordance with the well known method mentioned above.

3.1.3. First Decoding Unit 140

Figure 19:
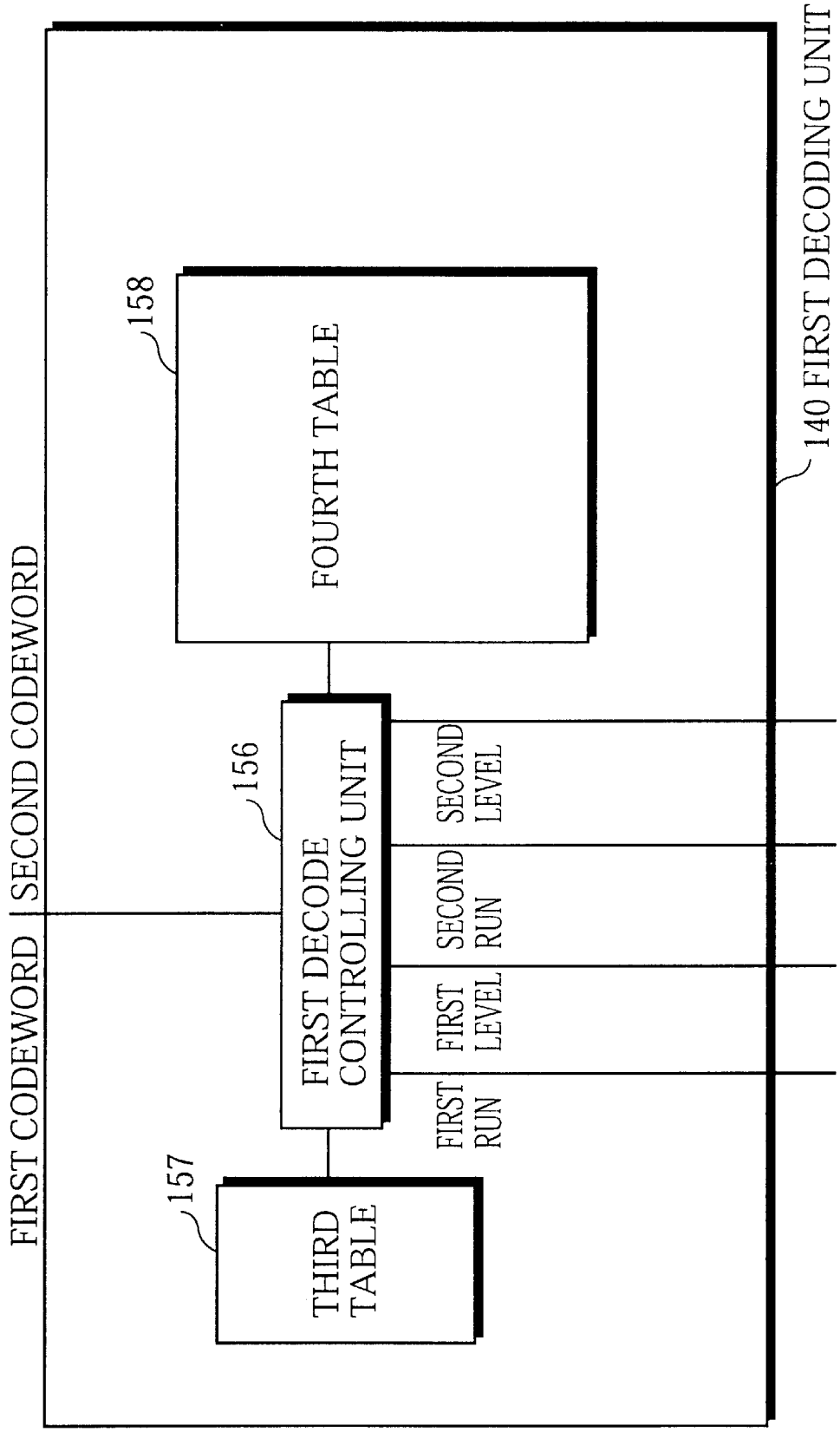
FIG. 19 is a block diagram showing the construction of a first decoding unit in the variable length code decoding device in FIG. 18.

The first decoding unit 140 is roughly made up of a first decode controlling unit 156, a third table 157, and a fourth table 158, as shown in FIG. 19.

(1) Third Table 157

The third table 157 is a data table having a plurality of areas each of which has a variable length codeword 171 as an address and stores a pair of run A 172 and level A 173 and a pair of run B 174 and level B 175, as shown in FIG. 20.

Each variable length codeword 171 is a result of concatenating two codewords no greater than 5 bits, the former of which corresponds to a pair of run A 172 and level A 173 and the latter of which corresponds to a pair of run B 174 and level B 175.

As an example, a variable length codeword "11100110" designated by reference numeral 179 is a concatenation of a codeword "110" and a codeword "0110", wherein the codeword "110" corresponds to a pair of run A and level A designated by reference numeral 179a and the codeword "0110" corresponds to a pair of run B and level B designated by reference numeral 179b.

(2) Fourth Table 158

The fourth table 158 is a data table having a plurality of areas each of which has a variable length codeword 176 as an address and stores a pair of run 177 and level 178 corresponding to the variable length codeword 176, as shown in FIG. 21.

In the figure, the least significant bit "s" of a variable length codeword 176 takes either 0 or 1. When s=0, a level 178 corresponding to the variable length codeword 176 is positive, whereas when s=1, the level 178 is negative. Also, a variable length codeword "1s" is used only for a DC coefficient within a block, and a variable length codeword "11s" is used only for an AC coefficients within the block.

(3) First Decode Controlling Unit 156

The first decode controlling unit 156 receives the first codeword alone or together with the second codeword, from the first bit length judging unit 103.

The first decode controlling unit 156 then judges whether it received the second codeword.

If the second codeword was received, the first decode controlling unit 156 concatenates the first codeword and the second codeword and retrieves from the third table 157 a pair of run A 172 and level A 173 and a pair of run B 174 and level B 175 stored in an area whose address 171 is the concatenation of the first and second codewords. The first decode controlling unit 156 outputs the run A 172 to the first address calculating unit 105 and the second address calculating unit 109 as a first run, the level A 173 to the first inverse quantizing unit 120 as a first level, the run B 174 to the first address calculating unit 105 and the second address calculating unit 109 as a second run, and the level B 175 to the second inverse quantizing unit 121 as a second level.

If the second codeword was not received, the first decode controlling unit 156 retrieves from the fourth table 158 a pair of run 177 and level 178 stored in an area whose address 176 is the first codeword. The first decode controlling unit 156 outputs the run 177 to the first address calculating unit 105 and the second address calculating unit 109 as the first run, and outputs the level 178 to the first inverse quantizing unit 120 as the first level.

3.2. Operation of the Variable Length Code Decoding Device 30

This variable length code decoding device 30 operates in the following manner.

3.2.1. General Operation of the Variable Length Code Decoding Device 30

Figure 22:
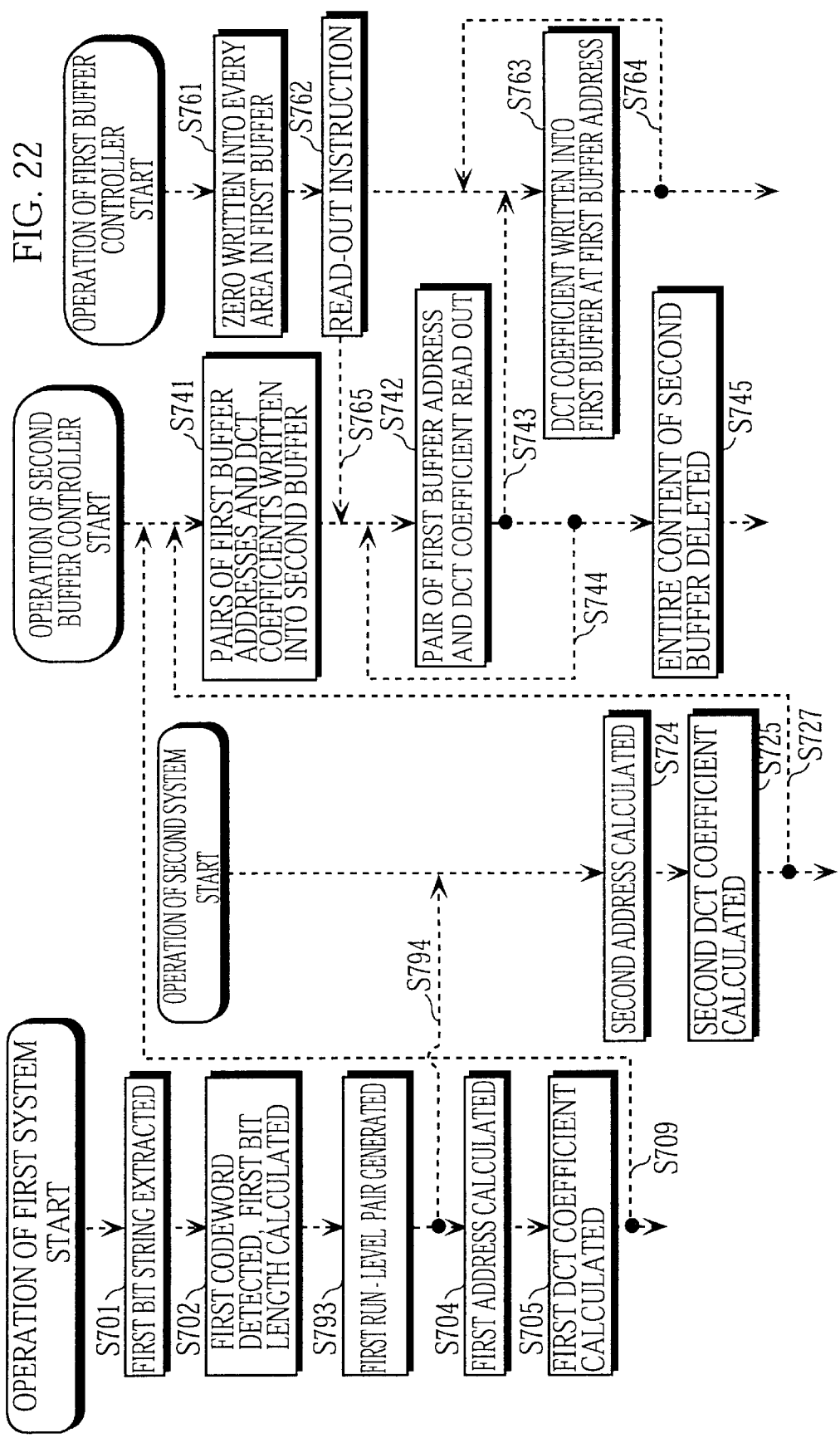
FIG. 22 is a flowchart showing the general operation of the variable length code decoding device in FIG. 18.

FIG. 22 is a flowchart showing the general operation of the variable length code decoding device 30. Steps which have been labeled with the same reference numerals are similar to those in FIG. 8. The following explanation will focus on the newly added steps and, for the steps with the same reference numerals, the differences with those in FIG. 8.

In the figure, the first bit string extracting unit 102, the first bit length judging unit 103, the first decoding unit 140, the first address calculating unit 105, and the first inverse quantizing unit 120 are collectively called the first system, whereas the second address calculating unit 109 and the second inverse quantizing unit 121 are collectively called the second system.

Instead of steps S706, S707, S708, S703, S721, S722, S726, and S723 in FIG. 8, steps S793 and S794 are newly included in FIG. 22.

In step S701, the first bit string extracting unit 102 extracts a first bit string of 24 bits from the first bit stream buffer 101 and outputs it to the first bit length judging unit 103.

In step S702, the first bit length judging unit 103 detects a first codeword from the received first bit string and calculates a first bit length for the first codeword. If the first bit length is no greater than 5 bits, the first bit length judging unit 103 searches the first bit string for a second codeword no greater than 5 bits. If the second codeword is detected, the first bit length judging unit 103 calculates a second bit length for the second codeword. The first bit length judging unit 103 outputs the first bit length alone or together with the second bit length to the first bit string extracting unit 102, and outputs the first codeword alone or together with the second codeword to the first decoding unit 140.

In step S793, the first decode controlling unit 156 in the first decoding unit 140 decodes the first codeword alone or together with the second codeword to generate a first run-level pair alone or together with a second run-level pair. The first decode controlling unit 156 then outputs the first run to the first address calculating unit 105 and the second address calculating unit 109, and the first level to the first inverse quantizing unit 120.

If the second run-level pair is generated, in step S794 the first decode controlling unit 156 outputs the second run to the first address calculating unit 105 and the second address calculating unit 109, and the second level to the second inverse quantizing unit 121.

3.2.2. Operation of the First Decode Controlling Unit 156 in the First Decoding Unit 140

Figure 23:
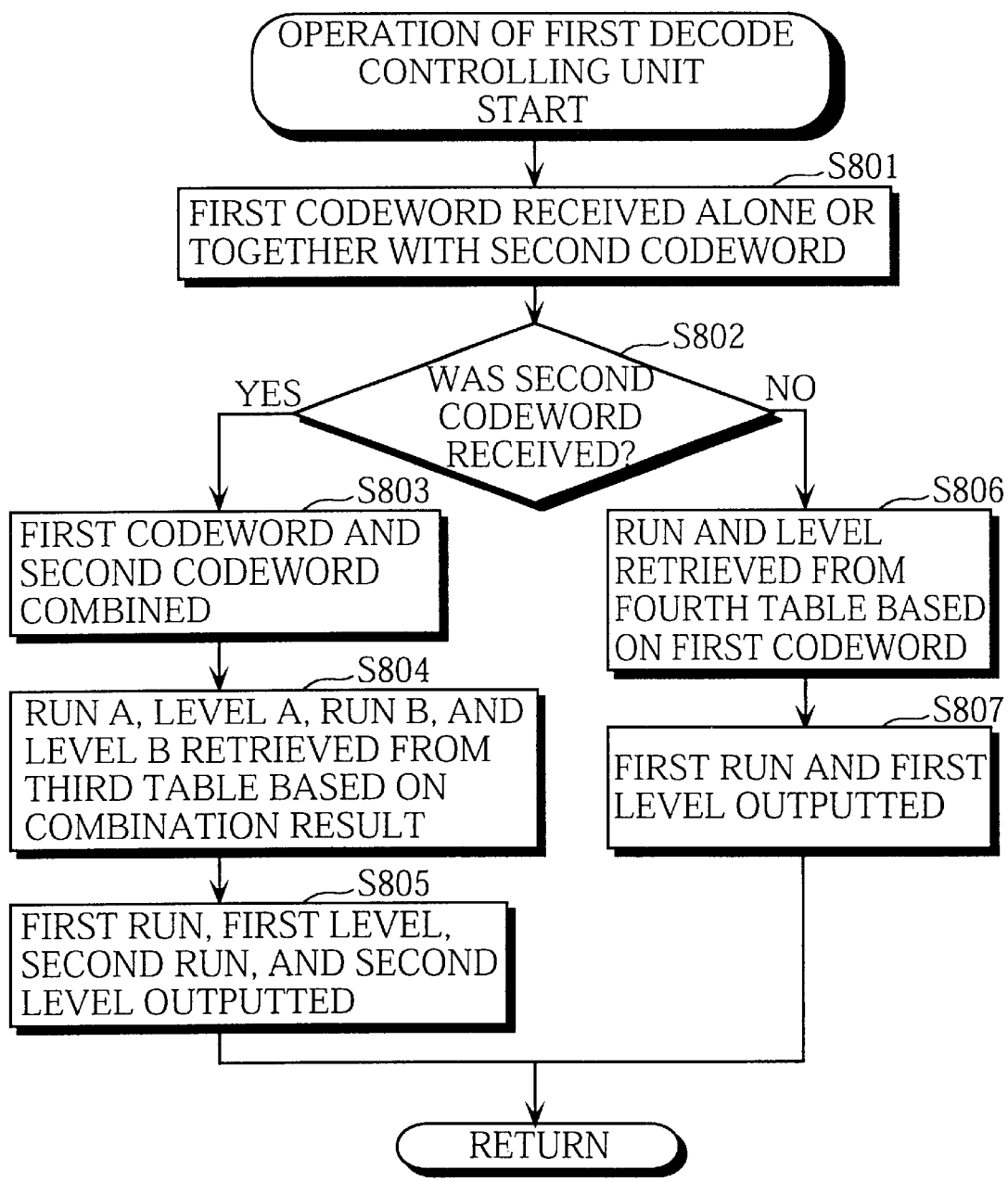
FIG. 23 is a flowchart showing the operation of a first decode controlling unit in the first decoding unit in FIG. 19.

FIG. 23 is a flowchart showing the operation of the first decode controlling unit 156 in the first decoding unit 140.

The first decode controlling unit 156 receives the first codeword alone or together with the second codeword from the first bit length judging unit 103 (S801) and judges whether it received the second codeword (S802).

If the second codeword was received, the first decode controlling unit 156 concatenates the first codeword and the second codeword (S803) and retrieves from the third table 157 a pair of run A 172 and level A 173 and a pair of run B 174 and level B 175 stored in an area whose address 171 is the concatenation result (S804). The first decode controlling unit 156 outputs the run A 172 to the first address calculating unit 105 and the second address calculating unit as a first run, the level A 173 to the first inverse quantizing unit 120 as a first level, the run B 174 to the first address calculating unit 105 and the second address calculating unit 109 as a second run, and the level B 175 to the second inverse quantizing unit 121 as a second level (S805).

If the second codeword was not received in step S802, the first decode controlling unit 156 retrieves from the fourth table 158 a pair of run 177 and level 178 stored in an area whose address 176 is the first codeword (S806), outputs the run 177 to the first address calculating unit 105 and the second address calculating unit 109 as the first run, and outputs the level 178 to the first inverse quantizing unit 120 as the first level (S807).

Figure 24:
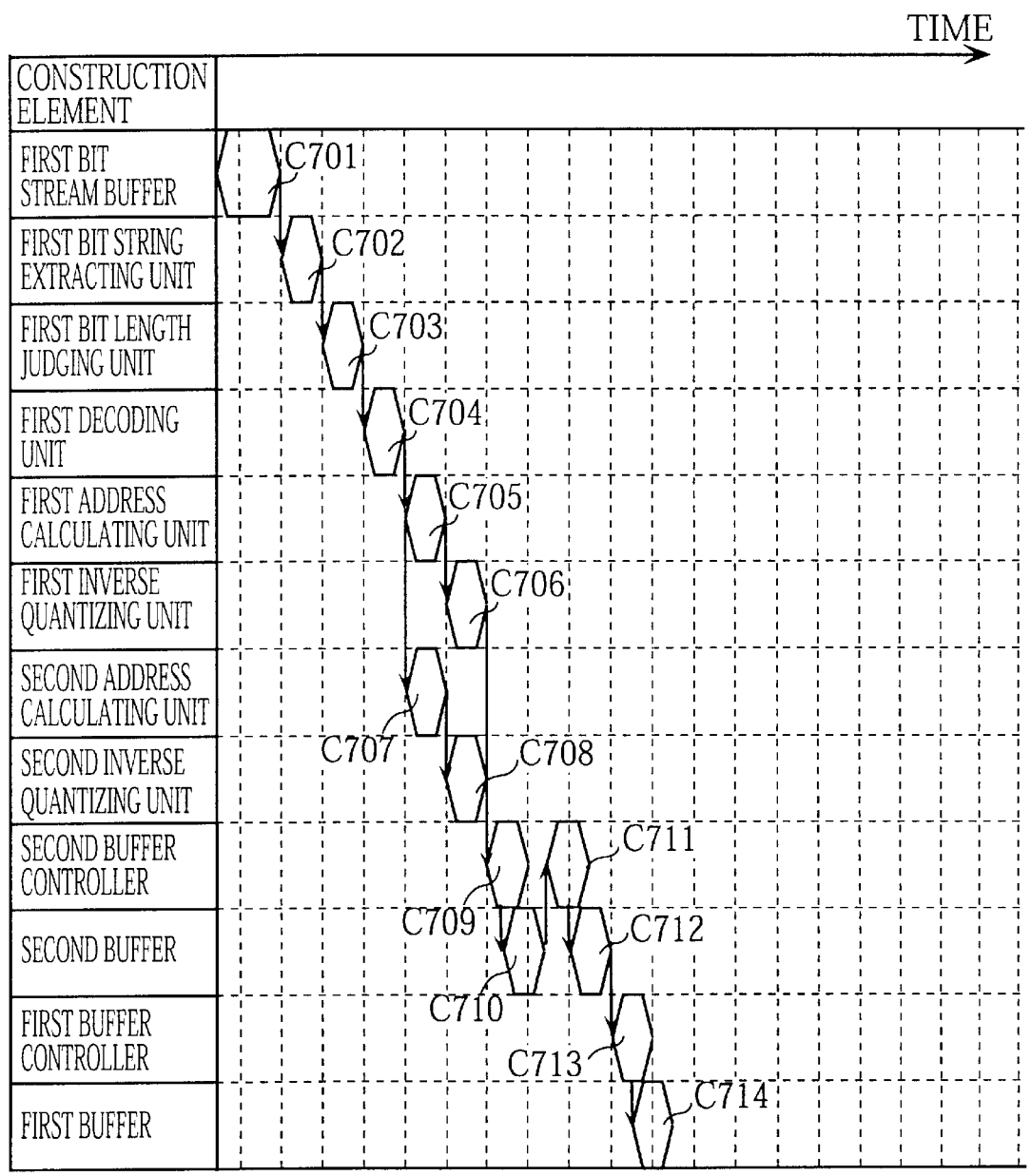
FIG. 24 is a time chart showing the progress of the operation of each construction element in the variable length code decoding device in FIG. 19.

3.3. Progress of the Operation of the Variable Length Code Decoding Device 30 Over Time FIG. 24 is a time chart showing the progress of the operation of each construction element in the variable length code decoding device 30 in decoding of each codeword.

In the figure, the vertical axis lists the names of the construction elements such as the first bit stream buffer 101, the first bit string extracting unit 102, the first bit length judging unit 103, the first decoding unit 140, the first address calculating unit 105, the first inverse quantizing unit 120, the second address calculating unit 109, the second inverse quantizing unit 121, the second buffer controller 122, the second buffer 123, the first buffer controller 118, and the first buffer 119, whereas the horizontal axis represents the progress of the operations of these construction elements over time.

This time chart concerns the case where the first codeword and the second codeword are decoded by the first decoding unit 140 in parallel.

Process C701 is performed by the first bit stream buffer 101. Processes C702–C708 and C713–C714 are performed respectively by the first bit string extracting unit 102, the first bit length judging unit 103, the first decoding unit 140, the first address calculating unit 105, the first inverse quantizing unit 120, the second address calculating unit 109, the second inverse quantizing unit 121, the first buffer controller 118, and the first buffer 119. Processes C709 and C711 are performed by the second buffer controller 122, while processes C710 and C712 are performed by the second buffer 123.

As illustrated, processes C701–C704 are sequentially executed, while processes C705 and C707 are concurrently executed.

3.4. Conclusion

Thus, the variable length code decoding device 30 is provided with a first decoding unit that, when short codewords of frequent occurrence appear contiguously, simultaneously decodes two such codewords. Accordingly, it is possible to concurrently decode two codewords and then perform address calculation and inverse quantization for one codeword in parallel with address calculation and inverse quantization for the other codeword.

4. Modifications

Though the present invention has been described by way of the above embodiments, the invention should not be constrained to such. For instance, the following modifications are possible.

(1) The second decoding unit 108 may hold a variable length code table that relates only to variable length codewords which correspond to run-level pairs whose runs are 0. In such a case, through the use of the same variable length code table, the second bit length judging unit 107 detects as a second codeword only a codeword corresponding to a run-level pair whose run is 0, and outputs the second codeword to the second decoding unit 108. Should a codeword corresponding to a run-level pair whose run is not 0 be detected, the second bit length judging unit 107 rejects such a codeword and sets a received first bit length as a code bit length, without outputting neither a second bit length nor a second codeword to the second decoding unit 108.

Such a variable length code table has a plurality of areas each of which has as an address a variable length codeword corresponding to a run-level pair whose run is 0 and stores a level of the run-level pair. The size of this variable length code table is such that (the bit length of a level)×(the number of variable length codewords included in the table).

With this construction, it is possible to parallelly decode two consecutive variable length codewords made up of the first codeword which is any codeword and the second codeword which is a codeword generated from a run-level pair whose run is 0. Also, the size of the variable length code table in the second decoding unit can be reduced, since information on variable length codewords obtained when encoding run-level pairs whose runs are not 0, as well as information on runs of run-level pairs whose runs are 0, is omitted from such a table.

(2) Alternatively, the second decoding unit 108 may hold a variable length code table that relates only to variable length codewords no greater than a predetermined length such as 10 bits. In this case, the second bit length judging unit 107 detects as a second codeword only a variable length codeword no greater than the predetermined length. Should a codeword greater than the predetermined length be detected, the second bit length judging unit 107 rejects such a codeword and sets a received first bit length as a code bit length, without outputting neither a second bit length nor a second codeword to the second decoding unit 108.

Such a variable length code table has a plurality of areas each of which has a variable length codeword no greater than the predetermined length as an address and stores a run-level pair corresponding to the variable length codeword. The size of this variable length code table is such that ((the bit length of a run)+(the bit length of a level))×(the number of variable length codewords included in the table).

With this construction, two consecutive codewords made up of the first codeword which is any codeword and the second codeword which is a codeword no greater than the predetermined length can be decoded in parallel. In addition, the size of the variable length code table in the second decoding unit 108 can be reduced, since information on variable length codewords greater than the predetermined length is omitted from such a table.

(3) The first decoding unit 104 and the second decoding unit 108 may share one variable length code table, with it being possible to reduce the entire table size.

(4) The associative memory held in each of the first and second decoding units 104 and 108 may store a JPEG (Joint Photographic Experts Group) variable length code table that can vary variable length codewords therein from one application to another. This is possible because the associative memory is given a two-tier structure made up of the second table storing data and the first table storing addresses of the second table. Also, the fixed table held in each of the first and second decoding units 104 and 108 may store variable length codes for MPEG AC coefficients that are fixed regardless of application.

(5) The second decoding unit 108 may hold only a variable length code table for decoding variable length codewords of MPEG AC coefficients and not a variable length code table for decoding a variable length codeword of an MPEG DC coefficient. This is because the DC coefficient appears first in each block and therefore will always be contained in the first codeword and not the second codeword.

(6) The variable length code decoding device of each of the above embodiments may also include: an inverse DCT unit for reading DCT coefficients from the first buffer 119 or the third buffer 130 and performing inverse DCT on the read DCT coefficients to generate an image for one block; and an image buffer for storing the generated image.

(7) Though the first bit stream buffer 101 has read a bit stream of moving images in each of the above embodiments, it can also read a bit stream of still images.

(8) Though the selection accepting unit 141 in the variable length code decoding device 20 has accepted the status selection from the user, this can be modified as follows. Which is to say, the status holding unit 142 stores the first status under normal circumstances, and the selection accepting unit 141 selects the second status when the second bit stream buffer 110 detects insertion of an optical disk medium into the optical disk device or receives a bit stream through a digital broadcast wave.

Alternatively, the status holding unit 142 may hold the first status or the second status beforehand, with it being possible to omit the selection accepting unit 141 from the variable length code decoding device 20.

Figure 25:
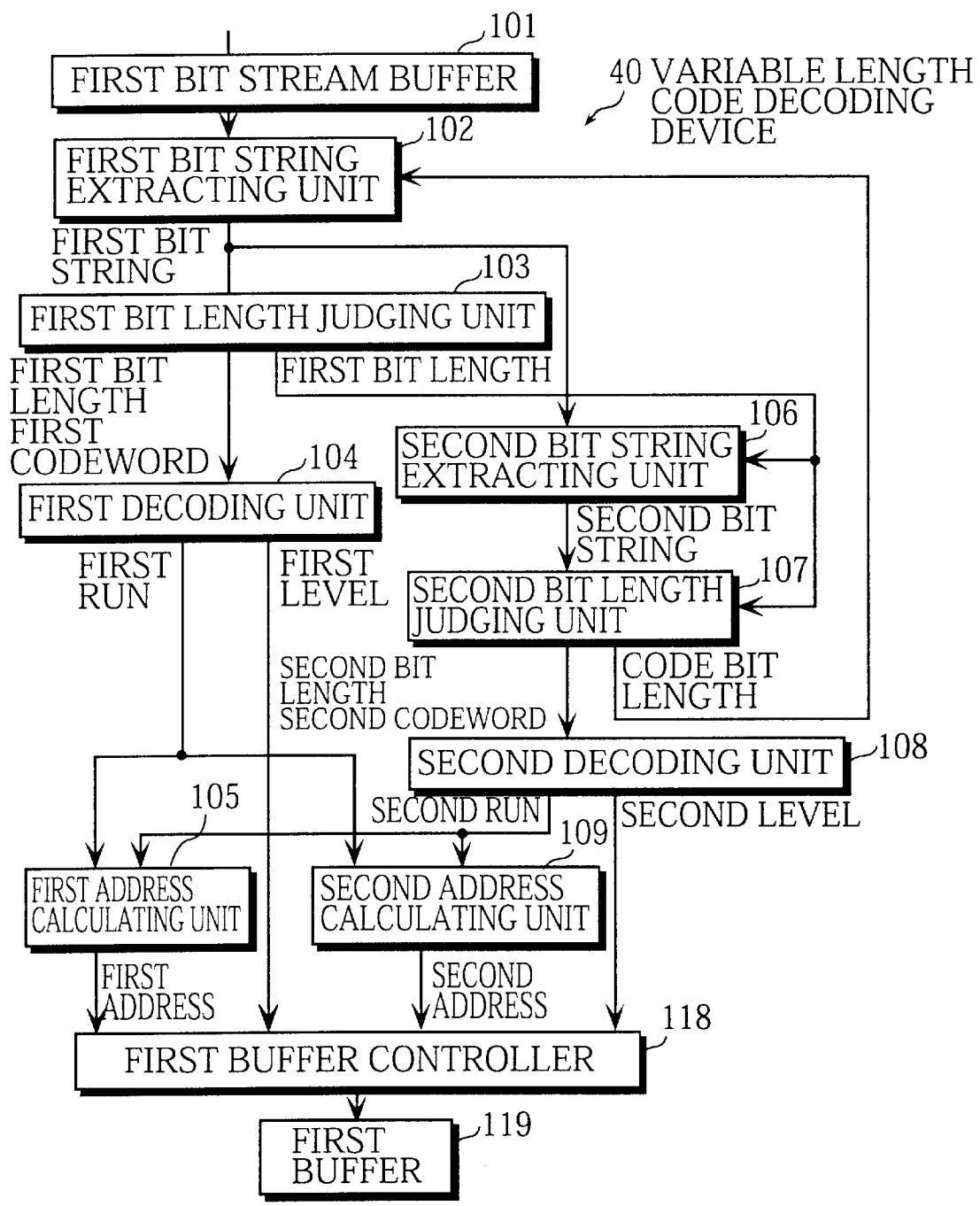
FIG. 25 is a block diagram showing a variant of the variable length code decoding device of the invention.

(9) FIG. 25 shows a variant of the variable length code decoding device of the invention. In the figure, a variable length code decoding device 40 includes a first bit stream buffer 101, a first bit string extracting unit 102, a first bit length judging unit 103, a first decoding unit 104, a first address calculating unit 105, a second bit string extracting unit 106, a second bit length judging unit 107, a second decoding unit 108, a second address calculating unit 109, a first buffer controller 118, and a first buffer 119.

Construction elements which have been labeled with the same reference numerals are the same as those in the variable length code decoding device 10, except for the first buffer controller 118 and the first buffer 119.

The first buffer controller 118 writes 0 into every area in the first buffer 119, as soon as an external unit reads the entire content of the first buffer 119 in the preceding block decode processing and the present block decode processing begins. After this, the first buffer controller 118 receives a first level from the first decoding unit 104, a first address from the first address calculating unit 105, a second level from the second decoding unit 108, and a second address from the second address calculating unit 109. The first buffer controller 118 then writes the received first and second levels into the first buffer 119 at the respective first and second addresses.

The first buffer 119 is a data buffer having 64 areas each for storing a level. Since a level is 12 bits long, the capacity of the first buffer 119 is 96 bytes in total. The first buffer 119 is connected to the external unit which reads levels from the first buffer 119.

Figure 26:
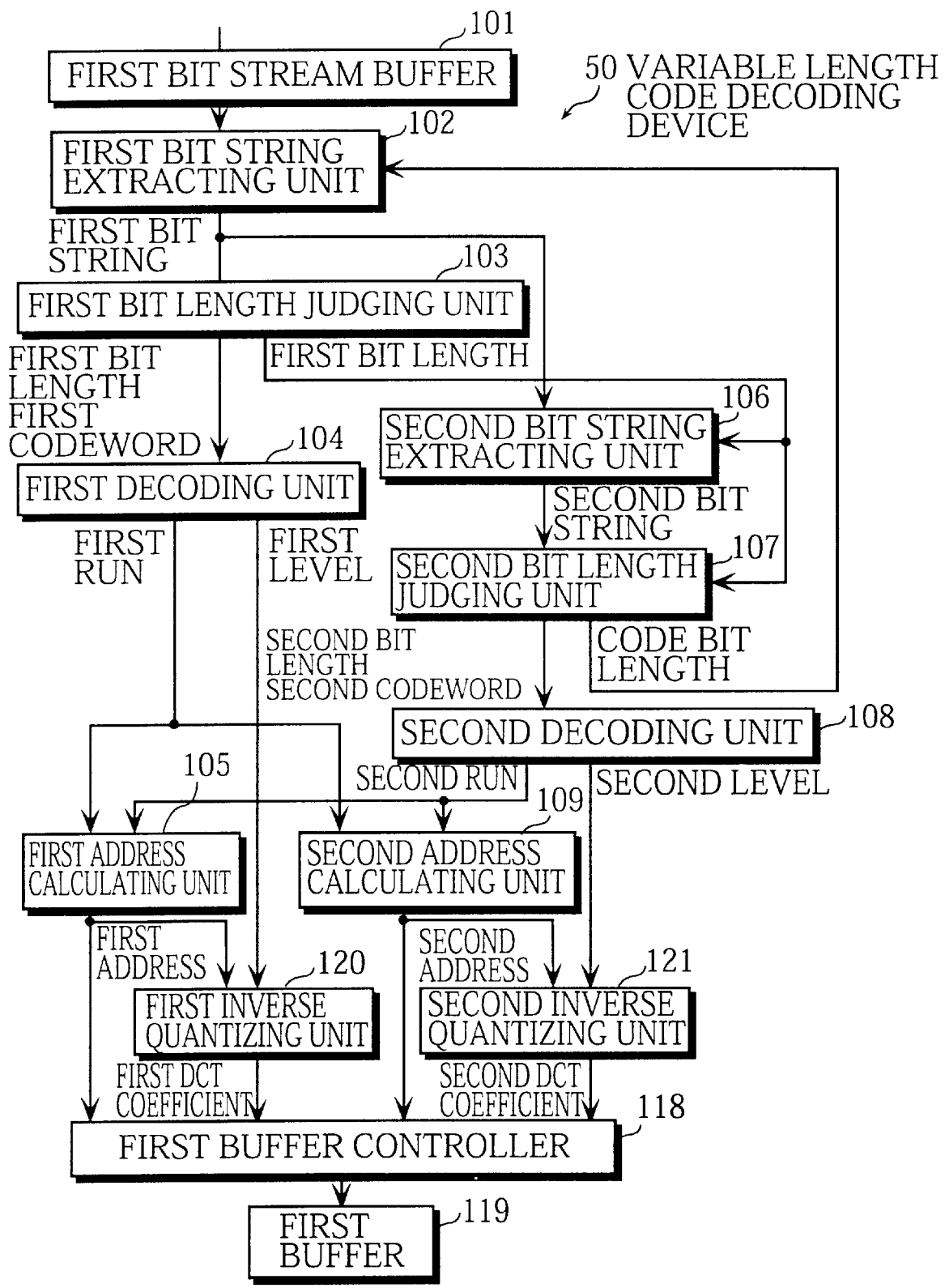
FIG. 26 is a block diagram showing a variant of the variable length code decoding device of the invention.
Figure 27:
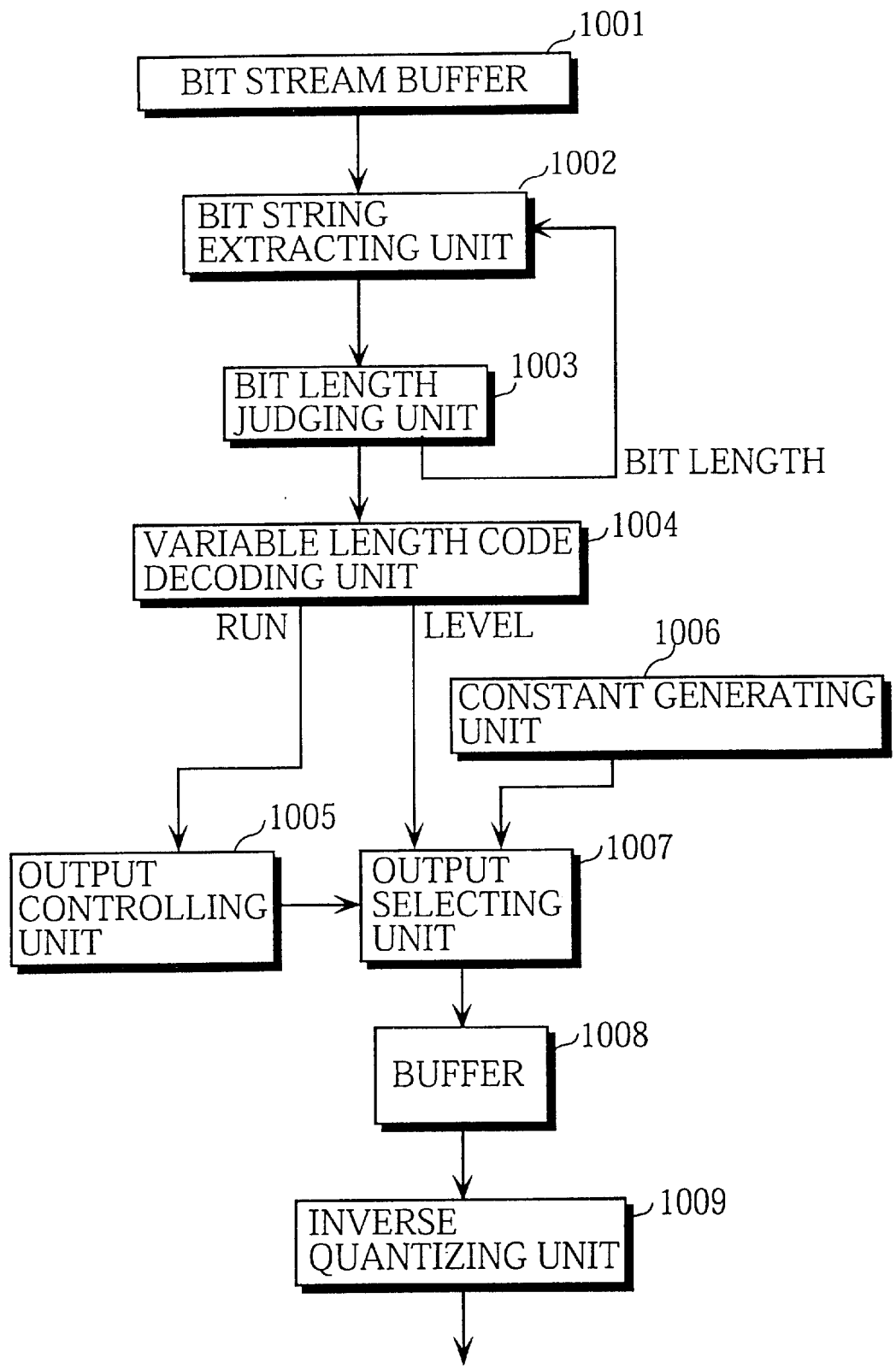
FIG. 27 is a block diagram showing the construction of a conventional variable length code decoding device.

(10) FIG. 26 shows another variant of the variable length code decoding device of the invention. In the figure, a variable length code decoding device 50 includes a first bit stream buffer 101, a first bit string extracting unit 102, a first bit length judging unit 103, a first decoding unit 104, a first address calculating unit 105, a second bit string extracting unit 106, a second bit length judging unit 107, a second decoding unit 108, a second address calculating unit 109, a first inverse quantizing unit 120, a second inverse quantizing unit 121, a first buffer controller 118, and a first buffer 119.

Construction elements which have been labeled with the same reference numerals are the same as those in the variable length code decoding device 10, except for the first buffer controller 118 and the first buffer 119.

The first buffer controller 118 writes 0 into every area of the first buffer 119, as soon as an external unit reads the entire content of the first buffer 119 in the preceding block decode processing and the present block decode processing begins. After this, the first buffer controller 118 receives a first DCT coefficient from the first inverse quantizing unit 120, a first address from the first address calculating unit 105, a second DCT coefficient from the second inverse quantizing unit 121, and a second address from the second address calculating unit 109. The first buffer controller 118 then writes the received first and second DCT coefficients into the first buffer 119 at the respective first and second addresses.

The first buffer 119 is a data buffer having 64 areas each for storing a DCT coefficient. Since a DCT coefficient is 12 bits long, the total capacity of the first buffer 119 is 96 bytes. The first buffer 119 is connected to the external unit which reads DCT coefficients from the first buffer 119.

(11) The second buffer 123 in the variable length code decoding device 10 may have 64 first data areas each of which is given a write flag and is used for storing a pair of first buffer address and DCT coefficient. This being so, having read all pairs of first buffer addresses and DCT coefficients from the second buffer 123, the second buffer controller 122 turns every write flag in the second buffer 123 OFF, instead of deleting the entire content of the second buffer 123. In so doing, the second buffer controller 122 can distinguish first data areas whose write flags are ON as being occupied, from first data areas whose write flags are OFF as being unoccupied. To write a pair of first buffer address and DCT coefficient into the second buffer 123, the second buffer controller 122 writes the pair into a first data area whose write flag is OFF and then turns the write flag ON.

Subsequently, the second buffer controller 122 sequentially reads pairs of first buffer addresses and DCT coefficients from first data areas whose write flags are ON, beginning with the start of the second buffer 123.

As a result, the need for writing 0 into every area of the second buffer 123 to delete its content is negated.

(12) The first buffer 119 in the variable length code decoding device 10 may have 64 second data areas each of which is given a write flag and is used for storing a DCT coefficient.

In this case, once the external unit has read the entire content of the first buffer 119 and the present block decode processing has begun, the first buffer controller 118 turns every write flag in the first buffer 119 OFF, instead of writing 0 into every area in the first buffer 119 to delete its content.

On receiving a pair of first buffer address and DCT coefficient from the second buffer controller 122, the first buffer controller 118 writes the DCT coefficient into a second data area in the first buffer 119 shown by the first buffer address, and then turns a write flag of the second data area ON.

When reading DCT coefficients from the first buffer 119, the external unit assumes each second data area whose write flag is OFF as storing a zero DCT coefficient, and reads 0 from such a second data area.

As a result, the need for writing 0 into every area in the first buffer 119 to delete its content is negated.

(13) The variable length code decoding device 10 has been provided with the first buffer 119 that is a data buffer having 64 areas each for storing a DCT coefficient. Let these 64 areas be collectively denoted by a first block area. Then the variable length code decoding device 10 may be modified as follows.

The first buffer 119 has another 64 areas, collectively called a second block area, each for storing a DCT coefficient. The first buffer controller 118 writes DCT coefficients of the present block into the first block area. Following this, an inverse DCT unit performs inverse DCT on the DCT coefficients written in the first block area. Meanwhile, having written the DCT coefficients into the first block area, the first buffer controller 118 writes DCT coefficients of the next block into the second block area. Following this, the inverse DCT unit performs inverse DCT on the DCT coefficients written in the second block area.

Thus, the first buffer controller 118 writes a block of DCT coefficients alternately into the first block area and the second block area, and the inverse DCT unit performs inverse DCT on the DCT coefficients which have just been written.

(14) As a variant of the variable length code decoding device 10, a variable length code decoding device 10*a* may decode header information in addition to image data.

Information which is compression-coded under the MPEG standards includes compression-coded image data and header information.

Header information is control information used when decoding image data, and includes coded header information elements as well as uncoded header information elements. Examples of coded header information elements are MBT (Macroblock Type), MHC (Motion Horizontal Code), DH (DMV (Differential Motion Vector) Horizontal), MVC (Motion Vertical Code), and SEF (Slice Extension Flag).

MBT referred to here shows the coding mode for a Macroblock (MB), MHC shows the difference of the horizontal component of the motion vector of the MB with the preceding MB, DH shows the horizontal differential vector when the dual prime prediction mode applies, and MVC shows the difference of the vertical component of the motion vector of the MB with the preceding MB. SEF is made up of a flag which bears the value of either 0 or 1 and a variable length code that follows. When the flag is 0, SEF indicates an SEF fixed value prestored in the variable length code decoding device 10*a*, whereas when the flag is 1, SEF indicates a control information element shown by the variable length code following the flag. Since the above listed header information elements are well known, their further explanation has been omitted here.

The elements such as MBT, MHC, DH, . . . , MVC, and SEF are arranged in an order conforming to MPEG.

It must be noted that MPEG header information is not limited to the above header information elements but includes other header information elements, although in this specification the header information is assumed to be basically composed of MBT, MHC, DH, MVC, and SEF for simplicity's sake.

Again for simplicity, this specification assumes that header information (made up of MBT, MHC, DH, MVC, and SEF in this order) and compression coded image data repeatedly alternate in MPEG compression coded information in this order.

(Construction of the Variable Length Code Decoding Device 10*a*)

Figure 28:
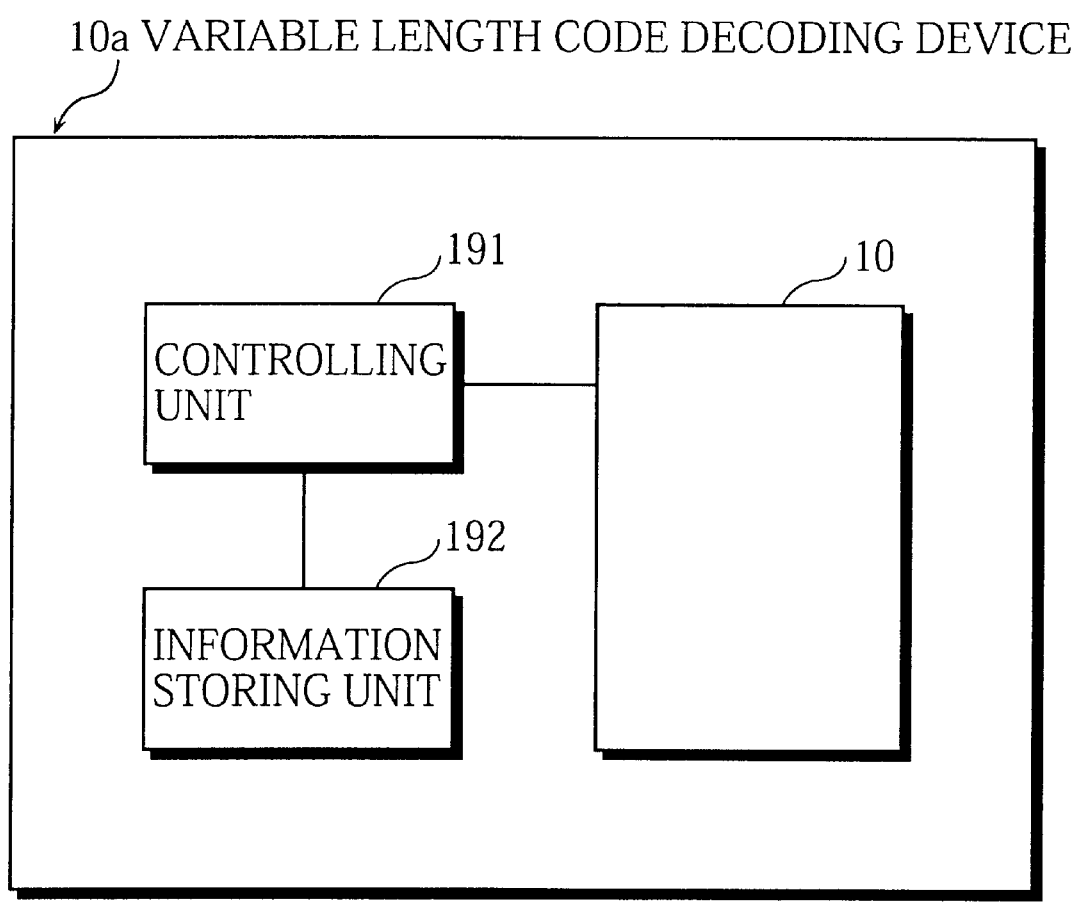
FIG. 28 is a block diagram showing a variant of the variable length code decoding device of the invention.
Figure 29:
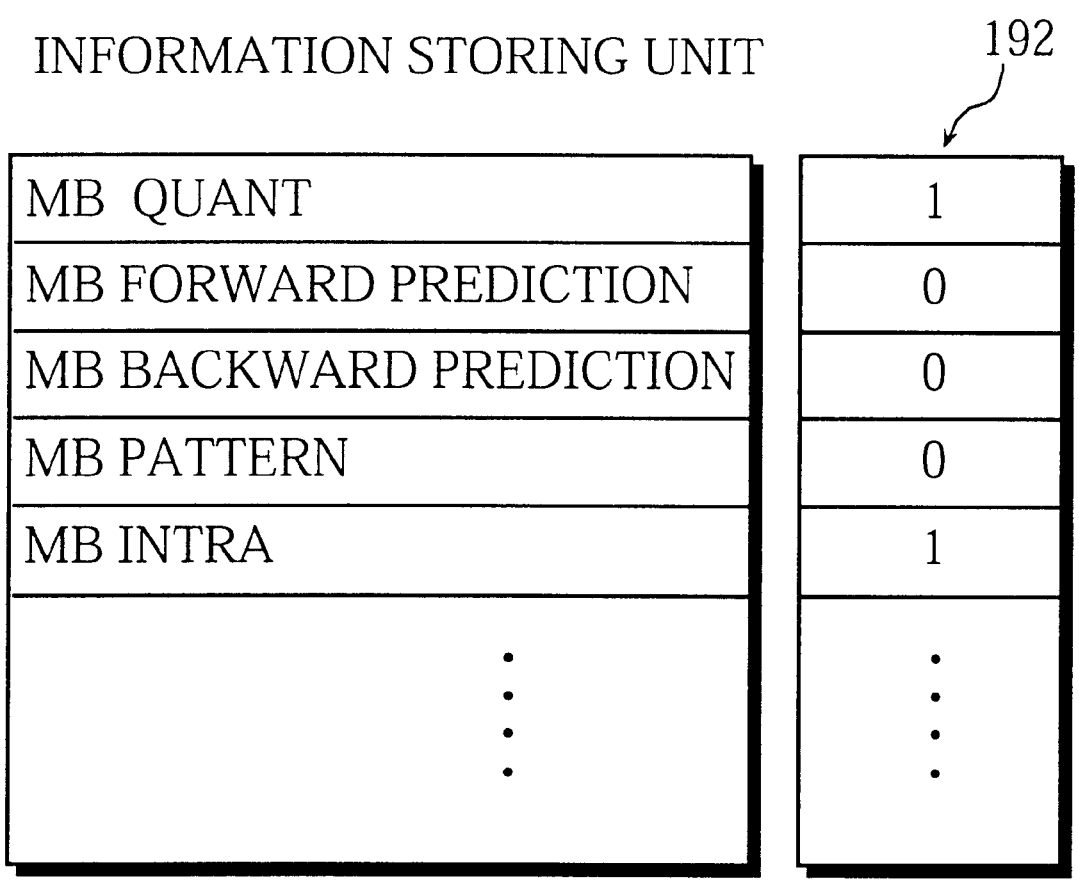
FIG. 29 shows an example of the content of an information storing unit in the variable length code decoding device shown in FIG. 28.

As shown in FIG. 28, the variable length code decoding device 10*a* has the construction of the variable length code decoding device 10 (designated by reference numeral 10) and further includes a controlling unit 191 and an information storing unit As an example, the information storing unit 192 stores control information elements for decoding of image data, such as "MB QUANT", "MB Forward Prediction", "MB Backward Prediction", "MB Pattern", and "MB Intra". These control information elements show the coding mode for the MB and are obtained by decoding MBT. Since these control information elements are well known, their explanation has been omitted.

Figure 30:
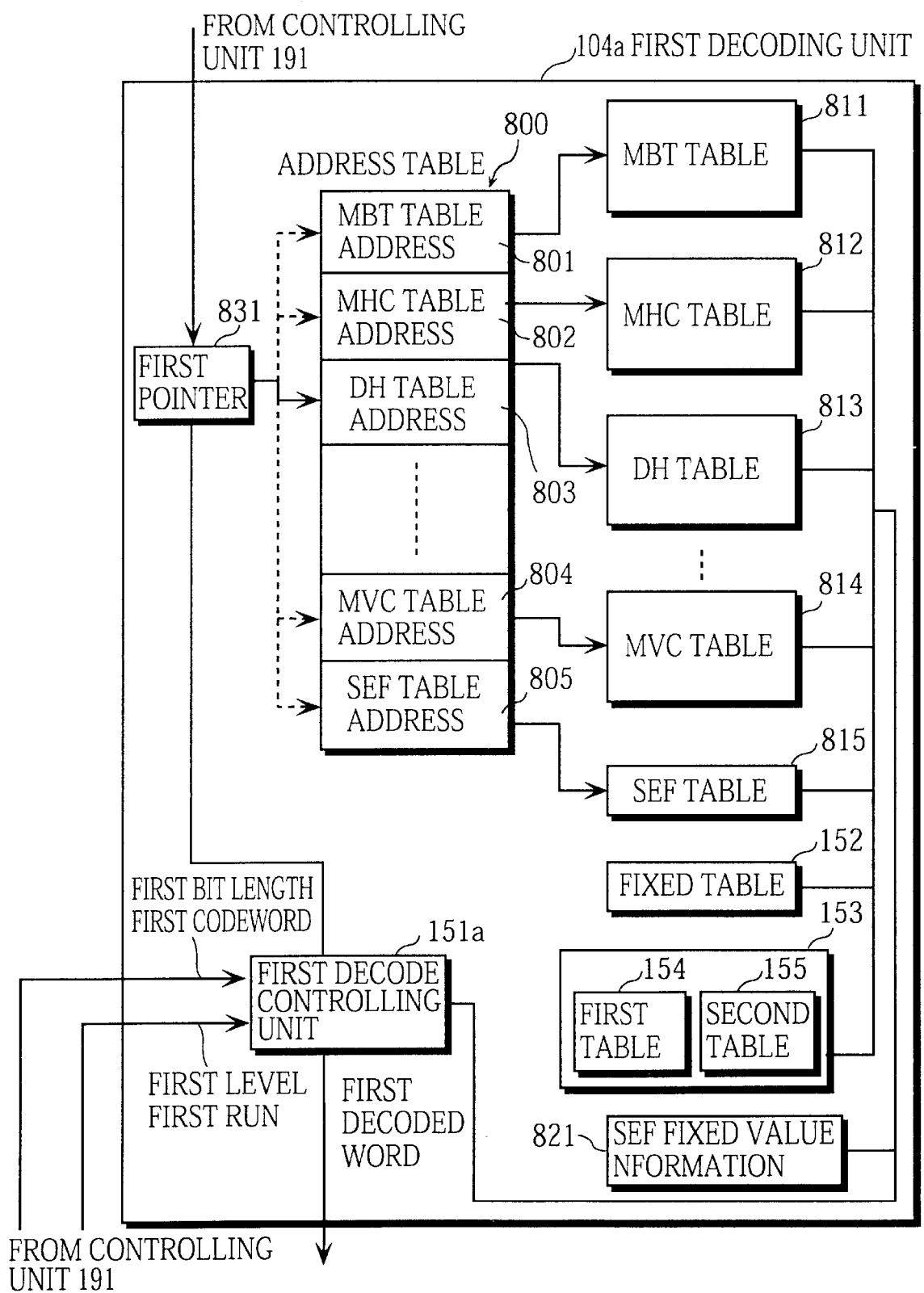
FIG. 30 is a block diagram showing the construction of a first decoding unit in the variable length code decoding device in FIG. 28.

The variable length code decoding device 10*a* is provided with a first decoding unit 104*a* in place of the first decoding unit 104. The first decoding unit 104*a* is roughly composed of a first decode controlling unit 151*a*, a first pointer 831, an address table 800, an MBT table 811, an MHC table 812, a DH table 813, . . . , an MVC table 814, an SEF table 815, a fixed table 152, an associative memory 153, and SEF fixed value information 821, as shown in FIG. 30.

The fixed table 152 and the associative memory 153 are analogous respectively to the fixed table 152 and the associative memory 153 included in the first decoding unit 104 in the variable length code decoding device 10.

The first pointer 831 specifies an address stored in the address table 800.

The address table 800 prestores an MBT table address 801, an MHC table address 802, a DH table address 803, . . . , an MVC table address 804, and an SEF table address 805 that are the start addresses of the respective MBT table 811, MHC table 812, DH table 813, . . . , MVC table 814, and SEF table 815.

The MBT table address 801, the MHC table address 802, the DH table address 803, the MVC table address 804, and the SEF table address 805 are arranged in the address table 800 in the order in which MBT, MHC, DH, ..., MVC, and SEF appeared in MPEG header information.

The MBT table 811, the MHC table 812, the DH table 813, ..., and the MVC table 814 are code tables used for decoding MBT, MHC, DH, ..., and MVC, respectively.

An example of the MBT table 811 is given in FIG. 31. As illustrated, the MBT table 811 shows variable length codes (VLCs) of MBT and control information elements, such as MB QUANT, MB Forward Prediction, MB Backward Prediction, MB Pattern, and MB Intra, obtained when decoding the respective variable length codes.

Likewise, the MHC table 812, the DH table 813, ..., the MVC table 814, and the SEF table 815 each show variable length codes and control information elements obtained when decoding the respective variable length codes.

The SEF fixed value information 821 is the SEF fixed value mentioned above.

The first decode controlling unit 151a controls the decoding of image data in the same manner as the first decode controlling unit 151. The detailed operation of the first decode controlling unit 151a will be explained later, focusing on the difference with the first decode controlling unit 151.

The variable length code decoding device 10a is also provided with a second decoding unit 108a in place of the second decoding unit 108. Like the first decoding unit 104a, the second decoding unit 108a includes a second pointer, a second decode controlling unit, an address table, a plurality of code tables, and so on.

(Operation of the Variable Length Code Decoding Device 10a)

Figure 32:
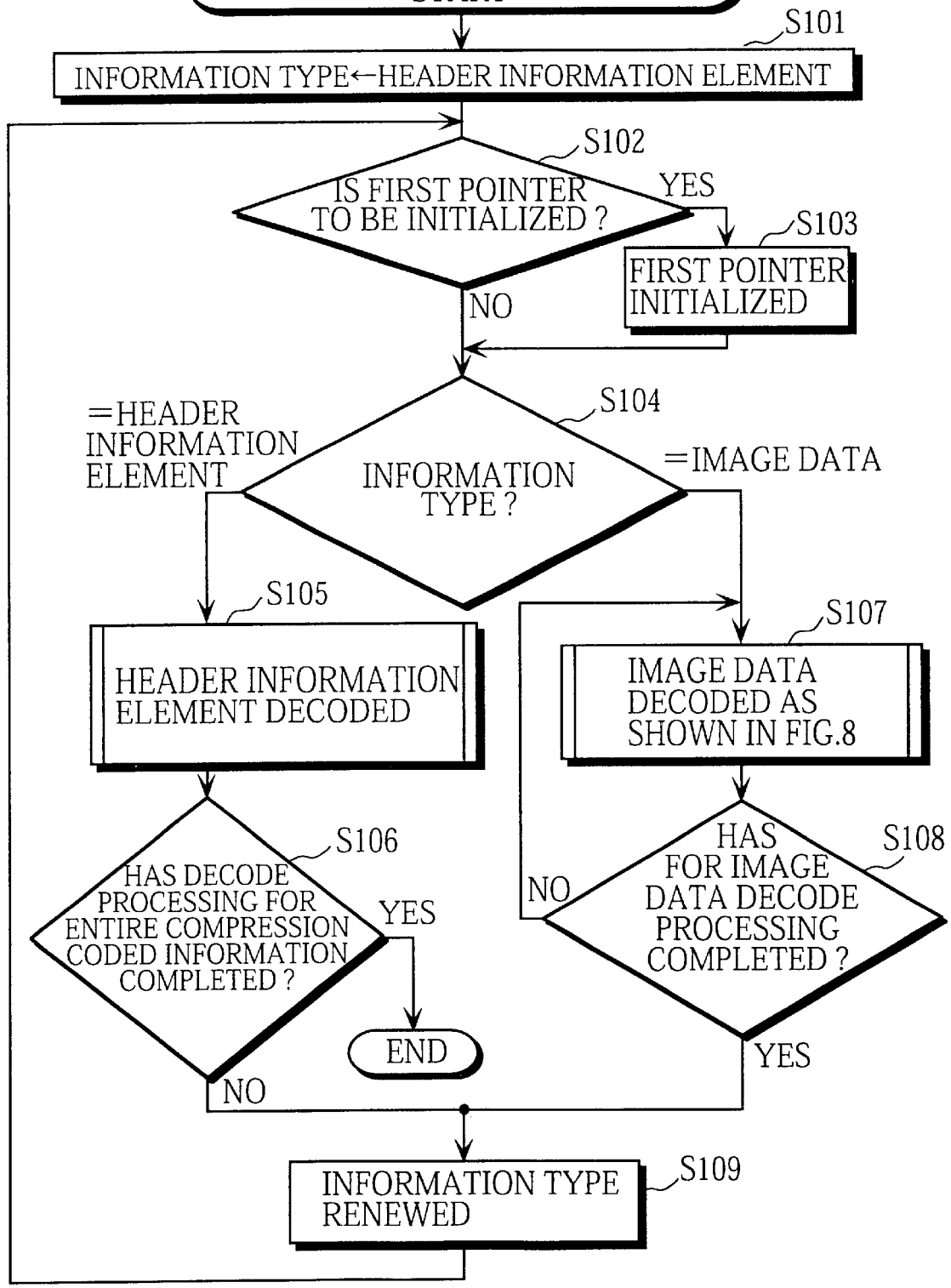
FIG. 32 is a flowchart showing the general operation of the variable length code decoding device in FIG. 28.

FIG. 32 is a flowchart showing the general operation of the variable length code decoding device 10a.

Initially, the controlling unit 191 sets MBT which appears first in header information, as "information type" that specifies a type of information to be decoded (S101).

The controlling unit 191 then judges whether to initialize the first pointer 831 (S102). If decoding of compression coded image data has been completed and MBT in the next header information has been read, the first pointer 831 has to be initialized. To initialize the first pointer 831, the controlling unit 191 sets "(MBT Table Address 801)-2" in the first pointer 831 (S103). Next, the controlling unit 191 checks whether the information type is a header information element or image data (S104). If the information type is a header information element, that header information element is decoded (S105). Once the decode processing for all sequences (i.e. the entire MPEG compression coded information) has completed (S106), the variable length code decoding device 10a ends its operation. The judgement in step S106 is made according to a control information element called sequence end information (not mentioned above). If the entire decode processing has not yet completed, the controlling unit 191 sets information to be decoded next as the information type (S109) and returns to step S102.

If the information type is image data in step S104, the controlling unit 191 decodes the image data as shown in FIG. 8 (S107). Having completed the decoding of the image data (S108), the controlling unit 191 proceeds to step S109.

(Operation of Decoding Header Information)

Figure 33:
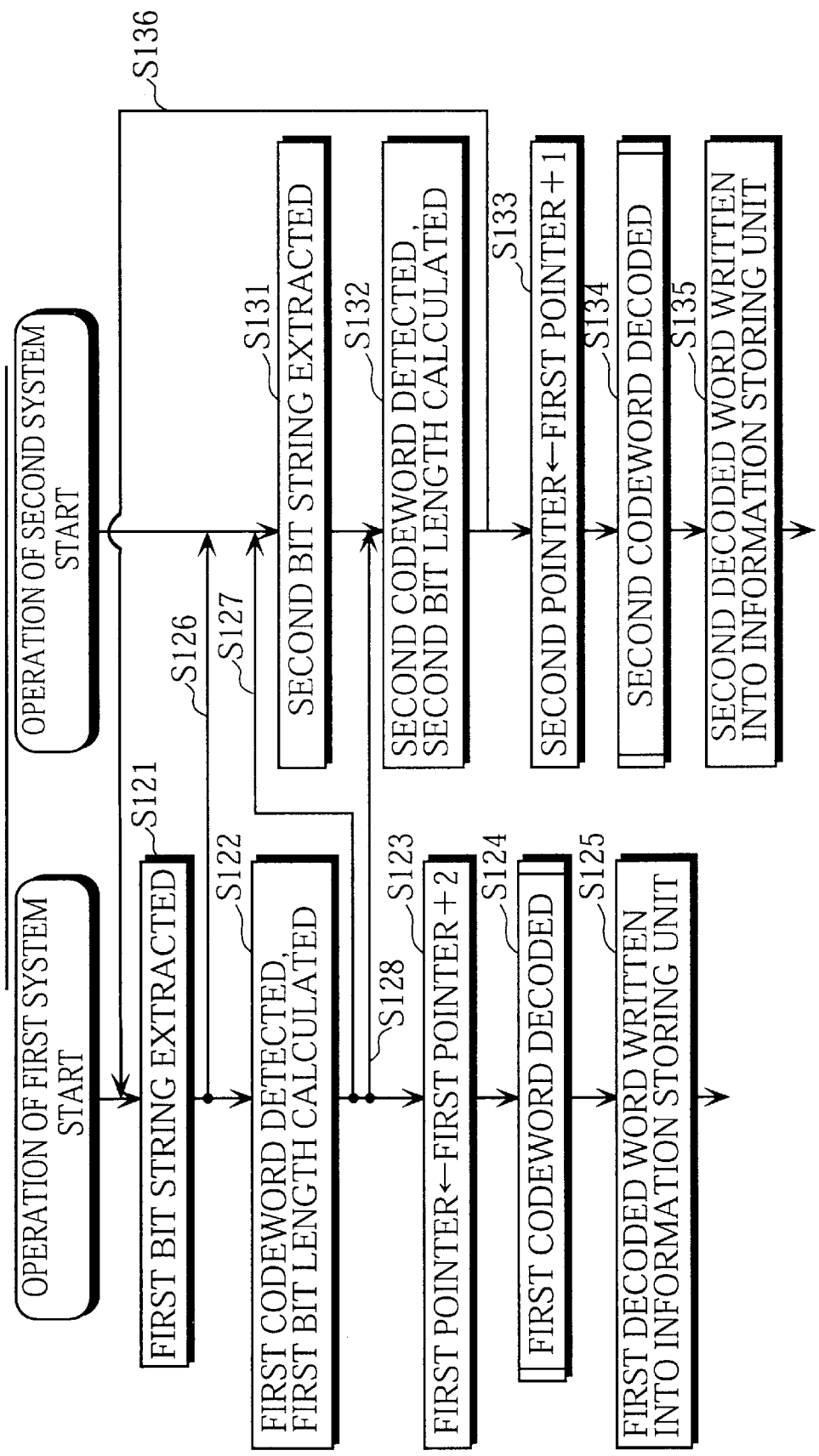
FIG. 33 is a flowchart showing the operation of decoding header information in the variable length code decoding device in FIG. 28.

FIG. 33 is a flowchart showing in greater detail the operation of decoding header information in step S105 shown in FIG. 32.

As with the variable length code decoding device 10, in the variable length code decoding device 10a the first bit string extracting unit 102, the first bit length judging unit 103, the first decoding unit 104a, the first address calculating unit 105, and the first inverse quantizing unit 120 are collectively called the first system, and the second bit string extracting unit 106, the second bit length judging unit 107, the second decoding unit 108a, the second address calculating unit 109, and the second inverse quantizing unit 121 are collectively called the second system.

(a) Operation of the First System

The first bit string extracting unit 102 extracts from the first bit stream buffer 101 a bit string of 48 bits starting from a bit position shown by a bit string extract position held therein, and outputs the extracted bit string to the first bit length judging unit 103 as a first bit string (S121). The first bit string extracting unit 102 also outputs the first bit string to the second bit string extracting unit 106 (S126).

The first bit length judging unit 103 detects a codeword from the beginning of the first bit string as a first codeword, calculates the bit length of the first codeword as a first bit length, and outputs the first codeword and the first bit length to the first decoding unit 104a (S122). The first bit length judging unit 103 also outputs the first bit length to the second bit string extracting unit 106 (S127) and to the second bit length judging unit 107 (S128).

The controlling unit 191 increments the first pointer 831 by 2 (S123).

On receiving the first codeword and the first bit length from the first bit length judging unit 103, the first decode controlling unit 151a in the first decoding unit 104a retrieves from the address table 800 a table address specified by the first pointer 831, and decodes the first codeword into a first decoded word with reference to a code table shown by the retrieved table address (S124). The controlling unit 191 writes the first decoded word into a predetermined area in the information storing unit 192 (S125).

(b) Operation of the Second System

The second bit string extracting unit 106 receives the 48-bit first bit string from the first bit string extracting unit 102 (S126) and the first bit length from the first bit length judging unit 103 (S127). The second bit string extracting unit 106 removes a bit string as long as the first bit length from the beginning of the first bit string and outputs the remaining bit string to the second bit length judging unit 107 as a second bit string (S131).

The second bit length judging unit 107 receives the first bit length from the first bit length judging unit 103 (S128) and the second bit string from the second bit string extracting unit 106. The second bit length judging unit 107 detects a codeword from the beginning of the second bit string as a second codeword, calculates the bit length of the second codeword as a second bit length, and outputs the second codeword and the second bit length to the second decoding unit 108a (S132). The second bit length judging unit 107 also calculates a code bit length and outputs it to the first bit string extracting unit 102 which accordingly adds the code bit length to the bit string extract position to renew the bit string extract position (S136).

The controlling unit 191 adds 1 to the first pointer 831 and sets the addition result as the second pointer (S133).

Having received the second codeword and the second bit length from the second bit length judging unit 107, the second decoding unit 108a retrieves from its address table a table address specified by the second pointer, and decodes the second codeword into a second decoded word with reference to a code table shown by the retrieved table address (S134). The controlling unit 191 writes the second decoded word into a predetermined area in the information storing unit 192 (S135).

(Operation of the First Decode Controlling Unit 151a)

Figure 34:
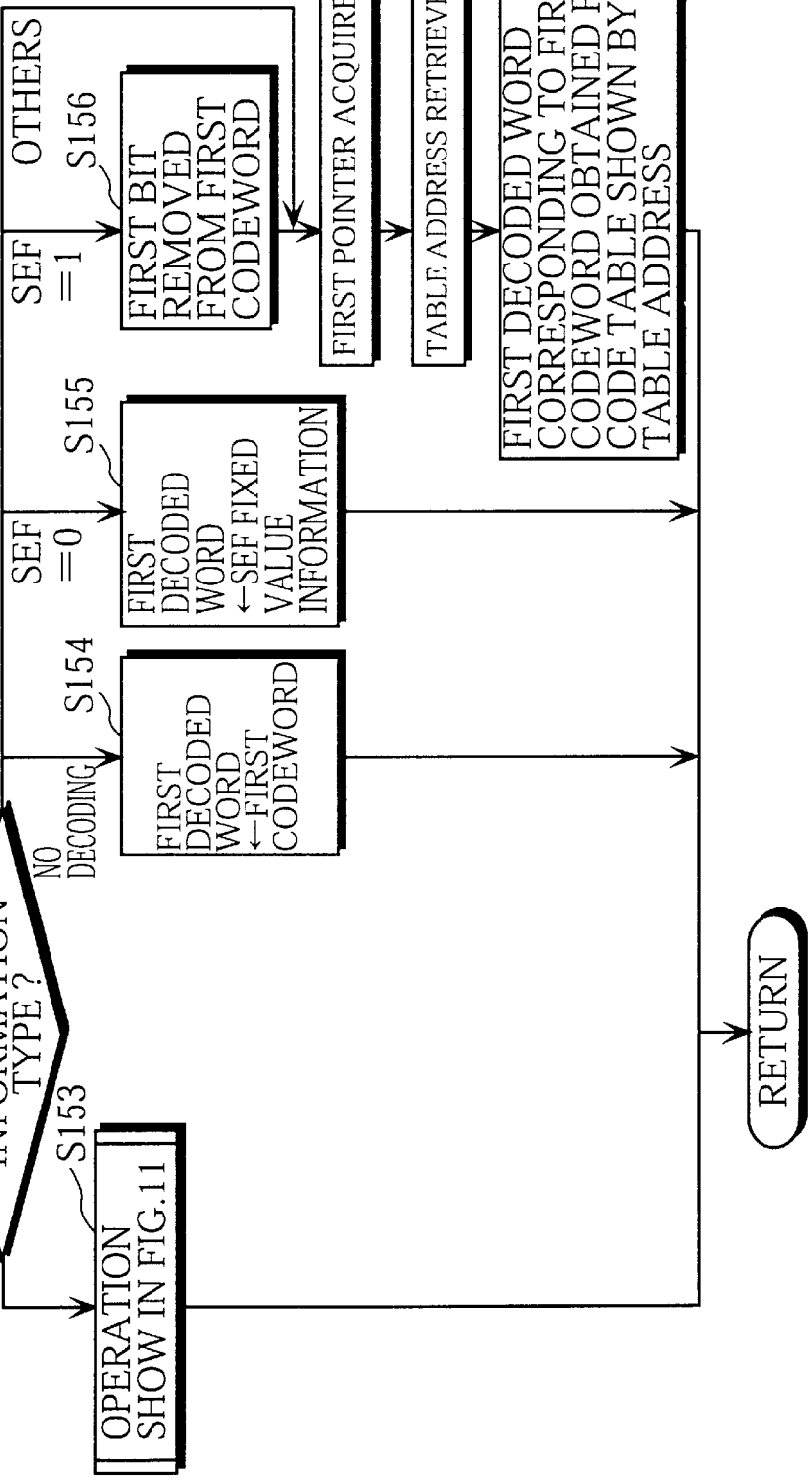
FIG. 34 is a flowchart showing the operation of a first decode controlling unit in the first decoding unit in FIG. 30.

FIG. 34 is a flowchart showing in greater detail the operation of decoding the first codeword by the first decode controlling unit 151a in step S124 shown in FIG. 33.

The first decode controlling unit 151a receives the information type from the controlling unit 191 (S151).

Figure 11:
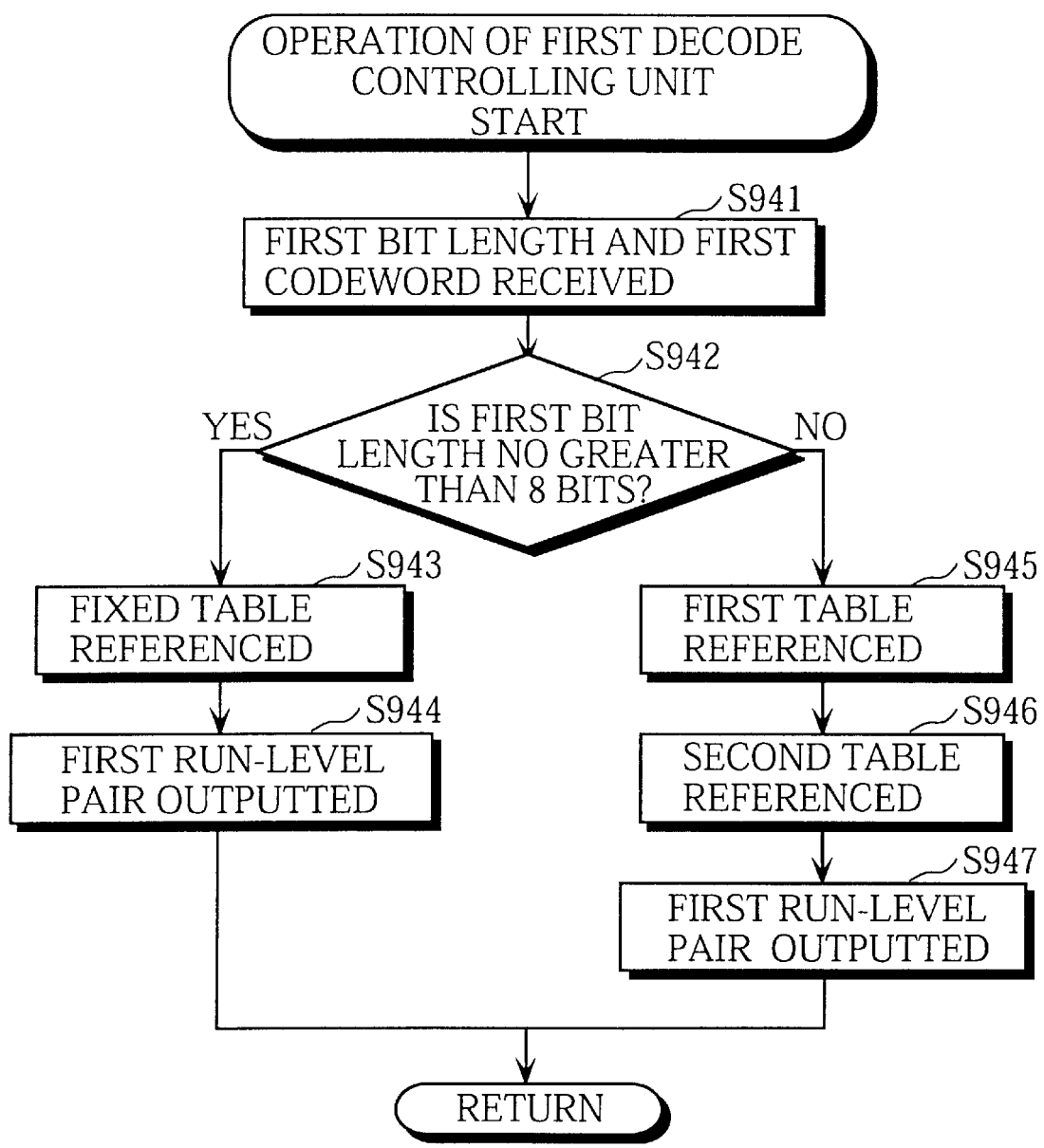
FIG. 11 is a flowchart showing the operation of a first decode controlling unit in the first decoding unit in FIG. 2.

When the information type is image data (S152), the first decode controlling unit 151a performs the operation shown in FIG. 11 (S153).

When the information type is an uncoded header information element (S152), the first decode controlling unit 151a sets the first codeword as the first decoded word (S154).

When the information type is SEF whose flag is 0 (S152), the first decode controlling unit 151a sets the SEF fixed value information 821 as the first decoded word (S155).

When the information type is SEF whose flag is 1 (S152), the first decode controlling unit 151a removes the first bit (i.e. the flag) from the first codeword (S1S6), acquires the first pointer 831 (S157), retrieves from the address table 800 a table address specified by the first pointer 831 (S158), and decodes the first codeword into the first decoded word with reference to a code table shown by the retrieved table address (S59).

When, on the other hand, the information type is a coded header information element other than SEF (S152), the first decode controlling unit 151a proceeds to step S157.

(Conclusion)

As described above, the variable length code decoding device 10a decodes not only image data but also header information. The header information includes header information elements which were coded using separate code tables. Accordingly, the variable length code decoding device 10a stores code tables for decoding these coded header information elements, and decodes each coded header information element by switching between the stored code tables. Also, the variable length code decoding device 10a decodes two consecutive header information elements in parallel by means of the first decoding unit 104a and the second decoding unit 108a.

Though the first decoding unit 104a and the second decoding unit 108a are each equipped with the address table, the MBT table, the MHC table, the DH table, . . . , the MVC table, the SEF table, the fixed table, the associative memory, and the SEF fixed value information, these tables and information may be equipped in one of the first decoding unit 104a and the second decoding unit 108a and shared by both of them.

Also, header information may be exclusively decoded by the first decoding unit 104a. In such a case, the first pointer 831 is incremented by 1.

Figure 35:
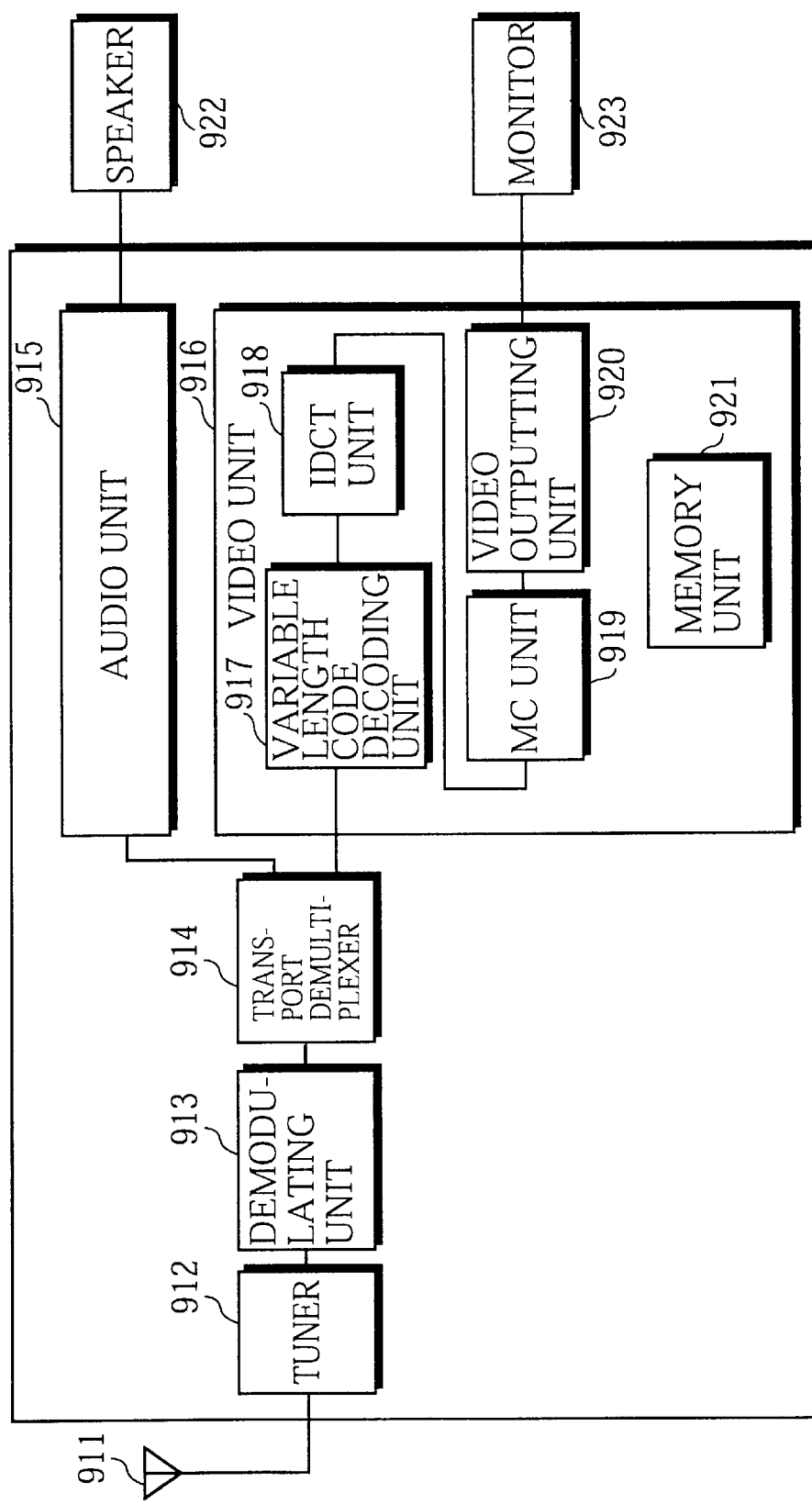
FIG. 35 is a block diagram showing the construction of a digital broadcast receiving apparatus which employs the variable length code decoding device of the invention.

(15) As a typical application of the variable length code decoding device of the invention, a digital broadcast receiving apparatus 901 for decoding a compressed code stream transmitted on a digital broadcast wave to reproduce image information is illustrated in FIG. 35.

In the figure, an antenna 911 receives the digital broadcast wave which contains the compressed code stream of image information. The digital broadcast receiving apparatus 901 includes a tuner 912 for selecting from the received digital broadcast wave a signal of a designated channel, a demodulating unit 913 for generating a transport stream (TS) and descrambling the TS after demodulation and error correction, a transport demultiplexer 914 for separating from the TS into program information, an audio stream, and a video stream (which includes the compressed code stream), an audio unit 915 for decoding the audio stream into audio signals and outputting them to a speaker 922, and a video unit 916 for decoding the video stream into video signals and outputting them to a monitor 923. Consequently, sounds are outputted from the speaker 922 and images are displayed on the monitor 923.

The video unit 916 is equipped with the variable length code decoding device described above. The video unit 916 includes a variable length code decoding unit 917 for decoding the video stream into DCT coefficients, an IDCT unit 918 for performing inverse DCT on the generated DCT coefficients, an MC (Motion Compensation) unit 919 for performing motion compensation, a video outputting unit 920 for generating video signals, and a memory unit 921 for storing a plurality of frames of video.

With this construction, the digital broadcast receiving apparatus 901 can reproduce images and sounds from a received digital broadcast wave.

Figure 36:
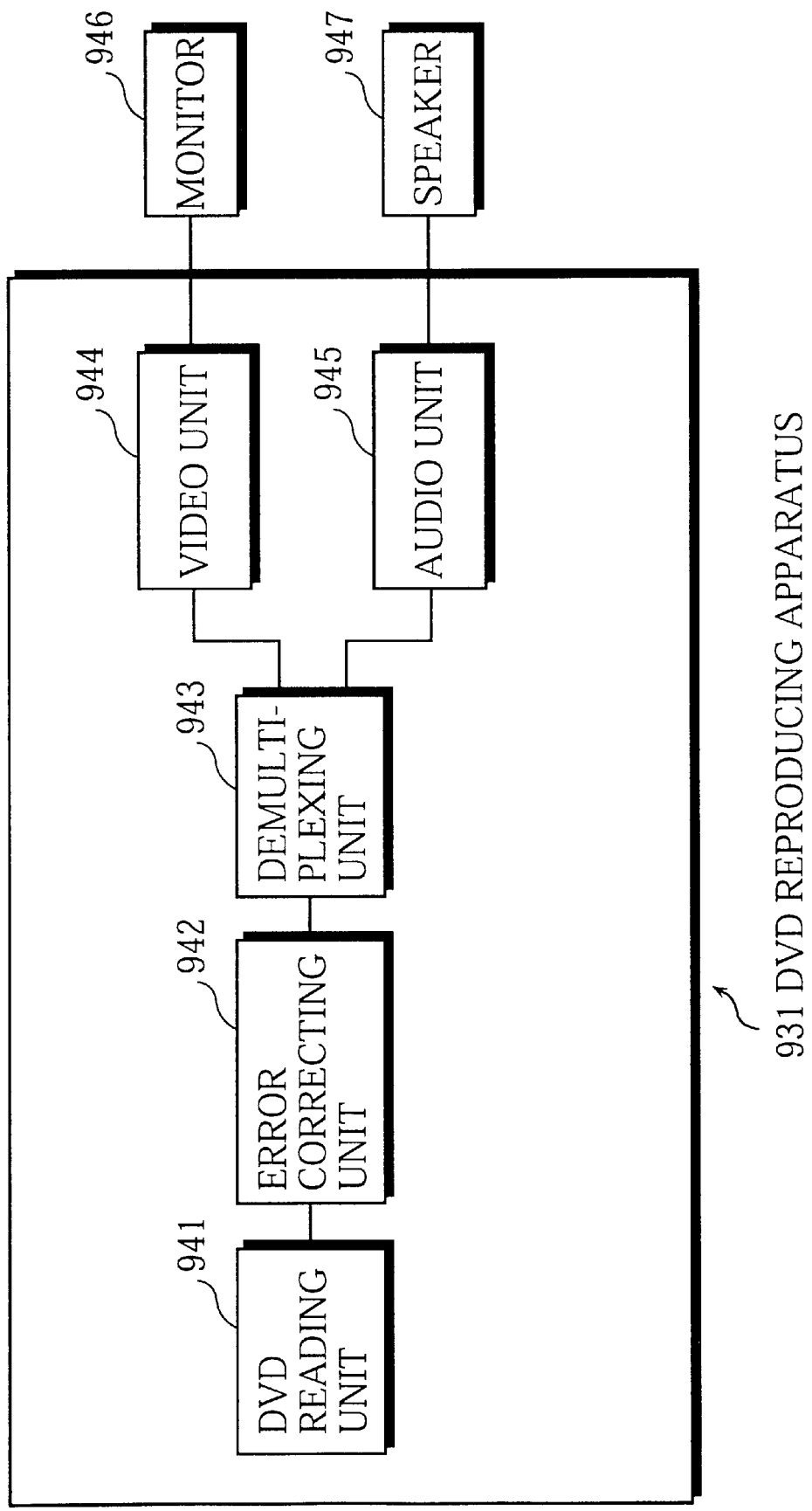
FIG. 36 is a block diagram showing the construction of a DVD reproducing apparatus which employs the variable length code decoding device of the invention.

(16) As another typical application of the variable length code decoding device of the invention, a DVD (Digital Versatile Disk) reproducing apparatus 931 for decoding a compressed code stream recorded on a DVD to reproduce image information is illustrated in FIG. 36.

The DVD reproducing apparatus 931 is roughly made up of a DVD reading unit 941 for reading data from the DVD, an error correcting unit 942 for performing error correction, a demultiplexing unit 943 for separating an audio stream and a video stream (which includes the compressed code stream), an audio unit 945 for decoding the audio stream into audio signals and outputting them to a speaker 947, and a video unit 944 for decoding the video stream into video signals and outputting them to a monitor 946. This video unit 944 has the same construction as the video unit 916 in the digital broadcast receiving apparatus 901, including a variable length code decoding unit made up of the above described variable length code decoding device.

With this construction, the DVD reproducing apparatus 931 can reproduce images and sounds from a DVD.

(17) Varying combinations of the embodiments and modifications described above are also applicable.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A variable length code decoding device comprising:
   code extracting means for extracting two consecutive codewords from a compressed code stream that is made up of a sequence of a plurality of variable length codewords;
   wherein the compressed code stream includes a plurality of codewords that have each been generated as a result of quantizing and entropy coding at least one signal, hereafter referred to as a signal set, which belongs to a block of signals each generated by applying orthogonal transform to image data, and parallel decoding means for decoding the extracted two codewords in parallel, wherein the parallel decoding means includes:

code decoding means for entropy decoding the extracted two codewords in parallel to generate two decoded words; and signal reconstructing means for performing inverse quantization with the two decoded words in parallel to reconstruct two original signal sets.

2. The variable length code decoding device of claim 1, wherein each codeword has been generated by entropy coding a run-level pair that represents a quantized signal set, the run-level pair being made up of a run which is a number of zero signals in the quantized signal set and a level which is a value of an immediately following nonzero signal in the quantized signal set, wherein the code extracting means extracts the two consecutive codewords as first and second codewords, and includes:

position storing means for storing position information which specifies a position of the first codeword in the compressed code stream;

first extracting means for extracting from the compressed code stream the first codeword located in the position specified by the position information, and calculating a length of the first codeword; and second extracting means for extracting from the compressed code stream the second codeword located in a position specified by a sum of the position information and the calculated length, wherein the code decoding means entropy decodes the extracted first and second codewords to generate first and second run-level pairs as the two decoded words, and includes:

first decoding means for entropy decoding the first codeword into the first run-level pair; and second decoding means for entropy decoding the second codeword into the second run-level pair, and wherein the signal reconstructing means reconstructs the two original signal sets based on the first and second run-level pairs.

3. The variable length code decoding device of claim 2, wherein the first decoding means includes:

a first table having areas which each have an address no greater than a first predetermined length and store a run-level pair corresponding to the address, the address being a codeword for the corresponding run-level pair that is generated when entropy coding the corresponding run-level pair;

a second table having areas which each have an address greater than the first predetermined length and store a unique value;

a third table having a separate area for each of the areas in the second table, the area in the third table having an address equal to a value stored in the area in the second table and storing a run-level pair corresponding to the address, where an address of the area in the second table is a codeword for the corresponding run-level pair that is generated when entropy coding the corresponding run-level pair stored in the area in the third table; and first decode controlling means for when the first codeword is no greater than the first predetermined length, retrieving from the first table a corresponding run-level pair stored in an area whose address is the first codeword, and setting the retrieved run-level pair as the first run-level pair, and when the first codeword is greater than the first predetermined length, reading from the second table a value stored in an area whose address is the first codeword, retrieving from the third table a corresponding run-level pair stored in an area whose address is the read value, and setting the retrieved run-level pair as the first run-level pair.

4. The variable length code decoding device of claim 3, wherein the second decoding means includes:

a fourth table having areas which each have an address no greater than the first predetermined length and store a run-level pair corresponding to the address, the address being a codeword for the corresponding run-level pair that is generated when entropy coding the corresponding run-level pair;

a fifth table having areas which each have an address greater than the first predetermined length and store a unique value;

a sixth table having a separate area for each of the areas in the fifth table, the area in the sixth table having an address equal to a value stored in the area in the fifth table and storing a run-level pair corresponding to the address, where an address of the area in the fifth table is a codeword for the corresponding run-level pair which is generated when entropy coding the corresponding run-level pair stored in the area in the sixth table; and second decode controlling means for when the second codeword is no greater than the first predetermined length, retrieving from the fourth table a corresponding run-level pair stored in an area whose address is the second codeword, and setting the retrieved run-level pair as the second run-level pair, and when the second codeword is greater than the first predetermined length, reading from the fifth table a value stored in an area whose address is the second codeword, retrieving from the sixth table a corresponding run-level pair stored in an area whose address is the read value, and setting the retrieved run-level pair as the second run-level pair.

5. The variable length code decoding device of claim 3, wherein the second extracting means extracts a codeword generated by entropy coding a run-level pair whose run is 0, as the second codeword, and wherein the second decoding means includes:

a variable length code table having areas which each have an address and store a level of a rum-level pair corresponding to the address whose run is 0, the address being a codeword for the corresponding run-level pair that is generated when entropy coding the corresponding run-level pair; and second decode controlling means for retrieving from the variable length code table a level stored in an area whose address is the second codeword, and pairing the retrieved level with a run being 0 to generate the second run-level pair.

6. The variable length code decoding device of claim 3, wherein the second extracting means extracts a codeword no greater than a second predetermined length as the second codeword, and wherein the second decoding means includes:
  a variable length code table having areas which each have an address no greater than the second predetermined length and store a run-level pair corresponding to the address, the address being a codeword for the corresponding run-level pair that is generated when entropy coding the corresponding run-level pair; and
  second decode controlling means for retrieving from the variable length code table a corresponding run-level pair stored in an area whose address is the second codeword, and setting the retrieved run-level pair as the second run-level pair.

7. The variable length code decoding device of claim 6, wherein the signal reconstructing means includes:
  first address calculating means for calculating, based on the first run-level pair generated by the first decoding means, a first address showing a location of a level of the first run-level pair within a block;
  second address calculating means for calculating, based on the second run-level pair generated by the second decoding means, a second address showing a location of a level of the second run-level pair within the block;
  first inverse quantizing means for inverse quantizing the level of the first run-level pair using the calculated first address, to generate a first coefficient;
  second inverse quantizing means for inverse quantizing the level of the second run-level pair using the calculated second address, to generate a second coefficient; and
  reconstructing means for reconstructing the two original signal sets using a combination of the first address and the first coefficient and a combination of the second address and the second coefficient.

8. The variable length code decoding device of claim 7, wherein the reconstructing means includes:
  coefficient storing means for storing address-coefficient pairs;
  coefficient writing means for writing the combination of the first address and the first coefficient and the combination of the second address and the second coefficient into the coefficient storing means as two address-coefficient pairs;
  block storing means having areas each of which has an address and initially stores a zero value;
  block writing means for sequentially reading the two address-coefficient pairs from the coefficient storing means, and writing a coefficient of each of the read address-coefficient pairs into an area in the block storing means specified by an address of the address-coefficient pair; and
  signal generating means for reading values from part of the areas in the block storing means and generating the two original signal sets from the read values.

9. The variable length code decoding device of claim 8, wherein the coefficient storing means has areas each of which is given a flag being initially OFF and is used for storing an address-coefficient pair,
  the coefficient writing means writes the two address-coefficient pairs into respective areas in the coefficient storing means whose flags are OFF, and then turns the flags ON, and
  the block writing means sequentially reads the address-coefficient pairs from the areas with the ON flags in the coefficient storing means, and, having read the address-coefficient pairs, turns the flags OFF.

10. The variable length code decoding device of claim 8, wherein the areas in the block storing means are each given a flag which is initially OFF,
  the block writing means, having written the coefficient into the area in the block storing means specified by the address, turns a flag of the area ON, and
  the signal generating means, having generated the two original signal sets, turns ON flags in the block storing means OFF.

11. The variable length code decoding device of claim 1 further comprising
  selection accepting means for accepting a selection between decoding of a first compressed code stream and decoding of first and second compressed code streams, the first compressed code stream being the compressed code stream and the second compressed code stream being another compressed code stream made up of a sequence of variable length codewords, the second compressed code stream including a plurality of codewords that have each been generated as a result of quantizing and entropy coding a signal set which belongs to a block of signals each generated by applying orthogonal transform to image data,
  wherein the code extracting means
    (a) extracts the two consecutive codewords from the first compressed code stream in a first case where the decoding of the first compressed code stream is selected, and
    (b) extracts two codewords respectively from the first and second compressed code streams in a second case where the decoding of the first and second compressed code streams is selected, and
  wherein the code decoding means entropy decodes the extracted two codewords in parallel.

12. The variable length code decoding device of claim 11, wherein the code extracting means extracts, as first and second codewords, the two consecutive codewords from the first compressed code stream in the first case and the two codewords respectively from the first and second compressed code streams in the second case, and includes:
  position storing means for storing first position information and second position information, the first position information specifying a position of the first codeword in the first compressed code stream, and the second position information specifying a position of the second codeword in the second compressed code stream;
  first extracting means for extracting from the first compressed code stream the first codeword located in the position specified by the first position information, and calculating a length of the first codeword; and
  second extracting means for
    (a) in the first case extracting from the first compressed code stream the second codeword located in a position specified by a sum of the first position information and the calculated length, and
    (b) in the second case extracting from the second compressed code stream the second codeword located in the position specified by the second position information, and
  wherein the code decoding means entropy decodes the extracted first and second codewords to generate two decoded words.

13. The variable length code decoding device of claim 12, wherein each codeword has been generated by entropy coding a run-level pair that represents a quantized signal set, the run-level pair being made up of a run which is a number of zero signals in the quantized signal set and a level which is a value of an immediately following nonzero signal in the quantized signal set, wherein the code decoding means entropy decodes the first and second codewords to generate first and second run-level pairs as the two decoded words, and includes:
 first decoding means for entropy decoding the first codeword into the first run-level pair; and
 second decoding means for entropy decoding the second codeword into the second run-level pair, and
 wherein the signal reconstructing means reconstructs two original signal sets based on the first and second run-level pairs.

14. The variable length code decoding device of claim 13, wherein the signal reconstructing means includes:
 first address calculating means for calculating, based on the first run-level pair generated by the first decoding means, a first address showing a location of a level of the first run-level pair within a block;
 second address calculating means for calculating, based on the second run-level pair generated by the second decoding means, a second address showing a location of a level of the second run-level pair within a block;
 first inverse quantizing means for inverse quantizing the level of the first run-level pair using the calculated first address, to generate a first coefficient;
 second inverse quantizing means for inverse quantizing the level of the second run-level pair using the calculated second address, to generate a second coefficient; and
 reconstructing means for reconstructing the two original signal sets using a combination of the first address and the first coefficient and a combination of the second address and the second coefficient.

15. The variable length code decoding device of claim 14, wherein the reconstructing means includes:
 first coefficient storing means for storing address-coefficient pairs;
 second coefficient storing means for storing address-coefficient pairs;
 coefficient writing means for
  (a) in the first case writing the combination of the first address and the first coefficient and the combination of the second address and the second coefficient into the first coefficient storing means as two address-coefficient pairs, and
  (b) in the second case writing the combination of the first address and the first coefficient into the first coefficient storing means as an address-coefficient pair, and writing the combination of the second address and the second coefficient into the second coefficient storing means as an address-coefficient pair;
 first block storing means having areas each of which has an address and initially stores a zero value;
 second block storing means having areas each of which has an address and initially stores a zero value;
 block writing means for
  (a) in the first case sequentially reading the two address-coefficient pairs from the first coefficient storing means and writing a coefficient of each of the read address-coefficient pairs into an area in the first block storing means specified by an address of the address-coefficient pair, and
  (b) in the second case reading the address-coefficient pair from the first coefficient storing means and writing a coefficient of the read address-coefficient pair into an area in the first block storing means specified by an address of the address-coefficient pair, and reading the address-coefficient pair from the second coefficient storing means and writing a coefficient of the read address-coefficient pair into an area in the second block storing means specified by an address of the address-coefficient pair; and
 signal generating means for
  (a) in the first case reading values from part of the areas in the first block storing means and generating the two original signal sets from the read values, and
  (b) in the second case reading values from part of the areas in the first block storing means and from part of the areas in the second block storing means, and generating the two original signal sets from the read values.

16. A variable length code decoding device comprising:
 code extracting means for extracting two consecutive codewords from a compressed code stream that is made up of a sequence of a plurality of variable length codewords;
 wherein the compressed code stream includes a plurality of codewords that have each been generated as a result of quantizing and entropy coding at least one signal, hereafter referred to as a signal set, which belongs to a block of signals each generated by applying orthogonal transform to image data,
 the two consecutive codewords each being no greater than a predetermined length, and
 parallel decoding means for decoding the extracted two codewords in parallel, wherein the parallel decoding means includes:
  code decoding means for entropy decoding the extracted two codewords in parallel with reference to a code table, to generate two decoded words; and
  signal reconstructing means for performing inverse quantization with the two decoded codes in parallel to reconstruct two original signal sets.

17. The variable length code decoding device of claim 16, wherein each codeword has been generated by entropy coding a run-level pair that represents a quantized signal set, the run-level pair being made up of a run which is a number of zero signals in the quantized signal set and a level which is a value of an immediately following nonzero signal in the quantized signal set, wherein the code extracting means extracts the two consecutive codewords as first and second codewords, and includes:
 position storing means for storing position information which specifies a position of the first codeword in the compressed code stream; and
 extracting means for extracting from the compressed code stream the first codeword located in the position specified by the position information, calculating a length of the first codeword, and extracting from the compressed code stream the second codeword located in a position specified by a sum of the position information and the calculated length, wherein the code decoding means entropy decodes the extracted first and second codewords to generate first and second run-level pairs as the two decoded words, and includes:
  a code table having areas which each have an address obtained by concatenating two codewords which include a first former codeword and a second latter codeword, each being no greater than the predetermined length and store two n-level pairs corresponding to the former codeword and the latter codeword, the former codeword being generated when entropy coding the corresponding former run-level pair, and the latter codeword being generated when entropy coding the corresponding latter run-level pair; and
  decode controlling means for retrieving from the code table two run-level pairs stored in an area whose address is a result of concatenating the first and second codewords in the stated order, and setting the retrieved former and latter run-level pairs respectively as the first and second run-level pairs, and
wherein the signal reconstructing means reconstructs the two original signal sets based on the first and second run-level pairs.

18. The variable length code decoding device of claim 17, wherein the signal reconstructing means includes:
  first address calculating means for calculating, based on the first run-level pair generated by the code decoding means, a first address showing a location of a level of the first run-level pair within a block;
  second address calculating means for calculating, based on the second run-level pair generated by the code decoding means, a second address showing a location of a level of the second run-level pair within the block;
  first inverse quantizing means for inverse quantizing the level of the first run-level pair using the calculated first address, to generate a first coefficient;
  second inverse quantizing means for inverse quantizing the level of the second run-level pair using the calculated second address, to generate a second coefficient; and
  reconstructing means for reconstructing the two original signal sets using a combination of the first address and the first coefficient and a combination of the second address and the second coefficient.

19. The variable length code decoding device of claim 18, wherein the reconstructing means includes:
  coefficient storing means for storing address-coefficient pairs;
  coefficient writing means for writing the combination of the first address and the first coefficient and the combination of the second address and the second coefficient into the coefficient storing means as two address-coefficient pairs;
  block storing means having areas each of which has an address and initially stores a zero value;
  block writing means for sequentially reading the two address-coefficient pairs from the coefficient storing means and writing a coefficient of each of the read address-coefficient pairs into an area in the block storing means specified by an address of the address-coefficient pair; and
  signal generating means for reading values from part of the areas in the block storing means and generating the two original signal sets from the read values.

20. A variable length code decoding device comprising:
code extracting means for extracting two consecutive codewords from a compressed code stream that is made up of a sequence of a plurality of variable length codewords;
wherein the compressed code stream includes coded control information elements that have been respectively generated as a result of entropy coding control information elements of at least two different types, the control information elements being used to control decoding of image data,
wherein the code extracting means extracts two consecutive coded control information elements from the compressed code stream as the two consecutive codewords, and
parallel decoding means for decoding the extracted two codewords in parallel, wherein the parallel decoding means includes:
  code decoding means for entropy decoding the extracted two coded control information elements in parallel to generate two original control information elements.

21. The variable length code decoding device of claim 20, wherein the code extracting means extracts the two consecutive coded control information elements as first and second codewords, and includes:
  position storing means for storing position information which specifies a position of the first codeword in the compressed code stream;
  first extracting means for extracting from the compressed code stream the first codeword located in the position specified by the position information, and calculating a length of the first codeword; and
  second extracting means for extracting from the compressed code stream the second codeword located in a position specified by a sum of the position information and the calculated length, and
wherein the code decoding means entropy decodes the first and second codewords to generate first and second control information elements as the two original control information elements, and includes:
  first decoding means for entropy decoding the first codeword into the first control information element; and
  second decoding means for entropy decoding the second codeword into the second control information element.

22. The variable length code decoding device of claim 21, wherein the first decoding means includes:
  a first control information table that has an address and stores codewords and control information elements corresponding to the codewords;
  a first address table that has a first address area storing the address of the first control information table;
  first pointer holding means for holding a first pointer which specifies the first address area in the first address table; and
  first decode controlling means for retrieving the address from the first address area in the first address table specified by the first pointer, detecting a control information element corresponding to the first codeword from the first control information table shown by the retrieved address, and setting the detected control information element as the first control information element.

23. The variable length code decoding device of claim 22, wherein the second decoding means includes:
  a second control information table that has an address and stores codewords and control information elements corresponding to the codewords;
  a second address table that has a second address area storing the address of the second control information table;

second pointer holding means for holding a second pointer which specifies the second address area in the second address table; and second decode controlling means for retrieving the address from the second address area in the second address table specified by the second pointer, detecting a control information element corresponding to the second codeword from the second control information table shown by the retrieved address, and setting the detected control information element as the second control information element.

24. A variable length code decoding device comprising:

code extracting means for extracting, as first and second codewords, two consecutive codewords from a compressed code stream made up of a sequence of variable length codewords that have each been generated as a result of quantizing and entropy coding at least one signal, hereafter referred to as a signal set, which belongs to a block of signals each generated by applying orthogonal transform to image data, each of the variable length codewords having been generated by entropy coding a run-level pair made up of a run which is a number of zero signals in a quantized signal set and a level which is a value of an immediately following nonzero signal in the quantized signal set; and parallel decoding means for decoding the extracted first and second codewords in parallel, the parallel decoding means including:

code decoding means for entropy decoding the extracted first and second codewords in parallel to generate first and second run-level pairs; and signal reconstructing means for performing inverse quantization with the first and second run-level pairs in parallel to reconstruct two original signal sets, wherein the code extracting means includes:

position storing means for storing position information which specifies a position of the first codeword in the compressed code stream;

first extracting means for extracting from the compressed code stream the first codeword located in the position specified by the position information, and calculating a length of the first codeword; and second extracting means for extracting from the compressed code stream the second codeword located in a position specified by a sum of the position information and the calculated length, the second codeword being no greater than a Second predetermined length, wherein the code decoding means includes:

first decoding means for entropy decoding the first codeword into the first run-level pair, and second decoding means for entropy decoding the second codeword into the second run-level pair;

wherein the first decoding means includes;

a first table having areas which each have an address no greater than a first predetermined length and store a run-level pair corresponding to the address, the address being a codeword for the corresponding run-level pair that is generated when entropy coding the corresponding run-level pair;

a second table having areas which each have an address greater than the first predetermined length and store a unique value;

a third table having a separate area for each of the areas in the second table, the area in the third table having an address equal to a value stored in the area in the second table and storing a run-level pair corresponding to the address, where an address of the area in the second table is a codeword for the corresponding run-level pair that is generated when entropy coding the corresponding run-level pair stored in the area in the third table; and first decode controlling means for when the first codeword is no greater than the first predetermined length, retrieving from the first table a corresponding run-level pair stored in an area whose address is the first codeword, and setting the retrieved run-level pair as the first run-level pair, and when the first codeword is greater than the first predetermined length, reading from the second table a value stored in an area whose address is the first codeword, retrieving from the third table a corresponding run-level pair stored in an area whose address is the read value, and setting the retrieved run-level pair as the first run-level pair, wherein the second decoding means includes;

a table having areas which each have an address no greater than the second predetermined length and store a ran-level pair corresponding to the address, the address being a codeword for the corresponding run-level pair that is generated when entropy coding the corresponding run-level pair; and second decode controlling means for retrieving from the table a run-level pair stored in an area whose address is the second codeword, and setting the retrieved run-level pair as the second run-level pair, and wherein the signal reconstructing means includes:

first address calculating means for calculating, based on the first run-level pair generated by the first decoding means, a first address showing a location of a level of the first run-level pair within a block;

second address calculating means for calculating, based on the second run-level pair generated by the second decoding means, a second address showing a location of a level of the second run-level pair within the block;

first inverse quantizing means for inverse quantizing the level of the first run-level pair using the calculated first address, to generate a first coefficient;

second inverse quantizing means for inverse quantizing the level of the second run-level pair using the calculated second address, to generate a second coefficient; and reconstructing means for reconstructing the two original signal sets using a combination of the first address and the first coefficient and a combination of the second address and the second coefficient.

25. A variable length code decoding device comprising:

selection accepting means for accepting a selection between decoding of a first compressed code stream and decoding of first and second compressed code streams, the first and second compressed code streams each being made up of a sequence of variable length codewords that have each been generated as a result of quantizing and entropy coding at least one signal, hereafter referred to as a signal set, which belongs to a block of signals each generated by applying orthogonal transform to image data, each of the variable length codewords having been generated by entropy coding a run-level pair made up of a run which is a number of zero signals in a quantized signal set and a level which is a value of an immediately following nonzero signal in the quantized signal set;

code extracting means for
(a) extracting, as first and second codewords, two consecutive codewords from the first compressed code stream in a first case where the decoding of the first compressed code stream is selected, and
(b) extracting, as the first and second codewords, two codewords respectively from the first and second compressed code streams in a second case where the decoding of the first and second compressed code streams is selected; and parallel decoding means for decoding the extracted first and second codewords in parallel, the parallel decoding means including:
code decoding means for entropy decoding the first and second codewords in parallel to generate first and second run-level pairs; and
signal reconstructing means for performing inverse quantization with the first and second run-level pairs in parallel to reconstruct two original signal sets,
wherein the code extracting means includes:
position storing means for storing first position information and second position information, the first position information specifying a position of the first codeword in the first compressed code stream, and the second position information specifying a position of the second codeword in the second compressed code stream;
first extracting means for extracting from the first compressed code stream the first codeword located in the position specified by the first position information, and calculating a length of the first codeword; and second extracting means for
(a) in the first case extracting from the first compressed code stream the second codeword located in a position specified by a sum of the first position information and the calculated length, and
(b) in the second case extracting from the second compressed code stream the second codeword located in the position specified by the second position information, and
wherein the code decoding means includes:
first decoding means for entropy decoding the first codeword into the first run-level pair; and
second decoding means for entropy decoding the second codeword into the second run-level pair, and
wherein the signal reconstructing means includes:
first address calculating means for calculating, based on the first run-level pair generated by the first decoding means, a first address showing a location of a level of the first run-level pair within a block;
second address calculating means for calculating, based on the second run-level pair generated by the second decoding means, a second address showing a location of a level of the second run-level pair within a block;
first inverse quantizing means for inverse quantizing the level of the first run-level pair using the calculated first address, to generate a first coefficient;
second inverse quantizing means for inverse quantizing the level of the second run-level pair using the calculated second address, to generate a second coefficient; and
reconstructing means for reconstructing the two original signal sets using a combination of the first address and the first coefficient and a combination of the second address and the second coefficient.

26. A variable length code decoding device comprising:
code extracting means for extracting two consecutive codewords as first and second codewords each being no greater than a predetermined length, from a compressed code stream made up of a sequence of variable length codewords that have each been generated as a result of quantizing and entropy coding at least one signal, hereafter referred to as a signal set, which belongs to a block of signals each generated by applying orthogonal transform to image data, each of the variable length codewords having been generated by entropy coding a run-level pair made up of a run which is a number of zero signals in a quantized signal set and a level which is a value of an immediately following nonzero signal in the quantized signal set; and
parallel decoding means for decoding the extracted first and second codewords in parallel, the parallel decoding means including:
code decoding means for entropy decoding the extracted first and second codewords in parallel with reference to a code table, to generate first and second run-level pairs; and
signal reconstructing means for performing inverse quantization with the first and second run-level pairs in parallel to reconstruct two original signal sets,
wherein the code extracting means includes:
position storing means for storing position information which specifies a position of the first codeword in the compressed code stream; and
extracting means for extracting from the compressed code stream the first codeword located in the position specified by the position information, calculating a length of the first codeword, and extracting from the compressed code stream the second codeword located in a position specified by a sum of the position information and the calculated length,
wherein the code decoding means includes:
the code table having areas which each have an address obtained by concatenating two codewords which include a first former codeword and a second latter codeword, each being no greater than the predetermined length and store two run-level pairs corresponding to the former codeword and the latter codeword, the former codeword being generated when entropy coding the corresponding former rum-level pair, and the latter codeword being generated when entropy coding the corresponding latter run-level pair; and
decoding controlling means for retrieving from the code table two run-level pairs stored in an area whose address is a result of concatenating the first and second codewords in the stated order, and setting the retrieved former and latter run-level pairs respectively as the first and second run-level pairs, and
wherein the signal reconstructing means includes:
first address calculating means for calculating, based on the first run-level pair generated by the code decoding means, a first address showing a location of a level of the first run-level pair within a block;

second address calculating means for calculating, based on the second run-level pair generated by the code decoding means, a second address showing a location of a level of the second run-level pair within the block;

first inverse quantizing means for inverse quantizing the level of the first run-level pair using the calculated first address, to generate a first coefficient;

second inverse quantizing means for inverse quantizing the level of the second run-level pair using the calculated second address, to generate a second coefficient; and reconstructing means for reconstructing the two original signal sets using a combination of the first address and the first coefficient and a combination of the second address and the second coefficient.

27. A digital broadcast receiving apparatus for decoding a compressed code stream included in a received digital broadcast wave to reproduce image data, comprising:

code extracting means for extracting two consecutive codewords from the compressed code string that is made up of a sequence of a plurality of variable length codewords, wherein the compressed code stream includes a plurality of codewords that have each been generated as a result of quantizing and entropy coding at least one signal, hereafter referred to as a signal set, which belongs to a block of signals each generated by applying orthogonal transform to image data; and parallel decoding means for decoding the extracted two codewords in parallel, wherein the parallel decoding means includes:

code decoding means for entropy decoding the extracted two codewords in parallel to generate two decoded words; and signal reconstructing means for performing inverse quantization with the two decoded words in parallel to reconstruct two original signal sets.

28. A DVD (Digital Versatile Disk) reproducing apparatus for decoding a compressed code stream recorded on a DVD to reproduce image data, comprising:

code extracting means for extracting two consecutive codewords from the compressed code stream that is made up of a sequence of a plurality of variable length codewords, wherein the compressed code stream includes a plurality of codewords that have each been generated as a result of quantizing and entropy coding at least one signal, hereafter referred to as a signal set, which belongs to a block of signals each generated by applying orthogonal transform to image data; and parallel decoding means for decoding the extracted two codewords in parallel, wherein the parallel decoding means includes:

code decoding means for entropy decoding the extracted two codewords in parallel to generate two decoded words; and signal reconstructing means for performing inverse quantization with the two decoded words in parallel to reconstruct two original signal sets.

\* \* \* \* \*

UNITED STATES PATENT AND TRADEMARK OFFICE
CERTIFICATE OF CORRECTION

PATENT NO. : 6,414,608 B1
DATED : July 2, 2002
INVENTOR(S) : Hideshi Nishida, Kosuke Yoshioka and Tokuzo Kiyohara It is certified that error appears in the above-identified patent and that said Letters Patent is hereby corrected as shown below:

Column 42,
Line 54, delete "rum-level" and insert -- run-level --.

Column 47,
Line 9, delete "n-level" and insert -- run-level --.

Column 49,
Line 47, delete "Second" and insert -- second --.
Line 54, delete ";" and insert -- : --.

Column 50,
Line 22, delete ";" and insert -- : --.
Line 25, delete "ran-level" and insert -- run-level --.

Column 53,
Line 22, delete "string" and insert -- stream --.

Signed and Sealed this

Twenty-eighth Day of January, 2003

JAMES E. ROGAN
*Director of the United States Patent and Trademark Office*